United States Patent
Rajasenan

(10) Patent No.: US 8,407,081 B1
(45) Date of Patent: *Mar. 26, 2013

(54) METHOD AND SYSTEM FOR IMPROVING EFFCIENCY IN AN ORGANIZATION USING PROCESS MINING

(75) Inventor: Terry Rajasenan, Pittsburgh, PA (US)

(73) Assignee: ProcessProxy Corporation, Baltimore, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/305,728

(22) Filed: Nov. 28, 2011

Related U.S. Application Data

(63) Continuation of application No. 11/562,857, filed on Nov. 22, 2006, now Pat. No. 8,073,731, and a continuation-in-part of application No. 10/751,192, filed on Dec. 31, 2003, now abandoned, and a continuation-in-part of application No. 10/749,830, filed on Dec. 30, 2003, now abandoned.

(60) Provisional application No. 60/740,439, filed on Nov. 28, 2005.

(51) Int. Cl.
G06Q 10/00 (2012.01)

(52) U.S. Cl. ............... 705/7.42; 705/7.38

(58) Field of Classification Search .......... 705/7.42, 705/7.38
See application file for complete search history.

(56) References Cited

U.S. PATENT DOCUMENTS

| | | | |
|---|---|---|---|
| 5,706,441 A | 1/1998 | Lockwood | |
| 6,119,097 A * | 9/2000 | Ibarra | 705/7.42 |
| 6,341,267 B1 | 1/2002 | Taub | |
| 6,605,038 B1 | 8/2003 | Teller et al. | |
| 6,640,212 B1 | 10/2003 | Rosse | |
| 6,912,502 B1 | 6/2005 | Buddle et al. | |
| 7,076,779 B2 | 7/2006 | Breunese | |
| 7,103,562 B2 * | 9/2006 | Kosiba et al. | 705/7.38 |
| 7,110,956 B1 * | 9/2006 | Drake et al. | 705/7.37 |
| 7,483,842 B1 | 1/2009 | Fung et al. | |
| 7,562,059 B2 * | 7/2009 | Scarborough et al. | 706/21 |
| 2001/0042004 A1 * | 11/2001 | Taub | 705/11 |
| 2002/0035506 A1 | 3/2002 | Loya | |
| 2002/0042731 A1 * | 4/2002 | King et al. | 705/10 |
| 2002/0087377 A1 | 7/2002 | Rajasenan et al. | |
| 2003/0069869 A1 | 4/2003 | Gronau et al. | |
| 2003/0115094 A1 | 6/2003 | Ammerman et al. | |
| 2003/0229529 A1 * | 12/2003 | Mui et al. | 705/8 |
| 2004/0138944 A1 | 7/2004 | Whitacre et al. | |
| 2007/0150330 A1 * | 6/2007 | McGoveran | 705/8 |
| 2007/0203711 A1 * | 8/2007 | Nation et al. | 705/1 |

OTHER PUBLICATIONS

Pershing, Using Document Analysis in Analyzing and Evaluating Performance, www.ipsi.org, Jan. 2002, p. 36-42.*
Tesluk and Mathieu, Overcoming Roadblocks to Effectiveness: Incorporating Management of Performance Barriers Into Models of Work Group Effectiveness, Journal of Applied Psychology, vol. 84, 1999, p. 200-17.*
"Health Data Management | New Decision Support Apps for Zynx" (Oct. 14, 2005), Health Data Management and SourceMedia, Inc., 2007, [online] [Retrieved on Mar. 20, 2007] Retrieved from the Internet<http://www.healthdatamanagement.com/html/PortalStory.cfm?type=newprod&DID=13143>.
"Insights™, Enterprise Knowledge Management & Data Aggregation," SigmaFlow®, 2 pages, 2007.
"MIDAS+™ DataVision™, DataVision™ SmartReport™," MidasPlus, Inc., 2004, 1 page.

(Continued)

Primary Examiner — Justin M Pats
(74) Attorney, Agent, or Firm — David C. Isaacson; Fitzgerald & Isaacson, LLP

(57) ABSTRACT

Systems and methods are provided for improving processes in a healthcare organization by mining historical data for information that can be used to more effectively allocate resources and process components. Factors used for the analysis include time, information, motivation, skills, and authority for particular resources. Arbitrage processing is used to minimize opportunity costs and increase efficiency.

20 Claims, 15 Drawing Sheets

OTHER PUBLICATIONS

Blyton, The Industrial Relations of Work-Sharing, 2001, pp. 6-12.

Böckerman and Kiander, Has work-sharing worked in Finland, 1998, p. 1-22.

Business Wire: Care Science Quality Management in Second Quarter; Qu . . . , Business Wire, Gale Group, 2005 [online] [Retrieved on Mar. 19, 2007] Retrieved from the Internet,URL:http://www.findarticles.com/p/articles/mi_m0EIN/is_2005_Augut_2/ai_nl4841522/print>.

Calmfors and Hoel, Work Sharing, Employment, and Shiftwork, Oxford Economic Papers, New Series, vol. 41, No. 4, Oct. 1989, pp. 758-773.

De Medeiros, A.K.A., et al., "Workflow Mining: Current Status and Future Directions," (R. Meersman et al. eds.), CoopIS/DOA/ODBASE 2003, LNCS 2888, 2003, pp. 389-406, © Springer-Verlag Berlin, Heidelberg.

Dustdar, S., et al., "Mining of Ad-Hoc Business Processes with TeamLog," Technical Report TUV-1841-2004-07, 2004, Vienna University of Technology.

Edsall, T., et al., "On Nov. 2, GOP Got More Bang for Its Billion, Analysis Shows," Dec. 30, 2004, washingtonpost.com, [online] [Retrieved on Mar. 19, 2007] Retrieved from the Internet<URL:http://www.washingtonpost.com/ac2/wp-dyn/A35062-2004Dec29?language=printer>.

Foxon, A Process Approach to the Transfer of Training, Australian Journal of Educational Technology, vol. 10, No. 1, 1994, pp. 1-18 (online reprint pp. 1-7).

Hunt and Katz, Hours Reduction as Work-Sharing, Brookings Papers on Economics Activity, vol. 1998, No. 1, 1998, pp. 339-381.

Maruster, L., et al., "Automated Discovery of Workflow Models from Hospital Data," (C. Dousson, et al. eds), Proceedings of the ECAI Workshop on Knowledge Discovery and Spatial Data, 2002, pp. 32-36.

Moceri, D., "Email Microtargeting," 2004-2005, Opentopia, [online] [Retrieved on Mar. 19, 2007] Retrieved from the Internet<URL:http://www.opentopia.com/showart.php?source=go&artid=13209&catid=16?>.

Pannenberg and Wagner, Overtime Work, Overtime Compensation and the Distribution of Economic Well-Being, Feb. 2001, pp. 1-28.

Quality and Process Improvement in Healthcare Using Root Cause Analysis, System Improvements—Changing the Way the World Solves Problems—TapRoot and Healthcare, 2001, pp. 1-10.

Rozinat, A., et al., "Conformance Testing: Measuring the Alignment Between Event Logs and Process Models,", Beta Working Paper Series, WP 144, 2005, Eindhoven University of Technology, Eindhoven.

Swanson, et al. Eds., Improving Agricultural Extension. A Reference Manual, 1998, Chapter 14, Managing Human Resources Within Extension, online reprint pp. 1-12.

Van Der Aalst, W.M.P., et al., "Genetic Process Mining," 26th International Conference on Applications and Theory of Petri Nets (ICATPN 2005), (G. Ciardo, et al. eds.), LNCS 3536, 2005, pp. 48-69, © Springer-Verlag Berlin, Heidelberg.

Van Der Aalst, W.M.P., et al., "Process Mining and Verification of Properties: An Approach Based on Temporal Logic," (R Meersman, et al. eds.), on the Move to Meaningful Internet Systems 2005: CoopIS, Doa, and ODBASE: OTM Confederated International Conferences, CoopIS, DOA, and ODBASE 2005, vol. 3760 of Lecture Notes in Computer Science, 2005, pp. 130-147, Springer-Verlag, Berlin.

Van Der Aalst, W.M.P., et al., "Workflow Mining: A Survey of Issues and Approaches," Data and Knowledge Engineering, 2003, pp. 236-267, vol. 47, No. 2.

Van Der Aalst, W.M.P., et al., "Workflow Mining: Discovering Process Models from Event Logs," QUT Technical Report, FIT-TR-2003-03, 2003, Queensland University of Technology, Brisbane.

Weijters, A.J.M.M., et al., "Rediscovering Workflow Models from Event-Based Data," In Proceedings of the Third International NAISO Symposium on Engineering of Intelligent Systems (EIS 2002), 2002, pp. 65-65, NAISO Academic Press. Sliedrecht, The Netherlands.

Hunt, Has Work-Sharing Worked in Germany, The Quarterly Journal of Economics, Vo. 114, No. 1 (Feb. 1999), pp. 117-148.

Giannelli and Braschi, Reducing Hours of Work: Does Overtime Act as a Brake Upon Employment Growth? An Analysis by Gender for the Case of Italy, Aug. 2002, p. 1-31.

Non-Final Office Action mailed Aug. 9, 2010 in U.S. Appl. No. 11/562,857.

Final Office Action mailed Dec. 20, 2010 in U.S. Appl. No. 11/562,857.

Non-Final Office Action mailed Apr. 11, 2011 in U.S. Appl. No. 11/562,857.

Notice of Allowance and Fees Due mailed Sep. 15, 2011 in U.S. Appl. No. 11/562,857 and Notice of Allowability at pp. 5-21 therein.

Examiner Interview Summary Record mailed Sep. 15, 2011 in U.S. Appl. No. 11/562,857.

* cited by examiner

METHOD AND SYSTEM FOR IMPROVING EFFCIENCY IN AN ORGANIZATION USING PROCESS MINING

The present application is a continuation of U.S. patent application Ser. No. 11/562,857, filed Nov. 22, 2006, which claims the benefit of U.S. Provisional Appln. No. 60/740,439, filed Nov. 28, 2005 (expired), and which is a continuation-in-part of U.S. patent application Ser. No. 10/751,192, filed Dec. 31, 2003 (abandoned) and a continuation-in-part of U.S. patent application Ser. No. 10/749,830, filed Dec. 30, 2003 (abandoned), each of which is hereby incorporated by reference herein in its entirety.

BACKGROUND OF THE DISCLOSURE

1. Field of the Disclosure

The present disclosure relates generally to management of healthcare processes, and in particular development of specific actions for specific healthcare resources based on knowledge that can be determined from historical data about such resources.

2. Description of the Relevant Art

Virtually all work within a business gets done via a process. In general, there are multitudes of employees (or agents), systems, and information involved in the processes critical to any business. For example, healthcare delivery includes processes for treatment of patients by physicians, maintenance of medical histories for the patients, and billing for the healthcare services provided to the patients.

Healthcare today is like many other stressed industries, in that change and improvement are an essential reality. This is not just for those firms and organizations facing impending insolvency or cash flow crises, but also those striving to improve their efficiency, profitability, and competitiveness. Change initiatives are the way to achieve these improvements. It is important to realize, however, that these change and improvement initiatives have a limited window of opportunity to succeed, lest they damage themselves and all other initiatives "downstream" from them. Consequently, time is of the essence in incorporating business process improvements.

Proper execution of a business process requires actions to be performed by multiple employees or agents of the business (hereinafter referred to as "roles"). Processes with high levels of complexity, such as those within healthcare delivery, may suffer cost overruns, quality deficits or other process breakdowns. A process breakdown occurs when a 'role' fails to perform a task or 'action' that leads to a loss of revenue or imposes a cost on the business. In other words, process breakdowns are the result of failure to execute the best available 'role-action.'

For example, hundreds of millions of dollars of revenue are lost per year, and millions of dollars in fines are levied by regulators in the healthcare industry due to inadequacies in the clinical documentation process of billing for healthcare services. This problem has persisted because there has not been a cost-effective process in place to adequately review and cross reference patient billing and medical records. Furthermore, there has not been a cost-effective process to document diagnoses and treatments vis-a-vis all of the clinical information to determine if there are any documentation gaps or opportunities that physicians should note in patient records prior to billing.

One reason that process breakdowns occur is that businesses are frequently overwhelmed with reams of data generated by the various systems and roles involved in performing the individual role-actions within a business process. Managers and other roles often lack the resources necessary to properly review, analyze, and act on this information. These necessary resources include time, information, motivation, skill, and authority to act on the generated data.

One typical strategy for attempting to reduce process breakdowns is additional training for roles within a business. Such training may include introduction of new technology (e.g. software solutions) into the business with the goal of improving efficiency. Unfortunately, training individuals to use new technology is extremely challenging and frequently ineffective. Often this ineffectiveness is related to the same lack of resources (time, information, motivation, skill, authority) creating the process breakdown.

For example, physicians are routinely faced with pressures on their time. This lack of time can result in a physician failing to record all of the information necessary to allow the healthcare organization to use the highest justifiable value billing code for the physician's activity. Additionally, the physician's motivation is to focus on treating the patient, not on recording billing information. Simply training the physicians to understand the billing system will not necessarily improve this situation, as providing the physician with generalized billing information does not address the potential lack of time or motivation to address the problem. Co-pending U.S. patent application Ser. No. 10/751,192 and the applications related thereto disclose techniques to review all of the records and information related to a patient, and present the physician with a crystallized finding for his/her consideration so that opportunities for use of higher value billing codes may be identified. These applications further disclose methodologies for identifying process breakdown points within a business process and assigning role-actions (tasks for individual roles) that will improve or replace the role-action leading to the breakdown.

Challenges remain, however, for further improving efficiency in healthcare processes. Discovering, implementing and revising process improvements successfully are not accomplished often enough to maximize the effectiveness of typical facilities. Known approaches involve hiring consultants to conduct staff interviews, analysts to conduct time/motion studies, or committees to undertake reengineering projects. These approaches can lead to improvements, but generally take a great deal of time and effort to implement, including disruption to existing operations. For example, many reengineering approaches attempt to improve processes by starting from scratch and developing new processes without regard to what existing processes are being used. As a result, process improvement is oftentimes not embraced by staff and improvement falters.

What is still needed is a system for transparently improving processes in a manner that minimally disrupts staff, quickly leads to improvements, and provides a high return on the investment in process improvement effort.

SUMMARY OF THE VARIOUS EMBODIMENTS

In accordance with the present invention, systems, and apparatuses examine a process and its components, perform statistical analyses on the resources used in the process, and identify proposed process component/resource allocations likely to result in overall process improvement.

In one embodiment, processing seeks to minimize opportunity cost by mining historical data from previous processes, using arbitrage processing for resource allocation, and implementing process "friction" reducing mechanisms.

In one embodiment, a TIMSA-DAP (Time, Information, Motivation, Skill, Authority-Daily Action Plan) methodology, as described in the above-referenced related applications, is used to not only prevent process breakdown, but to also facilitate best process adoption.

In one embodiment, a labor arbitrage methodology, as also described in the above-referenced related applications, is used to iteratively develop, implement, and redesign best practices, focusing not necessarily on shift labor, but on the labor used within a process ("process labor").

In one embodiment, process mining techniques analyze event logs, ontology and tagging data to provide inputs to TIMSA-DAP and labor arbitrage processing.

The figures depict certain embodiments of the present disclosure for purposes of illustration only. One skilled in the art will readily recognize from the following description that alternative embodiments of the structures and methods illustrated herein may be employed without departing from the principles of the various embodiments of this disclosure.

DETAILED DESCRIPTION OF THE VARIOUS EMBODIMENTS

Figure 1:
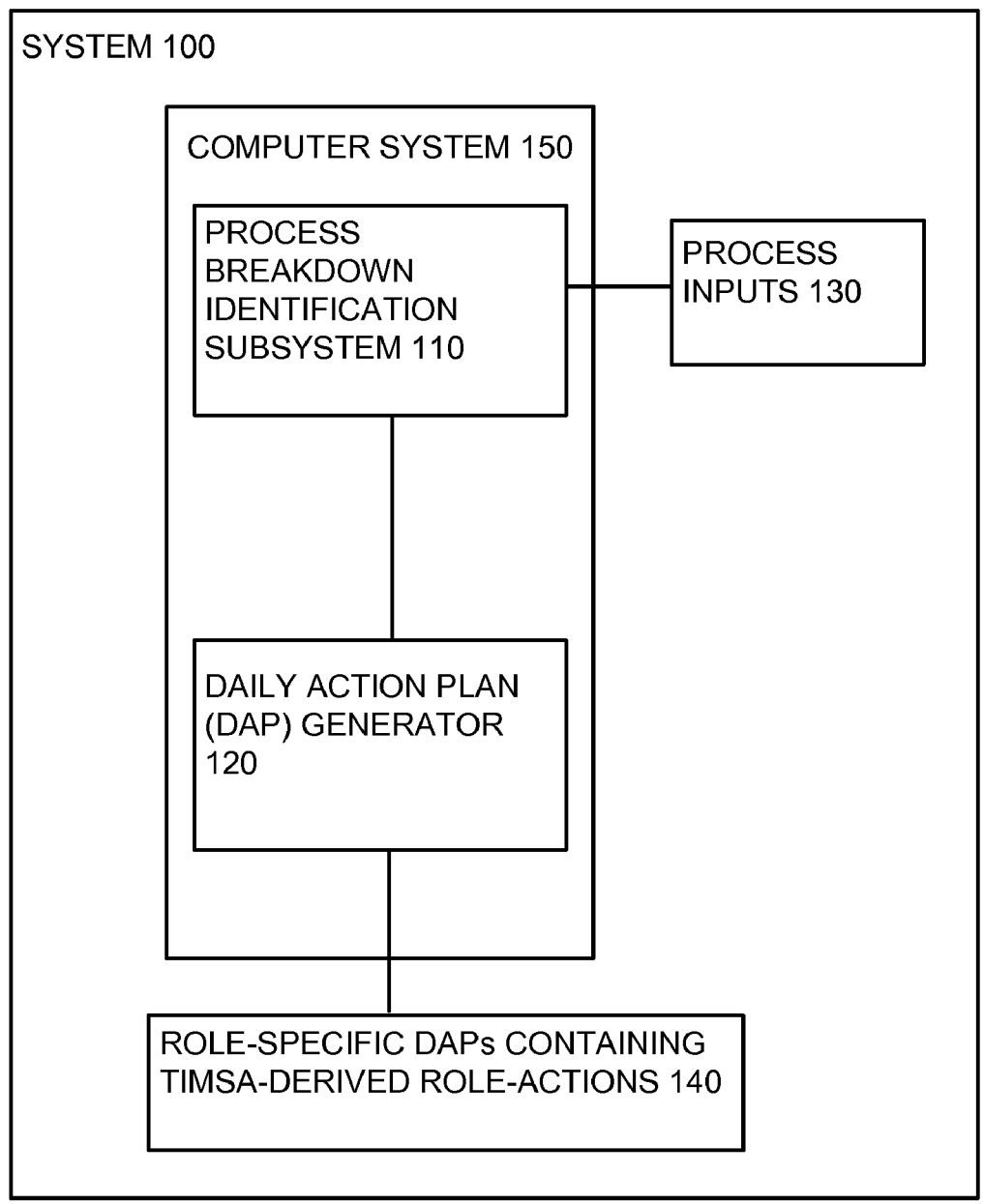
FIG. 1 is a high-level block diagram illustrating a system for identifying and correcting process breakdowns according to one embodiment of this disclosure.

FIG. 1 is a high-level block diagram of a system 100 for identifying and correcting process breakdowns according to an embodiment of the present disclosure. System 100 includes a process breakdown identification subsystem 110 and a daily action plan (DAP) generator 120. The process breakdown identification subsystem is provided with process inputs 130, as more fully described below, and identifies based on such inputs information concerning process breakdowns. The output from the process breakdown identification subsystem 110 is then used by the DAP generator 120 to deliver action plans to repair the process breakdowns. In a preferred embodiment, both the process breakdown identification subsystem 110 and the DAP generator 120 are implemented using a general purpose computer 150 including a processor, memory, and input/output facilities (not detailed in FIG. 1) and conventionally programmed to behave as described below. In addition, role specific daily action plans (DAPs) containing TIMSA-derived role actions 140 are coupled with the computer system 150, specifically the DAP generator 120.

Typical business processes, and particularly processes in the healthcare industry, may break down due to a variety of reasons, such as lack of time, lack of information, lack of motivation, lack of skill, or lack of authority. These reasons, known by the acronym TIMSA, typically result from certain defined roles (e.g., nurses) not performing certain defined actions (e.g., entering test results on patient charts).

Process breakdowns occur when role-actions that are supposed to occur are not executed, or role-actions that should not occur are indeed performed. The likelihood of a process breakdown can be evaluated by viewing each role-action as a Potential Breakdown Point (PBP). A probability value is assigned and represents the potential for a process breakdown. This probability can be based on frequencies derived from historical data, or it can simply be assigned qualitatively. In a preferred embodiment, a series of probability values are assigned for each role-action. These probability values correspond to the likelihood of breakdown due to the availability of resources such as time, information, motivation, skill, and authority.

For example, the healthcare billing process includes a number of role-actions, such as a) physicians documenting the treatment provided to patients, b) a billing administrator reviewing the documentation to determine the billing code, c) a billing administrator querying the physician in the event that documentation needs further clarification and d) sending bills to the payor for the services rendered. This list of role-actions is intended only as an example rather than a comprehensive list of possible role-actions. Also, the list of role-actions for a process is not necessarily unique—depending on the process, it may be possible to develop multiple different lists of role-actions that successfully describe how the process works.

The list of role-actions varies depending upon a number of input factors, typically based upon a correlation of the role-actions with objectives, benchmarks, and sensors. Objectives represent overall business goals such as maximizing profit for the organization. Benchmarks represent goals specific to the type of organization. For example, a healthcare organization attempting to maximize profit might set a benchmark of increasing the operating profit for all patients receiving a certain type of treatment. Sensors represent tangible measurements that indicate if progress is being made toward the benchmark. While increasing operating profit for patients receiving a certain type of treatment represents a desirable benchmark, this benchmark does not itself indicate the feasibility of achieving this increase. The sensor for this benchmark could be a comparison of the healthcare organization's operating profit with the average operating profit for the same procedure at other facilities. This would be an appropriate sensor, for example, for a healthcare organization showing an operating profit below the national average. This input information is collected by process input subsystem 130 and sent to process breakdown identification subsystem 110.

A process breakdown is prevented whenever a role-action is either facilitated by a daily action plan that lowers the barriers to execute the role-action, or when the role-action is supported by a backup role-action. For example, if the barrier to executing a role-action is a lack of information, a daily action plan providing the required information will facilitate the role-action. Similarly, if the barrier is a lack of motivation to execute the role-action, a daily action plan detailing the rewards for execution (or penalties for failure of execution) may facilitate the role-action. Other daily action plans may lower barriers due to insufficient time, lack of authority, or a lack of skill/unfamiliarity with an action.

Alternatively, a role-action may be supported by a backup role-action. That is, a daily action plan assigns another role-action (performed by a different role, for instance) that can accomplish the same objective in the event the first role-action fails to occur. The backup role-action would be provided in a daily action plan that instructs the additional role when and how to proceed when the first role-action fails to occur.

Once the process is divided into role-actions, the role-actions that need support are identified. For example, in a billing documentation situation, the roles of Clinical Documentation Coordinators (CDCs) may be succeeding at performing one of their role-actions, such as typing memos or queries to physicians to update documentation. However, if there is not enough time for the CDCs to review all of the physicians' charts, the CDCs will fail in this second role-action due to insufficient review throughput. Thus, review of the physicians' charts to determine the billing code represents a role-action that is a likely PBP.

A traditional solution to this situation would be attempting to teach physicians how to reduce the workload on the CDCs by providing better documentation, thus reducing the amount of time required for the CDCs to review the charts. However, this solution has a low likelihood of success as the physicians lack motivation to change their work practices for a non-medical objective (the objective in this case being documentation accuracy, which helps support revenue). Another way of viewing this is that adding the role-action "training physicians to document" to the process would likely create another PBP rather than facilitating the execution of the existing role-actions. A more efficient solution would be to provide a DAP to the physicians that provides the information required to complete their improved documentation. Additionally, providing physicians with the information to improve their documentation results in a role-action that directly impacts a sensor and a benchmark for the profit-maximization business objectives, as opposed to the indirect impact (and risk) offered by training the physicians.

Selecting the solution with the highest likelihood of success represents the next element of the TIMSA-DAP methodology. In order to determine an appropriate solution, each role-action is analyzed by assessing the resources available for the action. One method for doing this is to assign each role-action a series of numerical values representing the availability of the time, information, motivation, skill, and authority resources needed for executing the role-action. Assigning numerical values allows a quantitative evaluation of which role-actions are more likely to represent a process breakdown point. These role-actions will be the most likely targets for reinforcement via a daily action plan.

In a healthcare billing example, the role-action of reviewing the physicians' charts would receive a very low scores in available time (for reviewing charts). This role-action might also receive a low score for available skill, since the physicians lack the training to use the exact wording necessary to follow standardization rules. Other role-actions may also score low in the process, such as the CDCs. For instance, although they have expertise in the "exact wording," the gap that still needs bridged is there indeed something necessitating that wording, as the CDCs lack the medical clinical expertise to efficiently review the physicians' charts. Note that these low scores not only indicate a PBP, they also may provide insight for an appropriate solution. The appropriate DAP needs to reduce the time requirements of the CDCs and needs to enhance their skill. Thus, an appropriate solution is to request that the physicians provide specific pieces of additional documentation. This is within the skill of the physicians and reduces (or eliminates) the need for the CDCs to review the charts as the information for determining the correct billing code will be readily apparent.

In order to deliver these 'appropriate' DAPs to the physicians, the content for the daily action plans must be developed. Here, the desired daily action plan prompts physicians to document the presence or absence of additional information or treatments that influences the service that will be billed for. The first step in developing the DAPs is to gather any necessary information. This is done using a text scan mechanism, e.g., keyword parser, natural language processor, or search engine, to scan available records regarding the patient. These records include the patient's prior medical history, any documentation developed during the current hospital stay (e.g., lab results, physician dictation transcriptions), and in alternative embodiments, other sources of medical data as may be appropriate for a specialty practice.

The gathered information is then used to identify correlated factors within the patient's records that indicate an alternate or secondary diagnosis that could result in a higher billing code being available. Based on the initial billing code (which is based on the initial treatment description), the patient's records are searched for keywords or phrases that could indicate correlated treatment possibilities, such as co-morbidities, additional factors that complicated the treatment of the patient, or typical treatments that accompany or serve as follow-up to the treatment described by the billing code. The correlation keywords or factors are stored in a pre-constructed database, or knowledge base. If any correlated terms are identified, an entry is placed in the daily action plan for the treating physician so that the physician can investigate or confirm the potential correlated treatment. The DAPs constructed in this manner are then delivered to the appropriate roles so that the role-actions in the DAPs can be executed.

The TIMSA-DAP methodology also involves ongoing monitoring of the success or failure of the DAPs in overcoming a process breakdown. Once a breakdown point is identified and DAPs are issued to facilitate execution of the problem role-action, the sensors associated with the process are monitored for improvement. If the DAPs are successful in removing the process breakdown, the only remaining action is continued monitoring of the sensor. However, if the breakdown in the process is still occurring, the TIMSA-DAP methodology is applied again. The role-actions may be evaluated again to assign different resource values (i.e., resources being available time, information, motivation, etc.) based on any additional available information regarding the process to try changing the "TIMSA angle" of DAP entries. Alternatively, if role-actions are assigned the same resource values as before, new role-actions (in the form of new DAP entries) can still be added to address resource shortages for new and additional role-actions that can repair and reinforce the process. It is noted that this gathered data may be stored in, and retrieved from, correction data storage mechanisms and processes, e.g., data bases, memories, and the like.

In accordance with a preferred embodiment, the "evolution" of a self-reinforcing and self-improving process involves two aspects: a "Data Hooks" subsystem or stage, and a "Results Hooks" subsystem or stage. The Data Hooks stage develops a Knowledge Base (KB) of how to extract and integrate data available, usually at least from different files, but often from different systems and even human roles—taking whatever useful data exists and in turn making usable input data for the process. This "automated systems integration" is accomplished by basically adjusting a series of "configuration" (CFG) files that will serve as a set of client-specific parameters for key TIMSA-DAP program files.

Data Hooks enable a sort of "Plug and Play" into the current data in order to be able to create DAPs. The Plug and Play is enabled via Similarity-Based Learning (SBL), similar to Neural Networks except that it is given a priori knowledge in order to reduce the number of training examples necessary before useful results can be obtained. The a priori knowledge consists of "markers" such as proper nouns that are utilized as likely reference points, in order to see where names (and, therefore, entity separators between individual records) may be in semi-structured or even unstructured text.

In one embodiment, questions addressed by the Knowledge Base include:
1) Which model is most similar, and thus most applicable, to this domain and also the specific situation?
2) How should the CFGs be adjusted based on input "training" data?
3) What Program (PGM) and CFG file components should be added/removed in Batch Files that dictate overall process execution?
4) How close does the process configuration's output come to the desired proper output (i.e. what is the error signal)? If the configuration's output is not correct, then the process will examine each intermediate step's output, and see how they diverge from the expected output.
5) How to adjust the CFGs/Batch files by swapping out lines, strings, and substrings to try re-running (such as trying next most likely field, or swapping things)—in short, how to tune and iterate?

Thus, some set of marker "sub-strings", words, phrases, and sentences "imply" or "indicate" a field or parameter, which is in turn then inserted into the CFG—then iterating from there. In one embodiment, data formats (currency formats such as dollar signs, conventional date formats, etc.) and other qualifiers are used to indicate a field or parameter. That is, after seeing what the end results are, these results are compared to given examples or user (role) feedback, all towards systematic improvement of the parameters to eventually extract, collate, and digest information to create the best input data for the next stage—the Results Hooks. By using such qualifiers, the need for human intervention to determine fields or parameters from the data is reduced or eliminated, with system 100 iteratively mining the data for such fields or parameters instead. Once this process-specific Data Hooks KB is completed, DAPs can be prepared, although the DAPs at this stage will not yet contain information that will deliver results.

Results Hooks help the previous stage (i.e., Data Hooks) data to deliver actual results. In contrast to Data Hooks, the Plug and Play here uses historical data and outcomes not to integrate data to create DAPs, but rather to derive tactics that utilize roles and actions to solve problems and capitalize on opportunities. Results Hooks are used to create the benchmark-improving portion of the knowledge base. It is the system's basis for creating a "bottom-up" strategy formulation, using "automated tactical derivation" (i.e., looking at data and factors involved to create Consolidated Countering Tactics as well as all possible tactics). Ergo, a strategy is deployed based on the specific situation involved. For example, the historical data may show that personnel who have already reached an overtime threshold are nonetheless being assigned to double-shifts. This information need not be obtained by human interviews, but can be derived by mining data to determine which personnel are working greater than eight hour days, which personnel are working greater than 40 hour weeks, which personnel are assigned to consecutive shifts, and the like. A goal for minimizing personnel costs is reducing the amount of double-shift work by people on overtime, since they need to be paid more for each hour they work than people not on overtime. A first level of a priori knowledge that can be applied is that if people on overtime are getting assigned to double shifts, the scenario is likely either that the supervisor is asking people who are already there to work another shift, or that people who are already there are volunteering for another shift. Through further qualification and data mining, it can be determined which of these scenarios is likely to be taking place. Thus, if the same person consistently works double-shifts only when they are already at overtime, the suggestion is that the person is "gaming the system" and volunteering in order to maximize income. If such person works double shifts regardless of whether the person has reached the overtime threshold, the supervisor is likely asking that person to work double-shifts, and may be showing favoritism. If the person does not work double shifts more often than other workers, there is an indication that the supervisor may be simply asking anyone who is nearby to work an extra shift. Daily action plans can then be crafted to match each particular situation, for instance addressing information and authority angles by telling the supervisor which personnel are already on overtime and forbidding double-shifts from being assigned to overtime personnel without additional authorization being granted. Human intervention is minimized in the process, and less subjectivity is injected in the process, because the supervisor's actions and intentions are derived through data mining rather than through interviews with the supervisor and/or the people who are working the double shifts. Results Hooks processing also identifies other root causes of process breakdowns. For example, data mining may indicate that whenever a particular supervisor is working with a particular dispatcher (i.e., the person who calls workers for fill in shifts), the overtime/double shift problem is exacerbated. However, there is no statistical degradation when either of those people works with someone else. Therefore, this set of role-actions is disfavored.

The system takes the current process being reinforced and compares it to the process objectives and/or the a priori knowledge to see the "gaps"—this will then be used to determine how to support/enhance the process. Thus, the system does not need to determine the entire process if those portions are not problematic nor tightly intertwined with the portions requiring support. The system instead looks at what it does know and examines how to make those things better by finding Potential Breakdown Points (PBPs) through its data analysis phase. In other words, the whole process in question does not need to be documented, but rather the system can focus on the underlying role-actions that need support.

This is done by harnessing correlations of role-action configurations to the desired outcome of the process—how close this configuration comes to the ideal result. Role-action configurations includes the "opportunity profile" (OP) of the situation, such as there is an overtime cost problem for the temp agency staffing personnel, as well as the current TIMSA assessment of each role in the process. According to TIMSA, opportunity profiles are "apples-to-apples" if they have similar factor variables (e.g., Is OT involved? Are the same roles involved? Are the same problem components involved? etc.) If they, however, contain less of identical factors (and more of completely different ones), then the less apples-to-apples the opportunity profiles are and the less priority TIMSA will place on them in using it in the comparison to direct and evolve the process.

Over the long-term, the goal is to improve the results to optimal efficiency given role-specific DAPs that distill and crystallize role-actions onto one page. TIMSA examines both combinations (what is the expected set of role-actions) and permutations (sequences of these role-actions) to figure out the best way to reinforce processes having multiple roles involved. One common issue that arises is determining the error signal for a specific configuration (of OPs joined with a series of role-actions) and finding out the best way to evolve the process, given the historical data and the degree of error signals with that given configuration. Whereas the a priori knowledge addresses a general role, correlation of particular roles with success/failure leads to a second level of optimization. Continuing the example discussed above, problems with a particular supervisor or dispatcher can be distinguished from problems related more generally to supervisors and or dispatchers.

Process evolution starts with TIMSA reinforcement for each specific role, using some set of tactics (defined as a role-action). Utilizing Pareto's Rule "squared" (4% of the tactics should yield 64% of the value) as the foundation—minimize the tactics employed but maximize the positive impact of them. If after 4% of tactics are tried for a role and the success rate is still not improved, the process starts looking at other role-actions to take over (or "bypass" the role). After this 4%, TIMSA begins to spiral outward to Pareto's rule of 20% of the tactics (striving to yield 80% of the potential value). Bypassing means determining the set of all possible role-actions, and determining the best sequence of them (i.e., which role-actions to add, remove, or switch).

Given that certain situations call for a particular TIMSA sequencing for a specific role action (i.e., figuring out the order of TIMSA elements and the potential blending of them—thus, the sequence and degree of emphasis of each criterion), optimization is done to find the right blend. For example, a process can always start with the Time barrier, but other barriers might also be blended in, and based on feedback, a criterion such as Motivation may take on increased emphasis. Moreover, the determination of the ideal set and sequencing of all role-actions also requires some form of optimization. This blending is achieved to the optimal "equilibrium" based on arbitrage, or "dynamic scoring" as discussed below. Return on investments (ROI's) based on a priori knowledge derived from accrued domain experience, historical client data, or ongoing user feedback data helps accomplish this.

Consider a scenario with two competing objectives—minimizing time (less reading DAPs) and maximizing information (e.g., audit trail). In a preferred embodiment, system 100 stochastically and adaptively experiments on a role to determine with what kind of information the role responds best. In another scenario, the system 100 keeps track of the successes of every reference role. References' role-actions are chosen stochastically based on recent history of successes, so consistently unsuccessful actions/references have progressively smaller chances of getting chosen.

Examples of process analysis for various roles are provided below.

Doctors Role possible outcomes:
1) Convinced, and approve DAP entry—dictate addendum
2) Convinced, but want chart for final assurance—then may write in addendum (still want dictated if possible)
3) Deny DAP entry (an example of a "no-fault" Process Breakdown—that is, they participated, but there was no realization)
4) Ignore DAP entry (e.g. they don't send back an approval or denial, and there is no other feedback of their implementing the role-action, so is an "at-fault" PB).

Billing Support Role possible outcomes:
1) Confirm Doctor's documentation change
2) Confirm Doctor's documentation change NOT done (no-fault PB)
3) Don't confirm Doctor's documentation change (at-fault PB)
4) Run chart to doc if requested
5) Run chart to doc if requested NOT POSSIBLE because chart missing, so reply back as such (no-fault PB)
6) Don't run chart to doc if request (at-fault PB)

Reference Role possible outcomes:
1) Reply and provide reference to doctor when requested
2) Reply, but can't provide reference based on what doctor is requesting (not their fault, not responsible for PB)
3) Ignore reference request (at-fault PB)

When a process appears to be successful for each individual role, but in its entirety does not lead to revenue realization, it is considered a "no fault" process breakdown, which suggests that a high ROI opportunity and tactic were not chosen. For example, a role could have 100% participation rate, but no revenue realization. In such circumstance, a low ROI item may have been chosen, or post mortem analysis of failed items may be called for (data mining), comparing roles for comparable opportunities and similar role-actions (apples-to-apples). If everyone is having problem with a given tactic/role-action X, then the action is probably flawed for this particular situation or this "general" role. However, if only certain people are failing on the same tactic, then a more role-specific problem likely needs addressed, such as implementing a contingent process to educate the role (using TIMSA criteria via DAP entries). Combination of factors, as well as different role sequences, are considered in the analysis, as discussed herein, using such methods as Latin Square Method or some means of performing intelligent search (that can derive the best configurations) rather than using "brute force." Process analysis/progress measurement objectives include considerations of:
1) Who is participating in the process?
2) How much are they participating? (response/participation rate)
3) How well are they participating? (realization rate)

The above help identify PB's (using TIMSA) and determine which roles are breaking down (at-fault and no fault). Note that Ref 1 represents a role that can find and provide a reference to support the use of the treatment being billed with the given diagnosis that was documented and that cannot, it turns out, be changed.

For example Tactic X:
Doc 1–Bill 1–Ref 1–Exec 1=Failing
Doc 2–Bill 2–Ref 2–Exec 2=Succeeding (then all #1's are failing for some reason)
Doc 1–Bill 1–Ref 2–Exec 1=Succeeding (then the "weak link" is Ref 1)

Process repair involves not only finding the "weak link", but also trying to figure out "how to strengthen the link." Both can be addressed by determining the common denominator that is causing the failure, which in a preferred embodiment involves TIMSA analysis and DAP evolution. TIMSA serves to reinforce a failing role as much as possible and, as needed, bypassing that role. TIMSA identifies available capacity and tolerances for additional work as required to reinforce a failing process. In a preferred embodiment, a first stage of process repair involves keeping the same role and the same action but changing the TIMSA blend on the DAP, e.g., adding more information to help the role justify the action. A second stage involves changing the action for the given role to improve effectiveness; a third level is changing the role for a given action. Should none of these prove sufficiently effective, both the action and the role are changed, effectively evolving the process by changing the tactics employed. This evolution may in some embodiments follow a different path depending on the data available to be mined and the scope of a priori knowledge. For example, if a supervisor is failing in preventing double shifts for overtime personnel, there may be an administrator's secretary available to call in (a new role) earlier in the process than would be appropriate if the only alternate role were a dispatcher. In another situation, the administrator, whose job depends on avoiding cost over-runs, might be called in to participate directly at an early stage due to a priori information about the administrator's high motivation to solve this sort of problem (relative to the other roles involved).

In a preferred embodiment, Results Hooks are implemented in three steps: analysis, strategy, and backup/follow-up. Analysis includes looking at the findings and factors, then cross-referencing with each other as well as rules to determine an optimal course of action that should be undertaken based on these findings. Strategy includes how to best implement this course of action, in terms of correct application of tactics at right time with right person in right manner, etc. Follow-up/Back-up includes ensuring that the action is done by a role, and if not having a role see that and/or do that for the failed role-action.

System 100 evaluates the strengths, weaknesses, opportunities, and threats of the role and role-actions that can be performed to counter a problem scenario. In a preferred embodiment, daily action plan generator 120 of system 100 limits daily action plans to a single page so as to maximize the utility for, and "mind share" of, the role to be using the action plan.

A process breakdown is prevented or repaired whenever a role-action A is either enabled by a DAP to lower barriers, such as insufficient time or incentives, or supported by backup. In a preferred embodiment, performance monitoring over time may indicate that a process breakdown results primarily from a role that is not reinforceable (e.g., is consistently failing to perform role-actions successfully which are implied to result in desired outcomes). In these instances, a new breakdown issue to be addressed becomes determining how to bypass the problem role with another role that can perform the action. Even though a role may be eventually bypassed, overall process reinforcement is still occurring.

For example, if Reference Role #1 is not motivated or does not have enough time (so Motivation and Time TIMSA barriers), then eventually TIMSA will look for another Reference Role (e.g. Reference Role #2) who will also be able to provide a reference for the process—using an "apples-to-apples" comparison of TIMSA role profiles. TIMSA will need to evaluate the TIMSA role profile for Reference Role #2, to ensure that it also does not have the same TIMSA barriers as Reference Role #1 (Motivation and Time). If for some reason both Reference Roles have the same TIMSA barriers, then we would have to assume that Reference Role #2 will not be a good choice to reinforce or bypass Reference Role #1, given that we have not found TIMSA barrier-reducing means for these barriers' resource constraints for the previous role.

Furthermore, if all roles are falling short on Time and Motivation, then there are two options: change all the roles (which is not realisitic in many situations) or change the action (because ROI for the role-action is not good given these resource constraints). However, if Reference Role #2's TIMSA barriers are different (Skill and Info, for example) from Reference Role #1's then Reference Role #2 is potentially a good candidate for what the TIMSA methodology can enable, assuming that no degradation in the current output/process success rate of Reference Role #2 occurs as a result of the additional role-actions being delivered to it instead of Reference Role #1.

Every possible role and action in a process can be considered like a node in a network, each having potential TIMSA barriers, or resistance levels. In accordance with a preferred embodiment, the path of least resistance that will allow the overall process to be reinforced or intended goal to be accomplished is what is sought.

Further elaborating the above Reference Role example, for a given tactic X comprised of four role-actions by four distinct roles (Doctor, Billing Support, Reference, and Executive), upon analysis of various combinations of role-actions and the resulting success of the overall tactic, it can be determined that Reference Role #1 currently has 100% resistance (e.g., causing the process to break down every time), or in terms of success rate for the process when this role is involved, 0%. However after determining Reference Role #1 is the cause of the process breakdown, Reference Role #2's TIMSA profile will be analyzed, and if determined to be a good candidate to serve as a reinforcing or bypass role based on its TIMSA barriers, Reference Role #2 will be tried.

Initially, a role-action for Reference Role #2 may be one that merely serves as backup for Reference Role #1. Over time, it may become evident that Reference Role #2 should bypass, rather than merely back up, Reference Rule #1. In such instance, it may make sense for Reference Role #1 to become back-up for Reference Role #2 or it may make sense to fully bypass Reference Role #1 and drop its role-action entirely.

Furthermore, historical data on the success rate of a given process when Reference Role #2 is involved can be evaluated, and in this example the process has 100% success rate, or 0% resistance when Reference Role #2 is involved. Therefore, TIMSA will bypass Reference Role #1. It is noted that the success rate and optimal combinations of roles and role-actions can be derived, depending on the particular circumstance, using multiple conventional techniques such as gradient descent, Latin Square etc. These decisions are based in a preferred embodiment on historical data or, if such data are not available, heuristics. As described above, dynamic scoring can also be used in preferred embodiments to take advantage of successful role-actions and minimize those that are not likely to succeed.

In economics, arbitrage is the practice of taking advantage of a state of imbalance in multiple markets, such as where a stock can be bought at one price in one market and immediately sold at a higher price in another market. One known aspect of arbitrage trading is known as "pairs trading" and involves identifying and using correcflations between two securities. For example, if the stock of one automobile company rises, there may be a strong chance that the stock of another automobile company will also rise. In the short term, there may be events that cause the pairs to diverge, but based on history, they will once again converge before long. For example, a serious safety recall might negatively impact only one of two automobile companies for a short period of time, but in all likelihood the stock performance of the two companies will soon begin tracking each other once again. Predictions about the performance of the company with the recall can be informed at least to some degree by knowledge of performance trends of the company without the recall.

Typical securities market arbitrage schemes seek to benefit the arbiteur but not necessarily the overall market. In contrast, processing in accordance with the present invention explicitly seeks to identify and make use of labor arbitrage opportunities to the mutual benefit of all the impacted resources.

Prior uses of arbitrage, including those in the above-reference patent applications, did not consider both supply and demand, but focused on more simple issues, such as allocation of shift labor. As described herein, in a preferred embodiment arbitrage processing takes into account both supply and demand factors to improve healthcare-related processes.

In a preferred embodiment, process mining is used to review historical data in order to extract information by identifying patterns or relationships among variables. Known systems use event logs to identify certain patterns or relationships, as such logs already collect information categorizing an occurrence and indicating its time, date and location. Process mining in a preferred embodiment takes this information and processes it in combination with information from a knowledge base in order to provide probabilistic causality predictions (i.e., cause-effect relationships), as well as ascribing "comparability" factors to actions performed, such as by use of tagging and ontology analysis.

Process mining commences with review of existing data. Pre-processing may be called for in some instances where data transformation, selection of data subsets, or variable selection is needed to identify the most appropriate data for processing. For example, in typical situations it is appropriate to pre-process patient data by stripping out variables relating to the patient's home address, as that information may be unrelated to the process being improved. In other circumstances, patient address data may be critical (e.g., for processes where patient "no-shows" are disruptive to practice efficiency, knowing how far patients are traveling may be important). Exploratory analysis is used to identify the most relevant variables and the complexity of the models needed to identify relationships and patterns in the database. Next, a validation stage of analysis is undertaken by applying analysis to historical data and checked to see which of a pool of potential forms of analysis provide the best results in predicting other known historical data. For example, certain characteristics of particular caregivers may be highly important to efficiency in one process but not in another. By testing to see how a particular past process could have been predicted by one of several models, a best model for predicting performance is selected. A third phase of process mining is to use the identified patterns that are selected as best and apply them to new data to create predictions of expected outcomes.

In a preferred embodiment, process mining identifies best paths by examining key metrics in a case evolotion timeline or CET, i.e., a correspondence among a set of capabilities (e.g., role-action pairs), their "deltas" or the additions/subtractions applicable to them, the comparable capabilities surrounding them, and the causalities connecting them in handling a case.

An ontology is used to correlate as well as disambiguate information pertaining to a CET, such as noting that a references to White Blood Cell (WBC) and Complete Blood Count (CBC) can be combined, as a WBC is part of a CBC lab test.

In one embodiment, process mining includes a number of steps. First, a calculation is made of opportunity costs resulting from indicated projected path v. viable best path, based on expected values (probability of best path viable multiplied by value of path) minus (probability of projected path multiplied by value of path), based on indicators. Next, stagings (case timeline samplings and filestamps) are determined at a time period, or in an alternate embodiment event-based dependent on criterial or thresholds. The above-referenced deltas are then determined, as are causalities, possible actions being done or not being done, for actions, and then role-actions via TIMSA processing as described herein. Equivalent sets of items are related via ontology using conventionally available ontology sources determined by the end user. Hypotheses are then tested with histories. Confirmation is then obtained by communicating, e.g., via email, with the individuals managing those involved, using closed- or open-ended questions (a response to the latter is then mined as well to extract some meaning). Should no response be received, a backup monitoring person is tasked to reply. Based on the information thus obtained, a process network topology is developed, including critical path, TIMSA per node, and capabilities library.

Correlation factors considered to determine causality and comparability are necessary conditions, sufficient conditions (e.g., where there are multiple possible condition causes resulting in one condition effect, as in an "OR" boolean condition), qualified and disqualifier conditions (those that are, respectively, only or never seen with success), necessary and sufficient conditions, single determined cause-and-effect, and required causal factors for a single effect (all necessary causes to only one possible effect, including time ordering considerations, as in an "AND" boolean condition).

Figure 2:
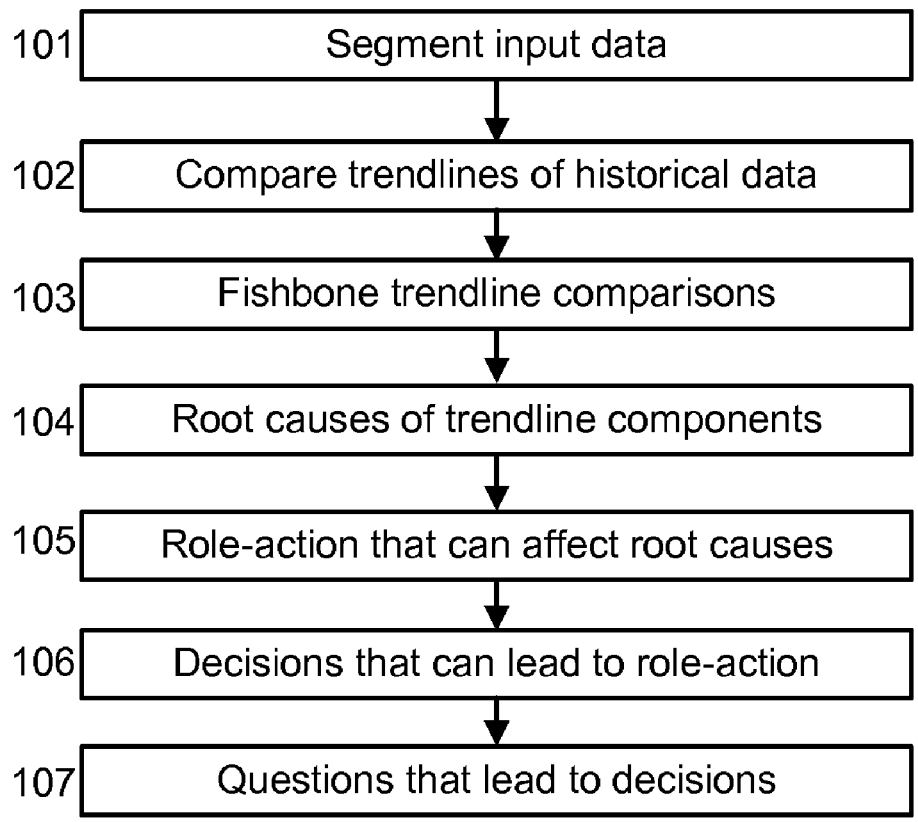
FIG. 2 is a flow diagram of identifying process breakdowns according to one embodiment of this disclosure.

Referring now to FIG. 2, there is illustrated a method for identifying process breakdowns via process breakdown identification subsystem 110. First, the input data is segmented 101 into identifiable "slices" based on experience encapsulated in the existing knowledge base. Then, the methodology compares 102 trendlines of historical data or training data (planned vs. actuals, one unit vs. the entire facility, facility vs. nationwide average, etc.). Next, these comparisons are fishboned 103 (e.g., determine what are the elements that comprise each of the trendlines) and the results of the fishbone lead 104 to the potential root causes. This then leads 105 to the specific role-actions that can be applied to affect the root causes. The role-action(s) that can affect the root causes are then identified 106, and a list is created 106 of potential decisions that could be made to actually perform the role-action, so therefore, each of the potential decisions has a list of potential questions that could be asked 107 (e.g. its underlying components) to lead to those decisions.

In one embodiment, comparison 102 includes evaluating absolute and relative trendlines for degree of gaps, convergences and divergences. Also in an embodiment, arbitrage is used in optimization to help reach an equilibrium point between the pros and cons of the tradeoffs for a role and its TIMSA criteria. Such arbitrage is used between costs of problem scenarios (or factors underlying same, the potential values of tactics, and finally possible likely configurations (i.e., sequences of tactics)–all to balance requirements (min/max constraints) while reducing trendline gaps from comparison 102 to zero.

For example, if a facility is experiencing overtime salary use of $1,000/month (based on the staffing used and poor decisions made by managers to inefficiently allocate resources), this current process, coupled with the need for improvement of the facility, could be considered the "buyer" in the arbitrage, bidding for a better process. The various tactics (role-actions), each with associated ROI's that provide a valuation means, are essentially the "sellers" that are competing to reduce this $1,000/month sensor for this given situation. So here TIMSA, looks to match the best tactics and role-actions (or merged groups of them), arbitraging the difference, so in order to bring the sensor and the gap to zero in a way that best balances all the competing forces.

In a preferred embodiment, countering tactics are generated using a "bottom-up" strategy formulation based on data analysis. One embodiment makes use of a Consolidated Countering Tactic (CCT), which is one or more factors that lead to countering tactics that when merged together create a CCT. In a sense every DAP is a CCT, because it contains the consolidated tactics (or actions) for the role to do to counter a single role's breakdown possibilities.

In a preferred embodiment, TIMSA evolution involves iteratively learning what to include on the DAP and what not to include, as well as instructing the role on what to do and what not to do. If time is spent on role-actions that are harmful or not useful, then opportunity costs arise, which are counterproductive to TIMSA-DAP's objectives.

As an example, consider the action of Role #1, Doctor X, to specifically document Pernicious Anemia (which is of higher value than another Anemia diagnosis) is present in a patient record (or patient scenario). Upon analysis and sampling of the past 100 patient records, it is found that other doctors involved in this type of billing claim are successful in documenting Pernicious Anemia, but Doctor X is not. The TIMSA evolution might look like (that is, in an unregulated world, or else billing upcoding could be a concern. Thus, below example is for illustration purposes only!):

Since current tactic has never worked on claims sampled, try Skill with training support elements in DAP entries, like "If you agree, please write pernicious anemia . . . ".

If the Skill tactic still not working, try Authority, with pre-authorization instruction on the DAP-entry, showing desire by management, such as "This is already approved by management. If you agree . . . ".

However, questions come back from Doctor X on concerns as to why, so try Information, by showing the audit trail justifying reasons, such as "this is suggested by the hemoglobin levels=x.x, hematocrit=x.x, dictation not noting any bleeds, etc. . . . ".

Now, the tactic starts working on occasion, but there is still low tactical follow-through, then try Motivation by connecting elements between the effort needed and a good reason/value for exerting that effort (such as recognition, targeted incentives, scoreboards, etc.), such as "This entry is for a $100 billable item, and would put us over last month's total".

Now, the tactic starts working well for Doctor X, but the success rate starts to fall over time, coinciding with an increasing number of tactics going to Doctor X, so try Time, by providing "head start" or automation items, such as an assistant being told on their DAP to take the chart to the doctor. If still ineffective, then try combinations of angles to maximize effectiveness while simultaneously minimizing content that is "noise" (such as removing skill & authority angles, initially, then as DAP items are more trusted, reducing information and motivation items, and just focusing on the time angle).

Figure 3:
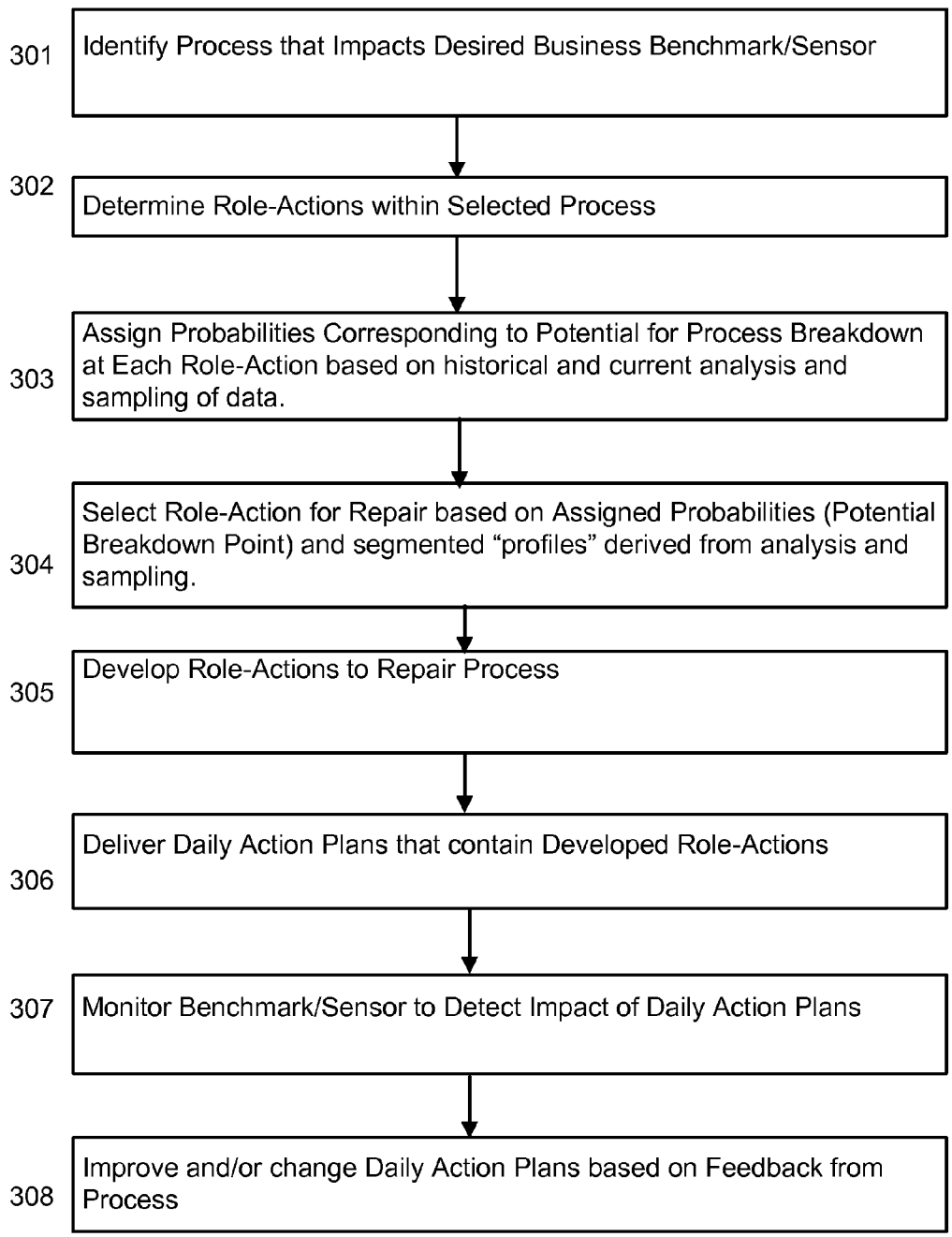
FIG. 3 is a flow diagram of overall TIMSA-DAP processing according to one embodiment of this disclosure.

Referring now to FIG. 3, there is shown a flow diagram of overall TIMSA-DAP processing in a preferred embodiment. First, a process that impacts some desired business benchmark/sensor is identified 301. Then role-actions with the selected process are determined 302. Next, probabilities are assigned 303 corresponding to potential for process breakdown at each role-action based on historical and current analysis and sampling of data. Next, a role-action is selected 304 for repair based on assigned probabilities (potential process breakdown point) and segmented "profiles" derived from analysis and sampling. After that, role-actions are developed 305 to repair the process, daily action plans containing the developed role actions are delivered 306 and benchmark/sensor monitoring is done 307 to determine the impact of the daily action plans. Finally, the daily action plans are improved/changed 308 based on the feedback from the monitoring 307.

Taking the example of using a preferred embodiment to reinforce processes with a goal of revenue improvement and billing claim denial management, data analysis entails reviewing billing claims and segmenting them into three buckets: denied, upgradeable and already maximized. The value of a denied claim is the total claim value, while the value of an upgradeable claim is the difference between the amount already approved and the amount that could be achieved.

Next, conventional correlation processes are used to determine which factors cause claims to fall into the identified categories. Conventional correlation also provides sensitivity analysis, i.e., the significance/frequency aspects of each factor. Based on this, conventional ROI analysis can be used to determine which factors are the best candidates to address in repairing the process. This analysis also allows identification of claim profiles to use in the future as flags for intervention with DAP tactics. Accordingly, relevant factors for each category are extracted, such as aging bracket of accounts receivable, payor, diagnosis, physician, team handling patient, reason for denial. Factor correlations are then computed for each category, which leads to key factors and profiles as described above, each of which can be addressed by tactics.

In a preferred embodiment, ROI is determined as: (Frequency×Value×Tactical Success Rate)/Tactical Investment. Frequency is how often the problem occurs. Value could be the dollar value–how much the solution is worth. Tactical success rate is the effectiveness of a DAP tactic in solving the problem (preventing the process breakdown). Tactical Investment is how much effort (in whatever form measurable, such as minutes required to perform the action) is required to solve the problem.

For example, there are two claims (A & B), both with 15% frequency and worth $1,000, having a tactical success rate of 80%. However, Claim B could be prioritized over Claim A if Claim A would require 4 people to fill out forms to resubmit (HIGH Tactical Investment) and Claim B would only require one person filling in a missing entry on a claim (LOW Tactical Investment).

Examples of how DAPs are initially and iteratively tuned include:

Time Barrier (tasks are prioritized on DAPs based on ROI and only a certain number of tasks are listed on the DAP in the first place; finally, some sort of "head start" is included in the findings).

Information Barrier (including a detailed audit trail on the DAP that shows the exact elements leading to a specific recommendation—"because of lab value X being low we believe condition Y is possible". The goal to overcoming the Information barrier is to provide the justification to perform the action).

Motivation Barrier (that is, have some "progress detailer process" to note follow-up/backup, value of task listed, with targeted incentives % or amount related to bonus/recognition detailed).

Skills Barrier (for instance, conventional spreadsheet or similar analysis using macros or the like to do the numerical analysis, or findings file for more detailed instruction, or a link to a Video Training Clip).

Authority Barrier (an automatic request for email approval, after which if approval is taking too long, look for response from a follow-up role).

As previously discussed, in a preferred embodiment iterative monitoring and tracking overall performance is employed with a feedback loop for iterative learning. For instance, if everyone except person 1 is successful with a certain profile claim, then it is likely there is a TIMSA factor involved with that person 1 role. So then the learning mechanism, initially starting with heuristics, looks at patterns over time for that person as it tries adjusting the DAP. Here is an illustrative progression for a preferred embodiment:

If the action portion of a tactic fails consistently across all roles, then that action is likely ineffective, but if it is just one role, then likely a problem with skill.

If there are questions from a single role who is failing with a tactic, then an information or authority issue is indicated. If, after skill, authority, and information angles are all addressed and monitoring shows that the role is still not responding to the requested action, a motivation issue is indicated.

If many tactics fail for that person on the same day that historically worked in the past (i.e. see fall-off in success rate as quantity of tactics assigned to role rises), then time is likely an issue (especially if there were a greater than normal number of tactics that day). Time is also indicated in situations where a tactic fails randomly.

Based on the above considerations, various DAPS are generated for the personnel in an organization. In a preferred embodiment, a DAP is a one-page or smaller printout for each relevant person in the organization for each day, listing the person's name, position (role), facility, date, and two categories of information: key metrics and actions required. Using the example of a staffing coordinator, key metrics are such indicators as hours of overstaffing from timeclock overages and overstaffing from excess unplanned assignments. Corresponding action items in such example are indications of which employees are not accounted for (so as to ensure they are considered for availability in the future), which employees were overtime in their shift length (for follow-up as to reasons why), which employees worked an unscheduled shift (again for follow-up), which upcoming shifts appear to be short (with contact information for potential fill-in staff), and which potential morale problems are identified based on criteria such as too many or too few shifts worked, shifts scheduled that conflict with the staff members indication of "unavailable", and "split weekend" schedules (again with contact information to permit follow-up with the impacted staff members).

Based on this example, historical and current data analysis and sampling in a preferred embodiment includes historical and current analysis of data, such as analyzing planned and actual overtime (OT) trendlines for signs of convergence or divergence. Once that is complete, segmented profiles and applicable tactics are established, such as staff receiving OT and staff not receiving OT, staff available to work extra shifts, and those who would be on OT if they did work extra shifts. In this example, a hypothesis based on a priori knowledge for the problem scenario was that staff already on OT (planned) were receiving more actual OT. For this example, a problem scenario was that the execution roles (staffing coordinator and night shift supervisors) did not know the plan (e.g., those staff already on OT), and did not realize that these staff were getting more OT by letting them stay longer or stay for extra shifts. Another problem scenario was that staff who were not on OT were not being asked to fill in shifts, because the execution roles did not know these people were not on OT and were available to fill in shifts instead of the staff already on OT.

Still further in this example, based on the Problem Scenarios and TIMSA Criteria, tactics were developed by looking at the correlations between the factors causing Problem Scenarios #1 and 2 to the opportunity of the outcomes (e.g., the potential money that could be saved if all OT staff were replaced with non-OT staff). Additionally, if there was not enough staff, then everyone would be on OT and there would be no non-OT/OT segmentation split or any correlation at all. So the correlation was high between the tactics that could be done and the amount of savings that the tactic could enable (or opportunity costs that could be reduced). In a preferred embodiment, the tactics that represent the best blending of highest ROI and greatest chances of tactical success are chosen.

Taking the overtime reduction example a step further, the DAP for a supervisor provides, in a preferred embodiment, a list of staff members to call, with their phone numbers and total accumulated hours for the week, to reduce OT. The DAP also includes a list of staff members who should NOT be called, as they are already on OT.

Figure 4:
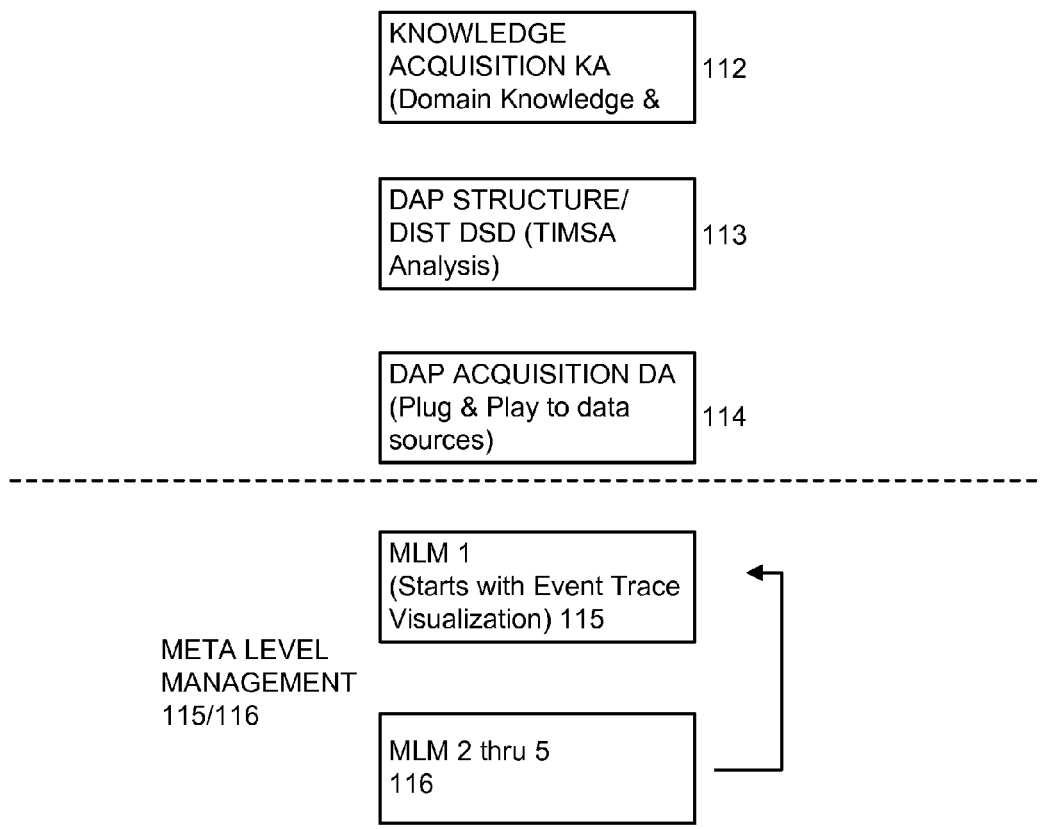
FIG. 4 is a flow diagram of processing according to one embodiment of this disclosure.

Referring now to FIG. 4, there is shown a flow diagram of processing in accordance with a preferred embodiment. The process of a preferred embodiment contains several steps that are undertaken initially, and then additional processing is done in an ongoing manner. Specifically, start-up processing includes knowledge acquisition (KA) 112, DAP structure/distribution (DSD) 113, and data acquisition (DA) 114, all as described more fully herein. Ongoing items are referred to as meta-level managing (MLM) 115, 116, intended to reduce reliance on human processes that are vulnerable to breakdown.

Knowledge acquisition 112 involves selecting an objective and a corresponding benchmark that reflects the objective. High/Low matrices of breakdown values and frequencies are used to determine the best problem to address, based on expected values. For specific benchmarks, corresponding domain knowledge is selected and process segments are defined for automating the overall process via the supporting system. Actions are then determined via a conditions list (fishbone) of sensors, and the corresponding tactic that reduces each sensor is also determined. From the identified tactics, prerequisite tactics and their branch values are also considered, as are possible roles that can undertake the relevant tactics.

DAP structure/distribution 113 involves developing a roles-TIMSA matrix using cost/quality/morale subdivisions for priority rankings per TIMSA criteria for each role, which can be data-mined (from past historical transactions and their outcomes, analyzed using a priori knowledge) or also developed conventionally through interviews and questionnaires. Next, an Actions-TIMSA Matrix is developed using priority rankings per TIMSA criteria for each role, developed conventionally via a knowledge base of accumulated rules or via strategist interviews. Processing continues by developing an initial Role-Action mismatch matrix for each TIMSA criterion and, in one embodiment, a revised version of such matrix as desired. The mismatches are then mapped to a breakdown probability matrix and, in one embodiment, the breakdown probabilities are cross-checked against historical sensor readings, with discrepancies resolved to the level desired. The DAP structure is then developed using a TIMSA criteria to DAP characteristic matrix.

Processing for Data Acquisition 114 proceeds by defining required data fields from DAP characteristics and tactics, breaking out the data elements needed for every tactic's finding and sensor. Next, matching is attempted between required data fields and available report information elements, with user confirmation or with user indication of which fields appear to be missing (possibly indicating which tactics may not be feasible). The "tri-ordinates" for necessary data fields, i.e., required data for the finding, required data for the sensor, and available data for the source data packet, are then obtained from the corresponding source data packet. The term "source data packet" as used herein refers to the set of input data for a process.

Processing for meta-level management 115 proceeds by developing a daily dynamic process in a conventional manner, i.e., PERT/CPM, Gradient Descent, Simulated Annealing and Genetic Algorithms, as appropriate for the given situation, and then performing daily output based on the same methodologies, i.e., event-trace visualization. Role-action failures are captured to enable correction for error signaling, that is, to determine a degree of failure such as from near achievement of success thresholds to absolute failure. In a preferred embodiment, profound error signals suggest different TIMSA issues than less significant signals. TIMSA data refinement is then performed based on inferences derived from monitoring the daily output, for instance suggesting a skills issue if there is error signaling indicating lack of perfection in accomplishing a task and suggesting a motivation issue if there is error signaling indicating that the task is not being performed at all. Processes are then tuned and repaired based on refined TIMSA data adding, dropping or switching tactics as appropriate, or changing their "angle" via the DAP structure (see DSD discussion herein). Processing then loops back to the initial portion of the meta-level management and is thereafter ongoing.

As an example illustrating this processing, consider a long-term care facility with a business objective of profitability that is sought to be improved. A typical benchmark for such example is the operating margin of the facility. Management identifies two areas as likely breakdown points: supplies budget and labor budget. A high-low matrix corresponding to this example is:

| High Cost Impact - Low Frequency of Occurrence | High Cost Impact - High Frequency of Occurrence |
|---|---|
| Low Cost Impact - Low Frequency of Occurrence | Low Cost Impact - High Frequency of Occurrence |

Developing Hi/Lo Matrix for Supplies:
If the dollar value of additional supplies purchased due to waste or theft in a "bad month" = $3 k, and the frequency that these bad months occur is 6 times a year, then expected value is $3 k × 50% = $1.5 k

| Hi-Lo | Hi-Hi |
| Lo-Lo | Lo-Hi: Value put here because is relatively high frequency, but relatively low max cost → $1.5 k |

Developing Hi/Lo Matrix for Labor:
If the dollar value of labor budget overruns due to agency and overtime in a "bad month" = $10 k, and the frequency that these bad months occur is 6 times a year, then expected value is $10 k × 50% = $5 k Thus

| Hi-Lo | Hi-Hi: Value put here because is relatively high frequency, and relatively high max cost → $5 k |
| Lo-Lo | Lo-Hi |

Thus, given the current expected value of the process breakdowns established for labor and supplies, labor is selected because it is higher in value. The next step is to determine a specific benchmark; select, if possible, domain knowledge; and then define a process segment for automating using system 100. Since in this example solving labor budget overruns was found to have the highest expected value to improve the facility, the domain knowledge is examined. Relevant "vertical" domain knowledge in this example includes typical financial statements and line items found, for instance, in hospitals. Relevant "horizontal" knowledge is known information concerning general related processes, such as inventory management. While in this example operating margin is the ultimate benchmark, the line item in the budget that is being overrun has its own component, called Direct Labor, that directly impacts operating margin, so this is the benchmark that is selected. As Labor is provided through a staffing process, this is the process that impacts the selected benchmark.

Now that this process is selected, it must be defined in a manner that permits automation. As an initial matter, the benchmark is cost-oriented, so guidance can be provided by any cost-related set of tactics that may be known (e.g., cost control tactics). These may need to be supplemented and adjusted to apply most effectively to Labor Cost.

Continuing with this same example, the process is next segmented to define it in a way that is capable of daily management. Here, segmentation is done by considering the process from various points of view: staffing; supplies process; billing process; cost control strategy; quality control strategy; opportunity control strategy; "yesterday review"; "tomorrow planning"; "today adjustment"; morning/afternoon/evening/night performance.

Figure 5:
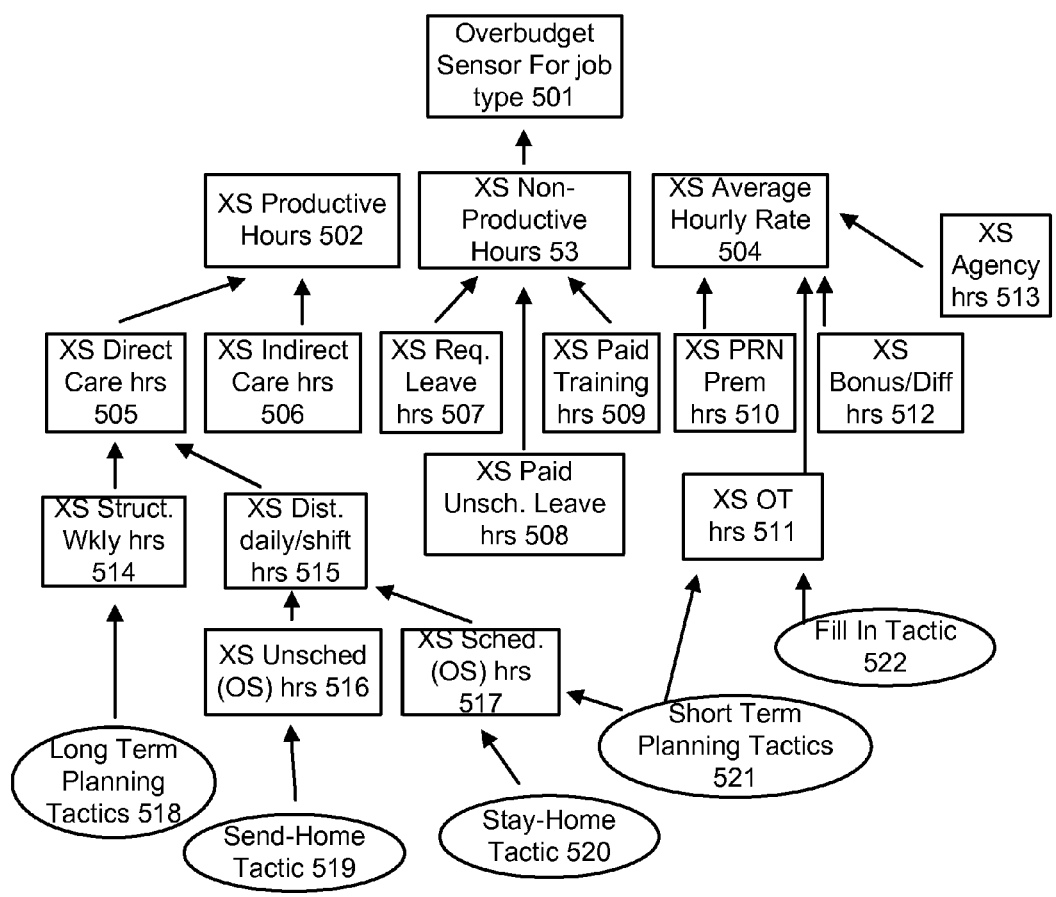
FIG. 5 is a diagram illustrating sensor conditions according to one embodiment of this disclosure.
Figure 6:
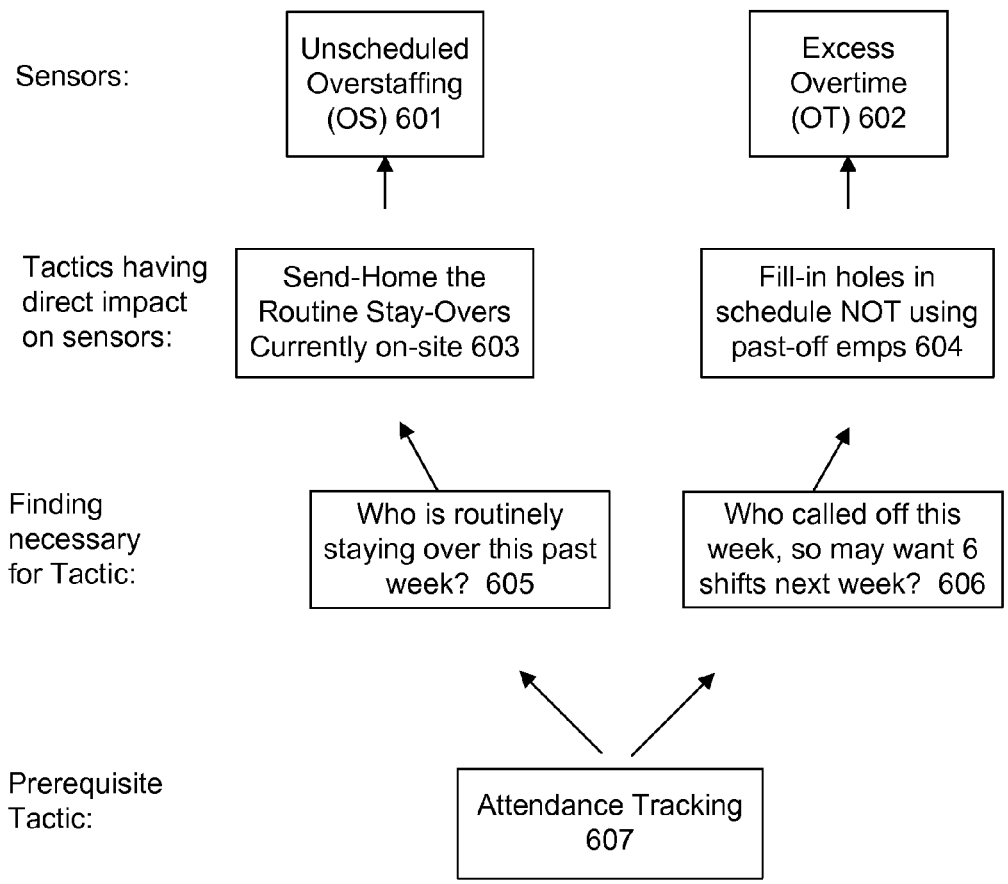
FIG. 6 is a diagram illustrating sensor, tactics, and findings according to one embodiment of this disclosure.

Processing continues by determining actions via a conditions list (fishbone) of sensors, and the corresponding tactic that reduces each sensor. First, a tree of factors, or a fishbone, is developed that can readily be translated into a conditions list of sensors (shown as boxes in FIG. 5) and the associated tactic(s) impacting the sensor (shown as ovals in FIG. 5). Note that in FIG. 5, XS is used to denote an excess quantity sensor, indicating the amount over a triggering threshold. FIG. 5 illustrates an over-budget sensor 501 and various components thereof, including productive hours 502, non-productive hours 503, average hourly rate 504, and subcomponents direct care 505, indirect care 506, required leave 507, paid unscheduled leave 508, paid training hours 509, PRN premium hours 510, overtime (OT) hours 511, bonus/differential hours 512, agency (temporary staffing) hours 513, structural weekly hours 514, distributed daily shift hours 515, unscheduled staffing (OS) hours 516, long term planning tactics 518, send-home tactic 519, stay-home tactic 520, short-term planning tactics 521, and fill-in tactic 522.

Processing continues by determining actions via a conditions list (fishbone) of sensors, and the corresponding tactic that reduces each sensor. First, a tree of factors, or a fishbone, is developed that can readily be translated into a conditions list of sensors (shown as boxes in FIG. 5) and the associated tactic(s) impacting the sensor (shown as ovals in FIG. 5). Note that in FIG. 5, XS is used to denote an excess quantity sensor, indicating the amount over a triggering threshold. FIG. 5 illustrates an over-budget sensor 501 and various components thereof, including productive hours 502, non-productive hours 503, average hourly rate 504, and subcomponents direct care 505, indirect care 506, required leave 507, paid unscheduled leave 508, paid training hours 509, PRN premium hours 510, overtime (OT) hours 511, bonus/differential hours 512, agency (temporary staffing) hours 513, structural weekly hours 514, distributed daily shift hours 515, unscheduled staffing (OS) hours 516, scheduled staffing (OS) hours 517, long term planning tactics 518, send-home tactic 519, stay-home tactic 520, short-term planning tactics 521, and fill-in tactic 522.

Knowledge acquisition processing 112 next proceeds to determine possible roles to undertake possible tactics. This assignment can be performed either by a human strategist or by a conventional knowledge engine that identifies a pattern from a knowledge base and is able to harness one of its own existing models. Tacticians are determined by the strategist by indicating which roles could possibly do an action (even if only in a "perfect world")—or instead all roles could be inserted, which would then increase analysis time. A tactician wants any necessary direction and support from their strategist. Tactics are given a title and explained below. These actions are normally recommended by a strategist, but some or even most of the generic tactics can be found in the knowledge base. Roles start out general, but then get subdivided as more role "players" added and defined in greater detail. The ratings put into the cells below are a 1 to 5 rating, with 5 being the best choice of role to perform a tactic in terms of normal precedence, as well as perhaps given policy and time constraints, etc.

| Sensor leading to tactic | Tacticians → Tactics | Role 1 Staffing Coordinator | Role 2 Director of Nursing | Role 3 Administrator |
|---|---|---|---|---|
| XS Unsched.(OS) | Send-Home Stay-Overs, enfrcg policy nobody works beyond schedule | 2 | 5 | 4 |
| XS Unsched.(OS) | Stay-Home procedure for facility staff | 5 | 4 | 3 |
| XS Agency (OS) | Agency Cancellation procedure | 5 | 2 | 4 |

-continued

| Sensor leading to tactic | Tacticians → Tactics | Role 1 Staffing Coordinator | Role 2 Director of Nursing | Role 3 Administrator |
|---|---|---|---|---|
| XS Vacant OT | Use Call-Off/Fill-in Recomms. To find non-OT staff to fill holes | 5 | 3 | 1 |
| XS Unsched.(OS) AND XS Vac.OT | Use Switch Days Recomms. for when this emp works, from OS day to upcoming Vacant OT day | 4 | 5 | 3 |
| XS Employee OT | Use OT Replacement Recomms to swap-out OT staff to best choice emp w/o OT | 4 | 5 | 3 |
| *(Prerequisite Tactic) | Attendance Tracking | 5 | 1 | 3 |

This information is used for subsequent role-action value determinations, as well as helping later to establish precedence of primary roles for a role-action versus back-up roles.

Referring again to FIG. 4, DAP structure/distribution 113 includes developing a roles-TIMSA matrix using cost/quality/morale subdivisions for priority rankings per TIMSA criterion for each role (through interviews/questionnaires). Specifically, this is initiated in one embodiment by input from a human strategist or each individual role, whether directly or via an interview or questionnaire. In an alternate embodiment initiation is accomplished by conventional use of pre-existing models of roles based on standard role titles in a knowledge base. An example roles-TIMSA matrix is shown below, with R=Role; T=Time spent on CQM item; I=Info avail for CQM item; M=Motivation toward; S=Skill applicable toward; A=Authority granted toward. In a preferred embodiment, each cell contains a true ranking, i.e., no two cells in the same column have the same number.

| | T | | | I | | | M | | | S | | | A | | |
|---|---|---|---|---|---|---|---|---|---|---|---|---|---|---|---|
| | C | Q | M | C | Q | M | C | Q | M | C | Q | M | C | Q | M |
| R 1 SC | 2 | 1 | 3 | 2 | 1 | 3 | 2 | 1 | 3 | 3 | 1 | 2 | 3 | 1 | 2 |
| R 2 DON | 3 | 1 | 2 | 2 | 1 | 3 | 3 | 1 | 2 | 3 | 1 | 2 | 3 | 1 | 2 |
| R 3 Adm | 1 | 2 | 3 | 1 | 2 | 3 | 1 | 2 | 3 | 1 | 2 | 3 | 1 | 3 | 2 |

Processing for DSD 113 continues by developing an actions-TIMSA matrix using priority rankings per TIMSA criterion for each role (through knowledge base or strategist interview). In a preferred embodiment, each tactic implies an action, and in this instance the numbers are ratings rather than rankings with 1 meaning "requires the most" and 3 meaning "requires the least".

| | T | | | I | | | M | | | S | | | A | | |
|---|---|---|---|---|---|---|---|---|---|---|---|---|---|---|---|
| Tactics | C | Q | M | C | Q | M | C | Q | M | C | Q | M | C | Q | M |
| Action 1: Attend. Trkg. | 1 | 1 | 1 | 1 | 1 | 1 | 2 | 2 | 2 | 3 | 3 | 3 | 3 | 3 | 3 |

-continued

| Tactics | T C | Q | M | I C | Q | M | M C | Q | M | S C | Q | M | A C | Q | M |
|---|---|---|---|---|---|---|---|---|---|---|---|---|---|---|---|
| Action 2: Send-Home | 2 | 2 | 2 | 1 | 1 | 1 | 1 | 3 | 2 | 1 | 1 | 1 | 1 | 1 | 1 |
| Action 3: Fill-in | 2 | 2 | 2 | 2 | 2 | 2 | 1 | 2 | 3 | 2 | 2 | 2 | 3 | 3 | 3 |
| Action 4: Agency Cancel | 1 | 1 | 1 | 1 | 1 | 1 | 1 | 3 | 2 | 2 | 2 | 2 | 2 | 2 | 2 |
| Action 5: Switch Days | 1 | 1 | 1 | 1 | 1 | 1 | 1 | 3 | 2 | 1 | 1 | 1 | 1 | 1 | 1 |

Elaboration:
Action 1 = Attendance Tracking, comparing staff scheduled to work (i.e. planned) versus the those who punched in (i.e. actual)
Action 2 = Following recommendations for send-home of most flexible facility staff
Action 3 = Following recommendations for fill-in with non-overtime facility staff
Action 4 = Following recommendations for Agency cancellation procedure to avoid overstaffing for these Agency worker
Action 5 = Following recommendations for switching days employee working from overstaffed day and shift to understaffed one Elaboration:
- Action 1=Attendance Tracking, comparing staff scheduled to work (i.e. planned) versus the those who punched in (i.e. actual)
- Action 2=Following recommendations for send-home of most flexible facility staff
- Action 3=Following recommendations for fill-in with non-overtime facility staff
- Action 4=Following recommendations for Agency cancellation procedure to avoid overstaffing for these Agency worker
- Action 5=Following recommendations for switching days employee working from overstaffed day and shift to understaffed one In a similar manner, processing then develops an Initial Role-Action Mismatches Matrix for Each TIMSA Criterion (3-D Table). In a preferred embodiment, his matrix ranks a deficit gap between a role and an action. In a preferred embodiment, the assigned values, and therefore the gaps, are subjectively determined.

| TIME: | Role 1 (Staffing Coordinator-SC) | Role 2 (Director of Nursing—DON) | Role 3 (Administrator) |
|---|---|---|---|
| Action 1 (AttTrk) | Rank gap of 2 → −10 | | |
| Action 2 (S-H) | | | |
| Action 3 (F-I) | | | |
| Action 4 (AC) | | | |
| Action 5 (SD) | | | |
| INFORMATION: | | | |
| Action 1 | −10 | | |
| Action 2 | | | |
| Action 3 | | | |
| Action 4 | | | |
| Action 5 | | | |
| MOTIVATION: | | | |
| Action 1 | | | |
| Action 2 | | −10 (role ranks 3 on cost, but action requires 1) | |
| Action 3 | | | |
| Action 4 | | | |
| Action 5 | | | |
| SKILL: | | | |
| Action 1 | | | |
| Action 2 | | | |
| Action 3 | −1 | −1 | −1 |
| Action 4 | | | |
| Action 5 | | | |
| AUTHORITY: | | | |
| Action 1 | 0 | 0 | 0 |
| Action 2 | | | |
| Action 3 | | | |
| Action 4 | | | |
| Action 5 | | | |

As previously described, in one embodiment processing develops a User Revised Role-Action Mismatches Matrix for Each TIMSA Criterion as well. In this matrix, a human strategist modifies values with their own assessments, based on past experience or intuition.

Next, processing develops an overall TIMSA Role-Action Mismatches to Breakdown Probability. This takes the worst value from all five TIMSA criteria for the role-action as the "weakest link," i.e., the driver for the breakdown probability.

| | Role 1: SC | Role 2: DON | Role 3: Adm |
|---|---|---|---|
| Action 1: AT | | | |
| 2: S-H | | −10 | |
| 3: F-I | | | |
| 4: AC | | | |
| 5: SD | | | |

This step provides, if it is coupled with a set of assumed sensor readings and timings of them, the predicted process. Next, processing in some embodiments cross-checks mismatch breakdown probabilities to historical sensor readings, and resolves any discrepancies. Once mismatches are identified, the probability of breakdown for the role-action can be assessed considering all the TIMSA criteria (also looking at historical sensor readings for probabilities), then the nature of the DAP entry to overcome. The higher the historical weighted average value for the sensor readings, the greater the mismatch should appear to be from the analysis, and vice versa. If it is not, then the discrepancy must be resolved.

|          | Sensor                                      | Role 1                                                                                                    | Role 2                                                                                                         | Role 3 |
|----------|---------------------------------------------|-----------------------------------------------------------------------------------------------------------|----------------------------------------------------------------------------------------------------------------|--------|
| Action 1 |                                             |                                                                                                           |                                                                                                                |        |
| Action 2 | $1 k Unsch.OS every day seen at 6am and 6pm |                                                                                                           | Since this role is the primary role for this action, means that tactic can be expected for this role every day |        |
| Action 3 | $0 OT every day                             | Means this role would not expect to do this tactic, as it does not appear to be breaking down (based on historicals) |                                                                                                      |        |
| Action 4 |                                             |                                                                                                           |                                                                                                                |        |
| Action 5 |                                             |                                                                                                           |                                                                                                                |        |

To resolve discrepancies, processing begins by looking at more recent historicals and weighting them heavier, then rechecking, since the trend may be improving. However, if there is still discrepancy, then processing follows this heuristic: If the historical is higher than the predicted, then the actions are likely harder than detailed, so need to adjust the action rankings to more important ranks (e.g. 2's become 1's). If the historical is lower than the predicted, then the actions are likely easier than detailed, so need to adjust the action rankings to less important ranks (e.g. 1's become 2's, or higher numerical values). This step leads to a preliminary process that can be "visualized" by an Event Trace, as described in connection with meta-level management, and also indicates whether the roles or tactics set (i.e., strategy) are sufficient to avoid future breakdowns.

DAP structure/distribution processing 113 continues by developing a DAP structure using a TIMSA criteria to DAP characteristic matrix. This is performed based on rules from the knowledge base, both a priori and accrued from the iterative processing. A resulting matrix for the example under discussion is:

The result of this processing provides the structure for a daily action plan. In this case, R2-A2 essentially shows how the DAP entry for tactic 2 should look when given to role 2. The DAP structure is the shell for presentation of the data to a role, and this processing creates the shell by altering the tactic "angle" chosen, i.e., the view of the tactic from a particular role.

Referring yet again to FIG. 4, Data Acquisition processing 114 defines the required data fields from DAP characteristics and tactics, breaking out the data elements needed for every tactic's finding and sensor. This permits the corresponding data to be sought out. Specifically, a mapping is done of the tactic's required information, both in terms of the sensor that triggers it and the finding that attaches to and enables the tactic, to a known list of data elements retained by the knowledge base. In a preferred embodiment, such a mapping for the example under discussion is:

| Data Field Required      | Tactic 1 Finding | Tactic 1 Sensor | Tactic 2 Finding | Tactic 2 Sensor | Tactic 3 Finding | Tactic 3 Sensor |
|--------------------------|------------------|-----------------|------------------|-----------------|------------------|-----------------|
| PPDhours                 |                  |                 |                  |                 |                  |                 |
| StaffNeeded              |                  |                 | Yes              | Yes             |                  |                 |
| Current-Staffing-Level   |                  |                 | Yes              | Yes             |                  |                 |
| Census                   |                  |                 |                  |                 |                  |                 |
| Employee-Work-Schedule   | Yes              |                 | Yes              |                 |                  |                 |
| Employee-Punch-Detail    | Yes              |                 |                  |                 |                  |                 |

Data Acquisition processing 114 continues by attempting to match required data fields to available report information elements, asking for user confirmation, or instead noting which fields appear missing (and thus tactics may not be feasible). Depending on the situation, probabilities may be assigned from 0% to 100% that there is a match between required data and available data. In the example under discussion, reports provided by the client are OT summary, Attendance tracking, PPD report, and Census report, and the corresponding mapping is:

|                      | Role-Action |       |       |       |                                         |       |       |       |       |
|----------------------|-------------|-------|-------|-------|-----------------------------------------|-------|-------|-------|-------|
|                      | R1-A1       | R1-A2 | R1-A3 | R2-A1 | R2-A2                                   | R2-A3 | R3-A1 | R3-A2 | R3-A3 |
| DAP Characteristics...|            |       |       |       | (DON-Send Home)                         |       |       |       |       |
| Instruction          |             |       |       |       | Pos./Neg. Conditioning                  |       |       |       |       |
| Finding Analysis     |             |       |       |       | Less                                    |       |       |       |       |
| Finding Strategy     |             |       |       |       | More                                    |       |       |       |       |
| Finding Scope        |             |       |       |       | Less                                    |       |       |       |       |
| Follow-up Direction  |             |       |       |       | Up                                      |       |       |       |       |
| Follow-up Frequency  |             |       |       |       | Infreq                                  |       |       |       |       |
| Action Set Features  |             |       |       |       | Use carrot-&-stick, Not just simplifications |   |       |       |       |

| Field Samples Available | Required Data Fields PPDhours | Census |
|---|---|---|
| PPD hrs. | 100% | 0% |
| Daily census | 0% | 100% |
| Overtime | 0% | 0% |

Thus, each vertical column adds up to 100% if there is to be a chance of implementing a tactic—if not, then that tactic is likely currently not possible, since in a preferred embodiment these fields are considered prerequisites for the corresponding tactics.

Data acquisition processing 114 continues with obtaining "tri-ordinates" for necessary data fields from a source data packet. Specifically, raw data reports analysis for Data Acquisition from the sensors & findings, now get "tri-ordinates" (that is, a tri-ordinate has the 3 elements of report, column in that report, and row in that report), all based on markers and pattern matching, which are put into the corresponding cells. Thus, each cell in the table below contains a tri-ordinate inside a source data packet, consisting of a Report Filename Marker, a Column Marker, and a Row Marker. For the example under discussion:

| Field Sample | Required Data Fields PPD hours | Census |
|---|---|---|
| PPD hrs. | PPD Report, Daily column, PPD hrs. row | — |
| Daily census | — | Census Report, Daily column, Daily Census row |

The output of this step indicates whether there is sufficient data to enact the process and its strategy, and thus it reflects whether the process can be reinforced, or at least how well.

Turning now to meta-level management 115/116, an initial stage of processing known as MLM 1 provides daily dynamic process development through conventional PERT/CPM, Gradient Descent, Simulate Annealing, and genetic algorithms as needed in the appropriate circumstance, and then generating daily output from these. In a preferred embodiment, this processing includes actual Daily Action Plans, as well as visualizations for tacticians and strategists using Event Trace diagrams and Gantt Charts, for process independent tactics if no feedback has yet been obtained, or process dependent tactics if feedback has been incorporated. This processing answers questions such as "Who gets what when? Who does what when and why?"

Based on probabilities and expected values of sensors, the process is defined, in its reengineered form, and a "reinforced" process results. Follow-up can be determined dynamically and automatically by re-evaluating the sensor information or other related data over time, as discussed herein with respect to SBD processing. The process is detailed based on given sensor sampling rates and times of the readings, and the expected lead times for positive impacts. Sensors and their tactics are prioritized for importance, in one embodiment: average or max cost potential, and urgency.

Event Trace for steps and roles and timing—the current process' visualization as described elsewhere herein. In one embodiment, a "process independent" Event Trace serves as additional input to guide the reengineering and reinforcing of the process, and further serves to visualize when steps should occur initially given sensors scenario and later with each knowledge base iteration or different data scenario. It is based only on the start-up determinations.

Once all role-actions are assigned to sensors, then each can be called (via DAP entries) based on every sensor's current readings and available role-action resources (i.e. hours, information, skill, motivation, authority) at the moment (that is, process dependent, given that now everything can be assessed "in action" and within context), and the TIMSA-DAP Structure table. This way, the DAP structure, distribution, and content need not be static, but can rather change based on the current situation (i.e., what sensors need addressed, what roles are available today, etc.) to overall minimize the risk of breakdown (e.g., auto-bypass of failing role-action nodes). Process dependent evaluation is used for tuning of the process when it is known that inter-related tactics will affect one another and the resources used to accomplish them. In alternate embodiments, TIMSA process dependent could bebased on modeling simulations, feedback on time spent, adequacy of the information, role-interactions and personality conflicts, policy constraints or conflicts.

The Process Dependent Event Trace, which provides a "big picture" view, is the result of the feedback loop going back as input to the MLM, after adjustments to the TIMSA criteria for the "angling or direction of the tactics; the addition or subtraction of tactics; or the sensor's expected values as a result of revised frequencies, probabilities, or maximum costs. The Event Trace can also show the implemented tactics that were effective on a daily basis, based on sensor reading changes. Will show when tactics have occurred in past based on (historical frequencies) sensor improvements, or could be through tactics being monitored by other system(s) (i.e., the delta of sensor going to lower reading).

If the Event Trace does not have the input data sampling "granularity" of normal set times during a day that sensor readings trigger tactics, there will be a single point in a day (such as 6 A.M.) to take sensor readings. This allows for organization and ordering tactics in the sequence (of prerequisite and sensor-impacting tactics) that best picks obviously beneficial choices, or "low-hanging fruit." In a preferred embodiment, system 100 develops an ROI table of how much reduction in sensor reading the tactic offers relative to time and effort, and risk the tactic requires. Then with those tactic lengths and the workload on the critical path of role nodes, the time each tactic should start and likely finish is determined.

When a process and its role-actions (given a process evaluation objective function to help determine the ideal "formation") may be optimized in a way that would address the expected values for sensor readings, Gradient Descent/Simulated Annealing/Genetic Algorithm (GD/SA/GA) approaches are used. To ensure that a local minima is not what has been reached, the SA/GA alters role assignments, including roles that are primary or backup to a tactic. These GD/SA/GA algorithms indicate choices for the best role-action path given the ROI of each, in order to maximize the overall value of all role-actions undertaken for assumed sensor readings. As a role-action is assigned, conventional weighting constrains roles as each is added, as role supply/demand limitations act as constraints to assignments, as discussed herein.

In a preferred embodiment, determination of what tactics to put into a DAP is made by looking at the ROI of Role-Actions given current sensor readings and the amount of overall return to the process that can be achieved by doing one set of role-actions versus another set, taking into account the opportunity costs of not doing certain role-actions. In accordance with preferred embodiments, although resource optimization can simply use Depth First Search (DFS), some AI techniques should be used to intelligently prune search space. Critical Path Method (CPM) analysis is employed to identify which role-actions are on the critical path, and thus which roles must be given sufficient resources to complete their critical path role-actions. In alternate embodiments, other conventional project management, task scheduling, and resource optimization techniques can be applied as may be suited to the particular situation being addressed by system 100.

In some embodiments, situations involving tactic prioritization are counterintuitive. Overtime Replacement Recommendations may seem always valuable given its direct impact to a sensor, but the time it takes to develop the findings for who is on overtime versus who is not, then trying to convince non-overtime people to take a shift while also convincing overtime people to give up their overtime pay, may prevent the staffing coordinator from completing the Attendance Tracking for the day. If current sensor readings show that sensors unschOS (i.e., unscheduled overstaffing) and vacantOT (i.e., overtime to be assumed given a critical vacancy) are a big problem, though, while sensor current employee OT is not as big, then the opportunity cost of not doing the Attendance Tracking is much higher than the returns of doing the Overtime Replacement Recommendations—thus the latter is bad choice of role-action to include on the Daily Action Plan for that particular day given its sensor readings. Another example is that although a Stay-Home tactic may take relatively little time and offer direct returns on one sensor, if doing that tactic would mean that a role doesn't complete the Attendance Tracking, then the ability to impact two other sensors is lost.

An example of Daily Action Plan optimization given limited resources is that a DAP entry can be considered to be a role-action. For cost-effectiveness, a sensor should lead to some set of role-actions. However, choosing these role-actions may not be simply based on the value of the tactic. In preferred embodiments, it also involves considerations of the cost, constraints, and opportunity cost of doing that tactic versus doing other tactics or varying the sequence. Constraints include that two tactics could be done by one role, but that role has limited time (or "supply"). Thus, it makes sense to find other roles to pick up tactics if they are available to do so. In a preferred embodiment, GD optimization is used, while in alternate embodiments this is accomplished via heuristics such as taking the most constrained role's tactics first, then gradually adding in less constrained role's tactic options. Using GD optimization, system 100 utilizes an objective function to determine the value of a role-action set configuration or formation not simply in terms of the role, but from the entire process and for the organization as a whole for that day.

If it turns out that all the roles in the process cannot complete all the tactics dictated by the sensor values (including not just for time reasons, but also for overall TIMSA reasons, resource requirements, completion times, etc.), then role-actions are prioritized to achieve the maximum benefit to the organization for the day. This is done by first processing under a PERT/CPM algorithm as shown below to see all possible role-actions that should be done given sensors. This includes a forward pass to compute the earliest start & finish times, a backward pass to compute the latest start and finish times, and finally computation of slack times and thus critical paths.

Then, if it appears as if all the roles cannot accomplish everything, then an ROI table of role-actions is created, wherein prerequisite tactics like Attendance Tracking are valued for their entire branch, not at 0 even though they have no direct sensor impact. An example of table in accordance with the preferred embodiment is:

ROI

Table of Role-Actions

|  | Action 1 | Action 2 |
|---|---|---|
| Role 1 | ROI of R 1 doing A 1 = 10 | ROI of R 1 doing A 2 = 5 |
| Role 2 | ROI of R 2 doing A 1 = 30 | ROI of R 2 doing A 2 = 0 |

These ROIs then select the role-action that offers the highest value to entire objective, not just role, that role-action removed and the constraints of the role checked to make sure they were not violated (such as TIMSA items), and then the next highest ROI taken and its role-action removed. This is iterated until all the best role-actions are addressed such that there are no more ROI opportunities, or until constraints have been reached that cannot be exceeded. Tactics are only chosen for each single role, and in the proper sequence, that maximize the ROI given the overall constraints. Accordingly, a valuable role-action normally done by role 1 may be temporarily be offloaded to role 2 in order to maximize value to organization.

Finally, processing in MLM1 provides the output reports that help the key roles improve the situation for that day, including the Daily Action Plan (and any additional DAP audits as desired) to show instruction, findings, and priorities. Event Traces help strategists see the tactics, timings, and necessary interactions among all roles. Gantt charts show sequence and dependencies of actions a role must do. In a preferred embodiment, a strategist's Gantt chart shows actions done in parallel (since more than one tactician role may be on their report), but an individual tactician has only sequential items on it, since they are assumed to not be able to do items in parallel on their own, and their report is only for themselves.

Meta-level management (MLM) processing 116 continues by capturing Role-Action Failures to enable correcting for error signal. This is referred to herein as MLM2 processing, and tracks Role-Action Failures over the course of time. In the example discussed herein, two days is the time period used, but other time periods are usable in a preferred embodiment based on the particular situation. MLM2 processing looks for continuous breakdown points by looking at failure rates. The failure is represented by a sensor reading not decreasing between samplings for the DAP. This lack of decrease implies either the tactic was not done by anyone in the "chain", was not effective even though it was done, or was needed more than once. The fact that a tactic failed at reducing a sensor does not necessarily mean that role failed to perform tactic, but in TIMSA-DAP, performing tactics are not as important as actually correcting the sensor value. The ultimate goal, as described above, is benchmark improvement, not merely performance of a task. An example showing MLM2 processing is illustrated in the table below:

| Day 1: (not very busy) | Role: Administrator | Role: Staffing Coordinator |
|---|---|---|
| Tactic 2 | UnschOS reading at 6am = $1 k UnschOS reading at 6pm = $1 k Implies tactic to reduce | |

| Day 1: (not very busy) | Role: Administrator | Role: Staffing Coordinator |
|---|---|---|
| Tactic 3 | this sensor, the Send-Home tactic not effective this day XS OT reading at 6am = $500 XS OT reading at 6pm = $0 Implies was effective this day | |

| Day 2: (very busy day) | Role: Administrator |
|---|---|
| Tactic 2 Tactic 3 | (same as Day 1) XS OT reading at 6am = $500 XS OT reading at 6pm = $500 Implies NOT effective this day |

Meta-level management processing 116 continues with data refinement from inferences derived from monitoring information. This is referred to herein as MLM3. In a preferred embodiment, TIMSA refinement is inferred from failures. Table cells show existing TIMSA criterion values and suggested new values based on the inference. For example:

| Role-Action Failure | Time | Information | Motivation | Skill | Authority |
|---|---|---|---|---|---|
| Administrator-Attend.Trkg. Adminis-SendHome | | | Is inferred that motivation by role is low on this tactic | | |
| Adminis-FillIn | Is inferred that time was too short for this role to spend on this tactic, at least for this day | | | | |

In some situations, inferences based on history may be sufficient, while in other situations consistent failures may necessitate an interview the appropriate personnel. Examples of inferences drawn from MLM3 processing are:
  Too busy (such as if different actions were dropped, especially when greater than average number tactics needed), so time criterion the problem.
  Too low of value (such as if same action repeatedly ignored), so motivation criterion the problem.
  If same tactic fails each day for a role-action, may infer that motivation is problem (e.g. Administrator doesn't feel it's of real value).
  Whereas if different tactics all failed on same day or randomly, implied that Administrator ran out of time.

Meta-level management processing 116 further includes process tuning and repairing based on refined TIMSA data adding, dropping, or switching tactics in the process, or changing their "angle" via the DAP structure (see discussion concerning DAP structure/distribution 113). This is known as MLM4 and is illustrated as:

| Role-Actions | Time | Information | Motivation | Skill | Authority |
|---|---|---|---|---|---|
| Administrator-Attend.Trkg. Adminis-SendHome | | | If motivation low, try prioritizing this tactic lower, or dropping altogether on days that will be "busy" (i.e. where multiple sensor readings have high values) | | |
| Adminis-FillIn | Try changing backup role for this tactic | | | | |

Processing under MLM4 includes tuning out lower priority actions (e.g., send-home tactic) given low motivation; offloading to less constrained roles; and otherwise adding dropping and changing tactics (as well as tactic "angles" as discussed above, in connection with DAP structure/distribution 113.

Meta-level management processing 116 concludes with a feedback loop to MLM1, so that all prior MLM processing is iterated based on knowledge of what works and what does not. This feedback processing is known herein as MLM5.

In a preferred embodiment, system 100 is implemented by conventional programming of one or more computer systems to perform as described herein. The primary functional aspects of such programming are described here for an example application of system 100, in which a remote server computer (not shown) is used to process a healthcare facility's data and produce corresponding DAPs. First, conventional encryption, such as PGP encryption, is used at a computer at the healthcare facility's location to process input data files, in this example unprocessable claims logs, lab data and physician dictations) and the encrypted data are transferred to the server computer via conventional transfer mechanisms such as email, VPN, FTP. The server decrypts the input data and holds "send-back DAPs", or SBDs that have role responses to tactics. For example, a role may confirm each item on the role's DAP by placing a Y or N in a corresponding column on a screen display and then sending back the responses to that the server can see which tactics the role has accepted and denied.

The server also includes timers to start batch files to operate processing as described herein, for instance every evening after the close of business. A file checker program then checks to see whether all expected data have been received, and if any data files are missing, the program initiates email reminders to the appropriate role at the healthcare facility. The SBDs are merged with the original daily action plan work in progress (DAPWIPS) (i.e., spreadsheet files that, after processing, contain all the role-actions for a given process, which are then used as input to a formatter program to create DAPs) to create merged SBDs indicating role-confirmation of actions. A data hooks process segment develops the knowledge base as described above based on the processed data.

Next, a filter program removes unneeded formatting characters from the input data. An advanced "replacer" program further modifies imperfect input data after processing by the filter program to put such data in a usable form. A data prep program looks for certain data such as redundant information or unprocessable characters (e.g., foreign language formatting characters, pictures) and removes it to ensure system stability. Likewise, an inserter program looks for certain data such as date information and inserts related items corresponding to such data, such as a date in standardized date format. A name standardizer program converts all name references to a standard format, i.e., last, first.

A data offset program looks for multiple date formats based on certain lines and markers in the data, such as data on the second line of a file, or immediately following a standard header, and standardizes the form of such dates, in a preferred embodiment using relative referencing so that that day before yesterday is referred to as −2. Next, a create insert header program creates headers and merges data for patients found in multiple input files to create a final input file. A list manager program is then used to manage patient data using conventional pattern recognition and natural language processing, as well as a TIMSA rules engine for rules extraction, rules modification, rules application, and data mining with artificial intelligence, gradient descent, simulated annealing and genetic algorithm techniques as described above, in order to create a DAPWIP, which is a list of developed tactics for all the roles in the process being analyzed.

An auditing program finds relevant indicators and what prompted those indicators, such as sentences detailing a finding (e.g., the sentence from transcription notes that includes the word "anemia") and lab values. The output of the auditing program is fed to an optimization routine that looks through these items and evaluates if more than one could be done by one role, correspondingly removing excess items and selecting highest value items for inclusion. A DAPWIP serial writing program then adds serial numbers to each DAPWIP entry and archives the numbers, which are used when cross-referencing returned SBDs.

A multi-role SBD formatter then takes the DAPWIP, creates DAPs and delivers them to each role, in a preferred embodiment by way of email. In one embodiment, SBDs are not sent to physicians if they do not respond directly to a request for an SBD but instead only undertake the listed actions, e.g., changing documentation on diagnoses by dictating addendums to those diagnoses without providing direct confirmation via an SBD. In such case, the server monitors the patient records over the coming days to determine whether each requested action was accomplished.

Figure 7:
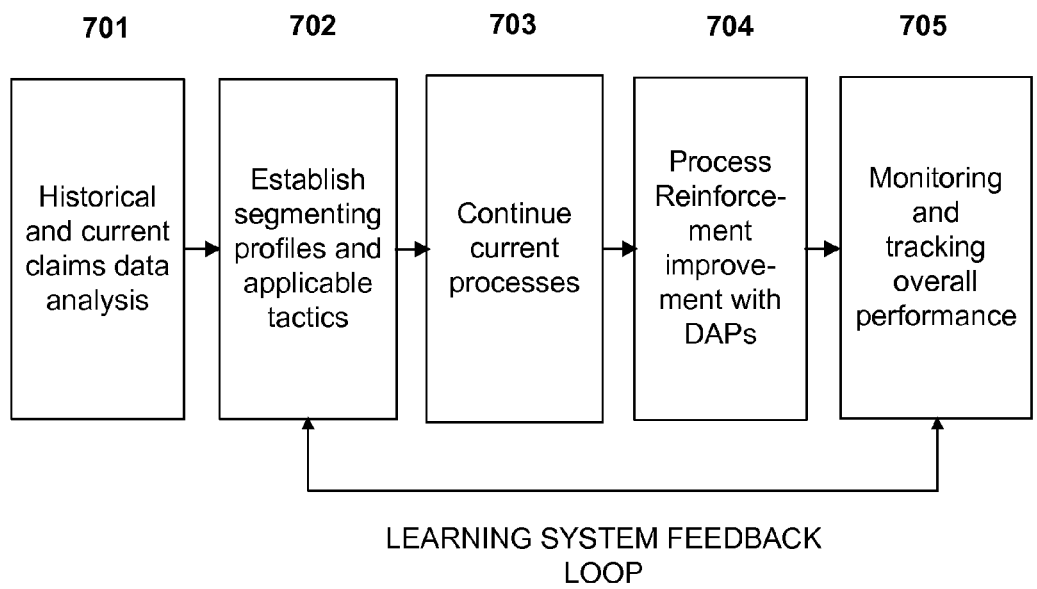
FIG. 7 is a diagram illustrating the learning system feedback loop according to one embodiment of this disclosure.

Referring now to FIG. 7, illustrated is an embodiment that provides a learning system feedback loop. The figure, which includes steps 701-705, provides a view of how an embodiment may be implemented within a current process. Hence, the embodiment beneficially causes minimal disruption to existing environments.

In the embodiment, a TIMSA-DAP prevents process breakdowns—within this window of opportunity. This approach outlined does not confine itself to trying to figure out the complete business process in place currently. Rather, it looks at the process objectives (as represented by key benchmarks and metrics) and a set of "training data" in, for example, a form of historical transactions or a cross section of examples. This is done in order to determine a "best" way to support and enhance the current process that is in place—a form of "tactical support" to a "process strategy". Moreover, this provides an advantage of allowing a current process to stay in place, with only a one-page "supplement" report customized for each role that coordinates all roles in a process while also providing some form of "head start" to each of these roles.

The process need not necessarily do what the roles involved in the process suggest be done (that is, what the people say). Instead, it does what the findings derived from a study of the past transactions or other examples suggest be done (that is, what the data says). Thus, the embodiment beneficially avoids having people potentially (whether inadvertently or deliberately) "mislead" as to what the process is, where the problems are, and where the solutions may be found. The embodiment beneficially relies on the data to indicate the process, problems, and solutions—in effect reducing the amount of time, effort, and risk required to achieve results. Furthermore, TIMSA-DAP's recommends goal is to recommend, to each person in a process, what to do (and how to do it), and just as importantly, what not to do. And all in the most prioritized, crystallized form, on a daily basis, and as quickly as possible in order to maximize the achievement of any targeted process' objectives. Therefore, the system and methods according to this disclosure identify health care facility process breakdowns and generate and distribute daily action plans to repair such breakdowns and improve benchmark goals of the facility.

TIMSA-DAP analysis is not limited to only identifying and preventing process breakdowns; in a preferred embodiment it is also used to reduce inefficiencies as part of overall process improvement. As introduced above, DAPs are used to bridge gaps in knowledge and ability between demands of a work process and the supply of roles to accomplish the work process, and TIMSA-informed DAPs are self-reinforcing in that efficiency is increased via residual effects on a role with repeated DAPs as well as "halo" effects from roles educating and informing other roles.

In accordance with the present disclosure, TIMSA-DAP analysis is applied to process arbitrage, and the human resources involved in a healthcare process are considered as the equivalent of market players for economic arbitrage, with sellers competing for buyers and buyers competing with one another. A "case path" consists of a series of role-actions, and buyers are vying for the best roles available to perform the role-actions in a case path. An Arbitrageur (arb) makes available winning processes and positions (or "markets") them to the workforce so that the improved processes are actually embraced and adopted. Such positioning entails identifying opportunities to "marry" correlated best practices with one another, such that as many roles as possible recognize that they are being employed in an optimal manner. Process arbitrage takes advantage of a result of TIMSA-DAP analysis that leads people to be tasked with things they are good at, and presumably enjoy, doing. Acceptance of the overall process is thereby increased, because what's good for the community is determined by taking into account what is good for each individual player. Given appropriate TIMSA levels, people are drawn naturally to doing what is best, viewed both from an individual perspective and from an overall process perspective.

Process arbitrage is used to determine those appropriate TIMSA levels. Rather than starting from scratch to generate new allocations, process arbitrage uses heuristics and statistical analysis on historical performance to determine suboptimal performance and reposition potential improvements to appeal to related demand. For example, where multiple markets that traditionally have tracked one another well begin to diverge, the markets can be realigned by selling more valuable items to the market that needs the improvement the most. The best under-utilized supply of work roles are thus matched with the most under-performing demand for work roles. In contrast with typical approaches that simply attempt to squeeze more time out of the best performers, this approach does not trend toward overuse of the highest value resources—a result destined to lead to overwork, burnout, and rejection of process improvement by the best performers, and possible apathy and under-use of other available (non-best) performers. Process arbitrage recognizes that overuse of a scarce resource leads to that resource becoming more scarce, which leads to divergence from what the value of that resource should be without overuse.

In a preferred embodiment, the better performing roles are provided fewer DAP assignments and left to promote their own best paths, while worse-performing roles are given more guidance to direct them to their highest and best uses. Thus, individuals are rewarded for good performance by independence and empowerment, as well as implicit recognition that by being left to their own devices, they are making optimal decisions on their own.

Employing conventional Pareto analysis to process arbitrage, if 80% of the value of a change is found in only 20% of the changes, and if 80% of the value in those 20% come from 20% of that portion, then 64% of the benefits are found in only 4% of the changes. In a preferred embodiment, process arbitrage sets TIMSA-DAP levels to emphasize this 4% in order to maximize gains from process improvement with the ultimate limited resource—time in the day.

Figure 8:
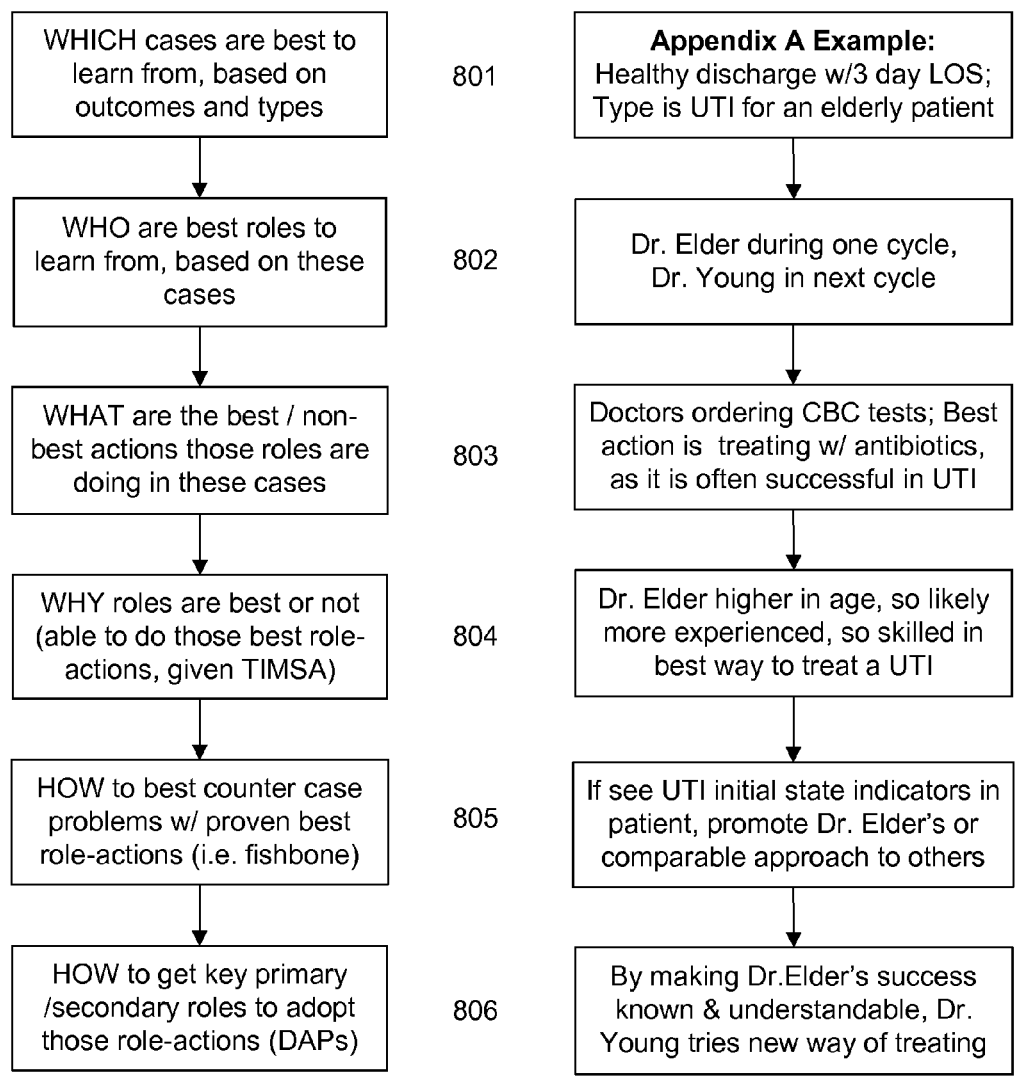
FIG. 8 is a diagram illustrating an algorithm for overall process arbitrage processing according to one embodiment of the disclosure, along with corresponding notes and examples.

Referring now to FIG. 8, an algorithm is illustrated for overall process arbitrage processing, along with corresponding notes and examples.

Determination of WHAT 803 are best actions uses knowledgebase development, with accrued knowledge as to implied actions from results, normal operating practices/protocols, which actions impact outcomes and can be "seeded" by typical clinical pathways, the hospital's own order sheets, and PFP (Pay for Performance) order sheets. WHY roles processing 804 looks at both why best actions are being done and are able to be done, in accordance with TIMSA processing detailed above. HOW to best counter . . . processing 805 uses case problem factors with known role-(implied) actions. HOW to get . . . processing 806 looks for key primary and secondary back-up roles to adopt the role-actions. The first three steps 801-803 involve the arbitrageur's way of determining what types of deals to make. The fourth step 804 justifies why deals should be made. The fifth step 805 creates a solution to the supply/demand market study, and the sixth step 806 locates buyers and persuades them that the solution is sensible for them.

Figure 9:
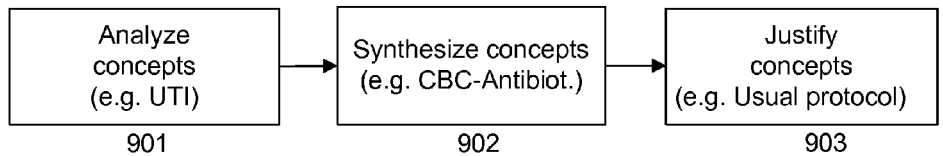
FIG. 9 is a diagram illustrated processing details for the WHICH, WHO, WHAT and WHY steps of the algorithm in FIG. 8.

Referring now to FIG. 9, processing details for the WHICH, WHO, WHAT and WHY steps of the algorithm in FIG. 8 are illustrated.

The concepts analyzed 901 are not only general factors, such as potential causative elements, but role-actions and TIMSA factors as well, which leads to synthesis 902. The justification step 903 is used to determine whether a relationship can legitimately be viewed as systemic as opposed to merely a fluke.

Figure 10:
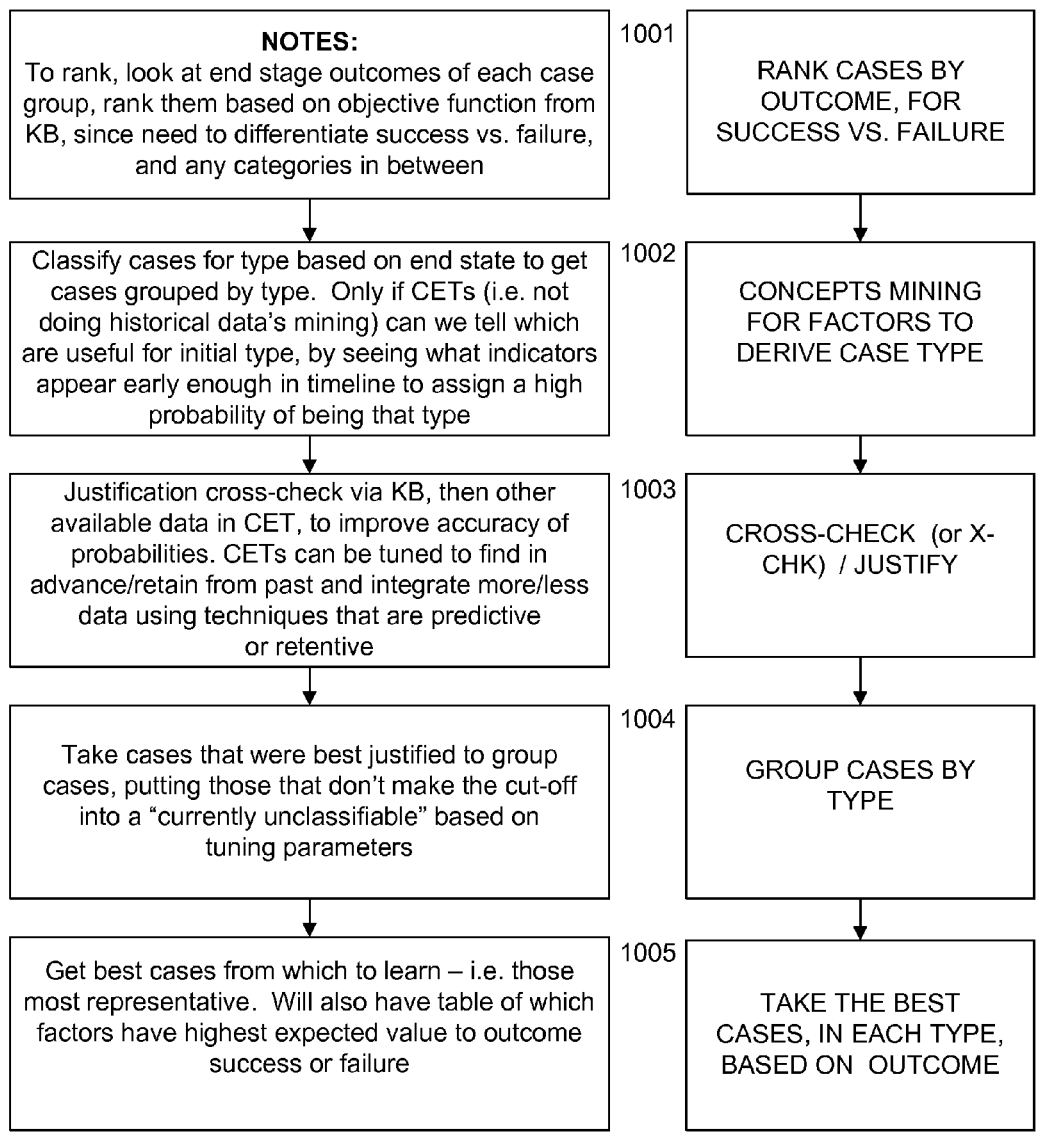
FIG. 10 provides further detail on the WHICH processing outlined in FIG. 8

FIG. 10 provides further detail on the WHICH processing outlined in FIG. 8, along with corresponding notes and examples for processing steps 1001-1005.

Predictive/retentive modeling indicate which data should be found before a case is seen based on predictors to add into a case of this type, or which types should have other data retained from past cases (like instructional knowledge) and added early on into the CET.

Figure 11:
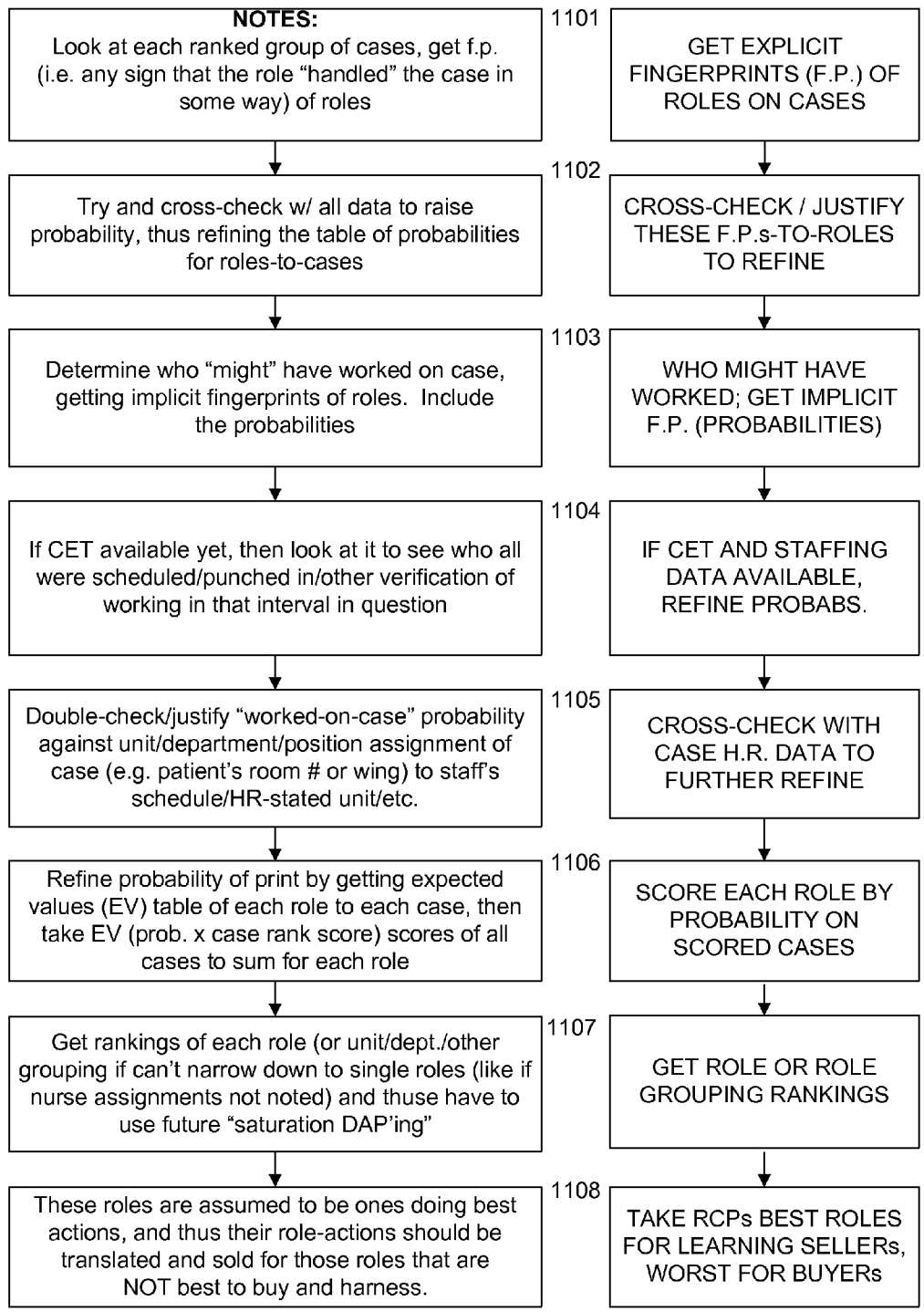
FIG. 11 provides further detail on processing for determining who are best roles.

FIG. 11 provides greater detail on processing for determining who are best roles, along with corresponding notes and examples for processing steps 1101-1108.

Figure 12:
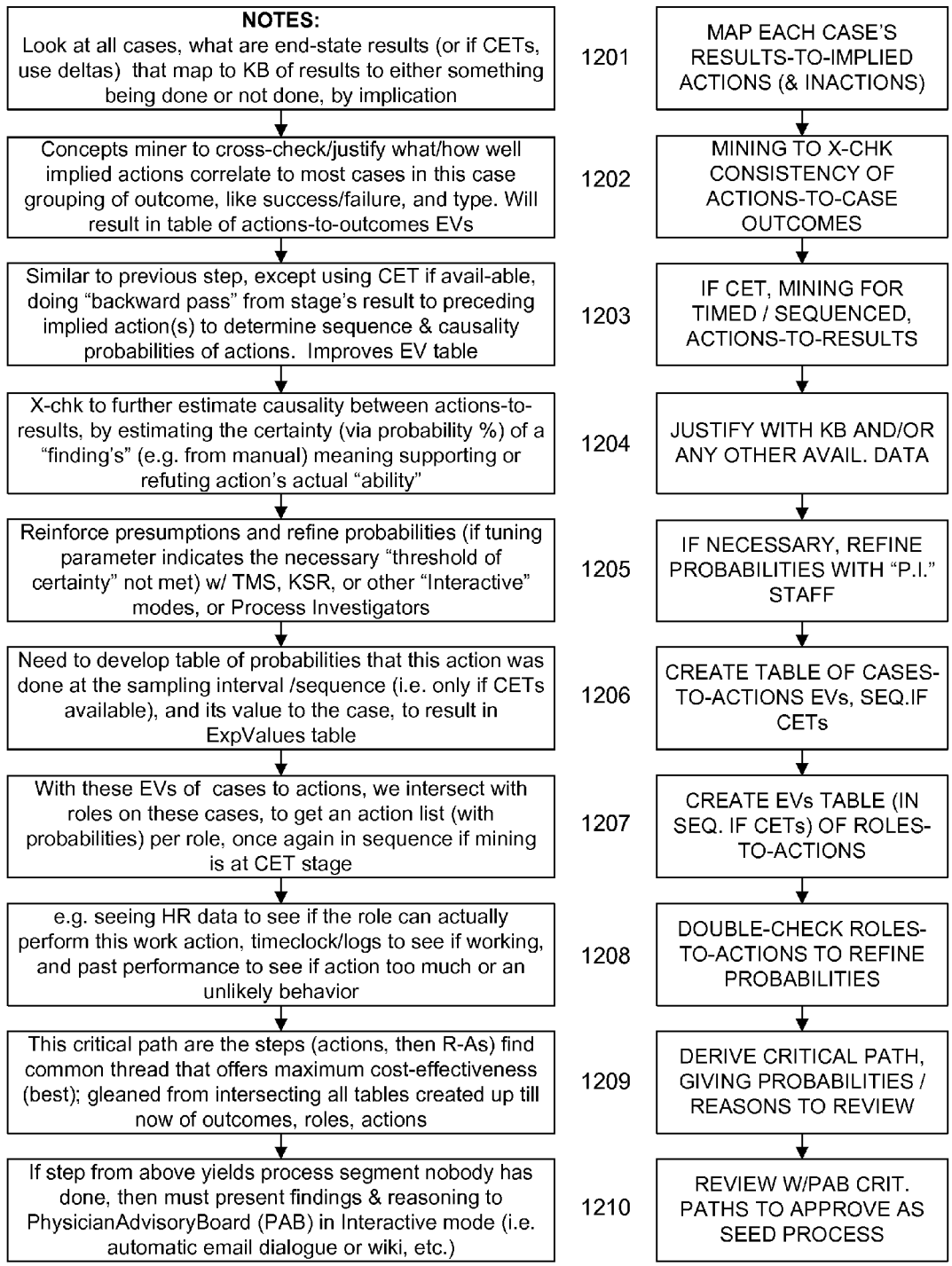
FIG. 12 provides further detail on the WHAT processing outlined in FIG. 8.

FIG. 12 provides additional detail concerning the WHAT processing set forth in FIG. 8, along with corresponding notes and examples for processing steps 1201-1210.

The term "TMS (Time & Motion Study) mode" means a higher sampling rate is used to determine the results changes (or "deltas"), which in turn can better determine the sequence of implied actions and potential causality. KSR is an acronym for KeyStroke Recorder, and Interactive Mode means the automated use of email or wiki to interact with roles that can offer clarification of a process, using a set of templates (like multiple choice, etc.) filled with specific findings to confirm. In a preferred embodiment, fuzzy logic probabilities are used for representing "maybes", then trying to improve these probabilities by cross-checking with other data and trying to justify findings with what is known from other sources. In one embodiment, Process Investigator (PI) investigations (and their approvals through a Physician Advisory Board (PAB) or other advisory boards confirm only good results, and does not focus on the bad, since in a preferred embodiment the system is not used to reprimand poor performers as much as to "sell" the human resources (i.e. staff, consultants, etc.) on better approaches they may not know about.

Figure 13:
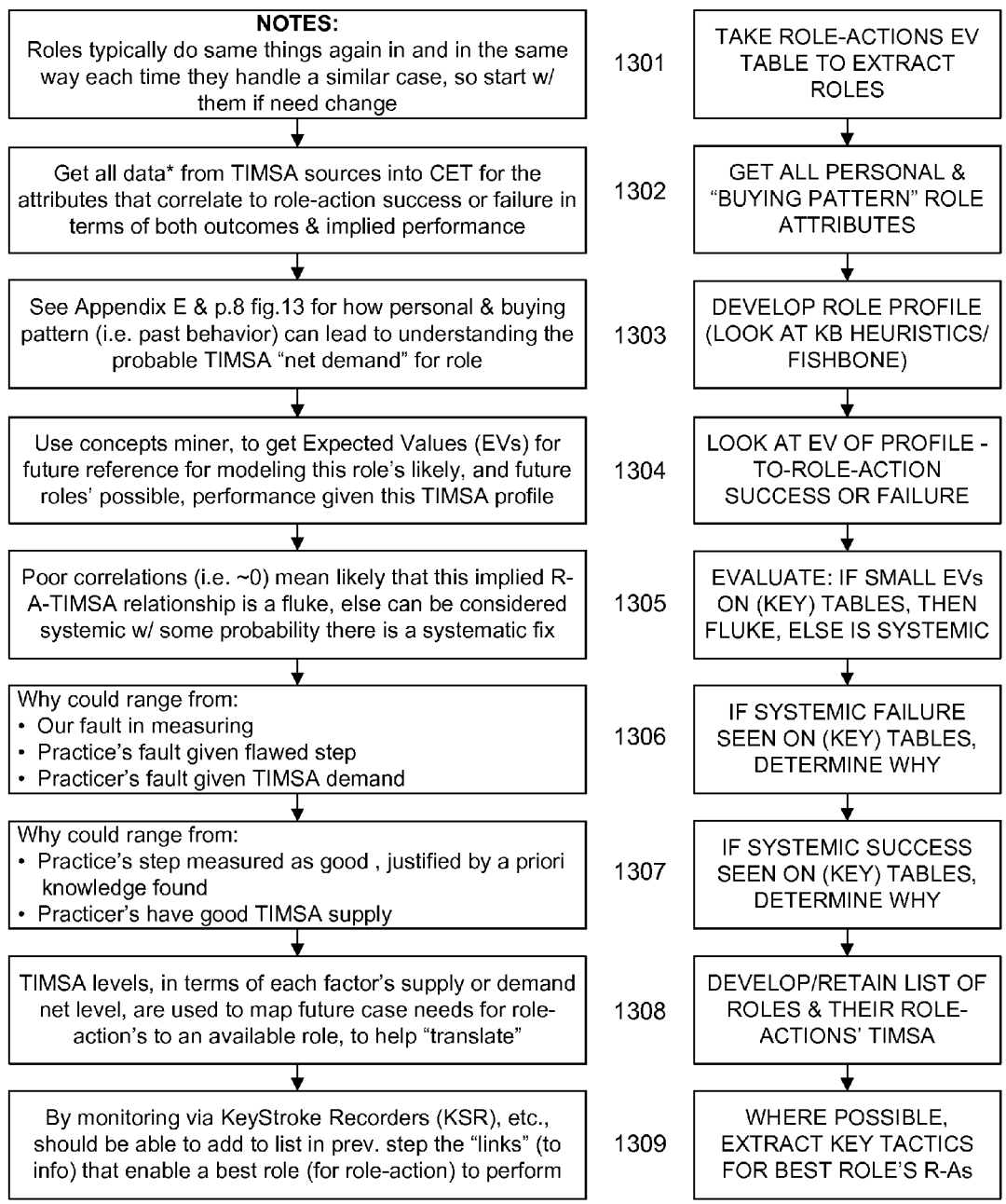
FIG. 13 provides further detail on the WHY processing outlined in FIG. 8.

FIG. 13 details the WHY processing of FIG. 8, along with corresponding notes and examples for processing steps 1301-1309.

Figure 14:
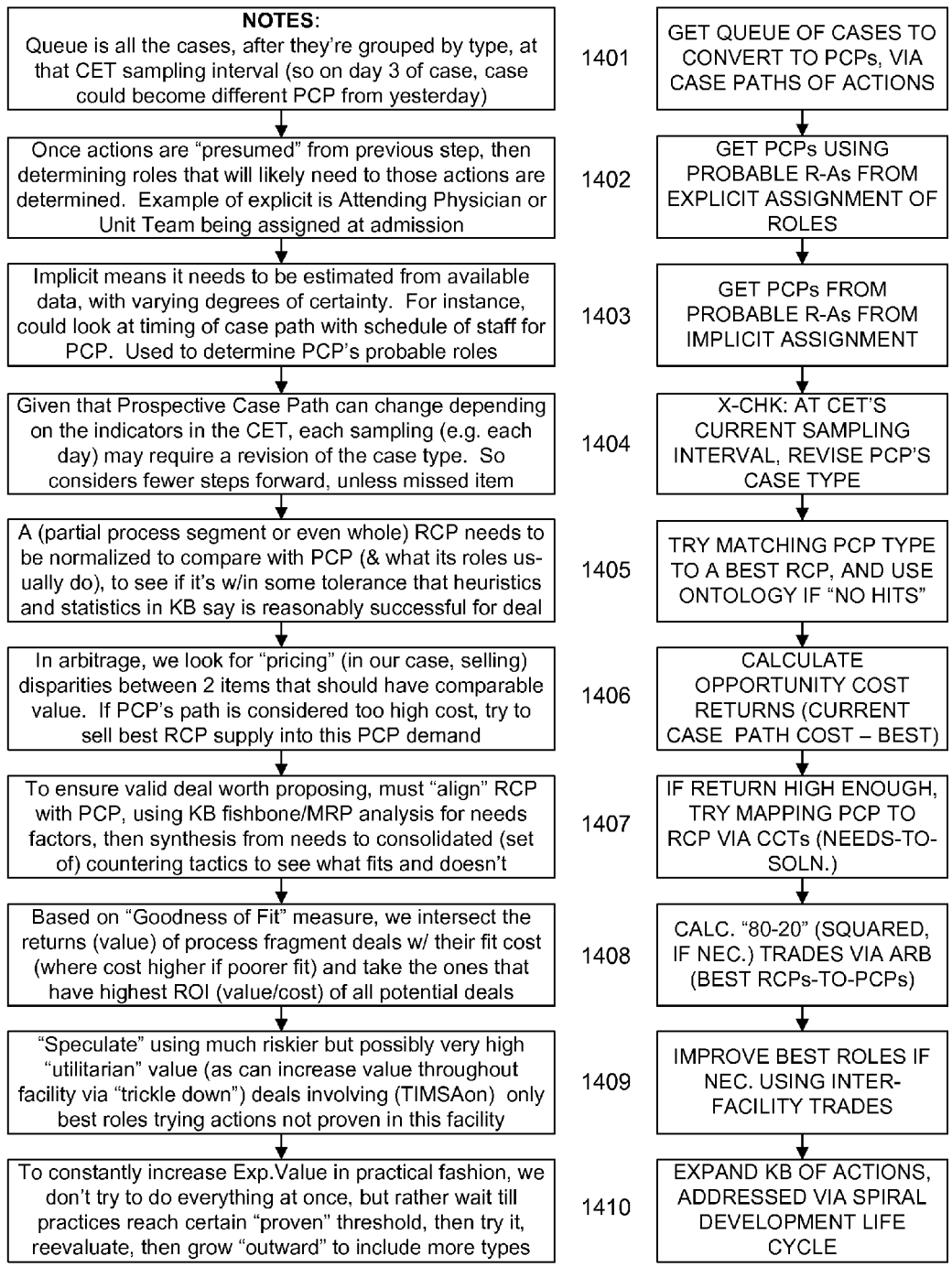
FIG. 14 provides further detail on the HOW processing outlined in FIG. 8.

FIG. 14 details HOW processing of FIG. 8, along with corresponding notes and examples for processing steps 1401-1410.

Figure 15:
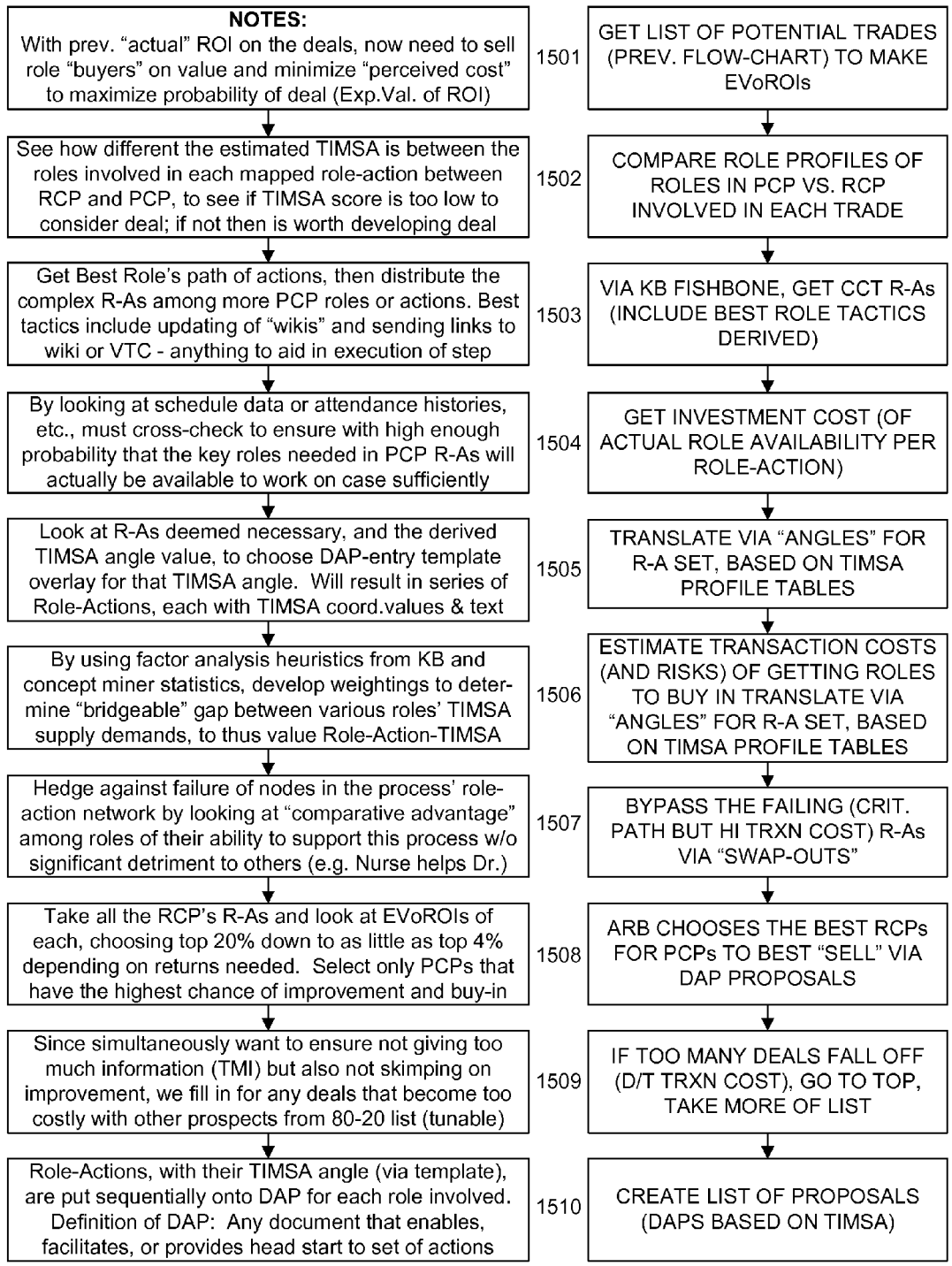
FIG. 15 provides yet additional detail concerning the HOW processing.

FIG. 15 details further HOW processing of FIG. 8, along with corresponding notes and examples for processing steps 1501-1510.

The following Appendices provide additional detailed examples of implementations and applications of preferred embodiments.

APPENDIX A

ProcessArbitrage Scenario w/ 3 Doctors & 2 Nurses in Test/Treatment

The following is an example of the Process Arbitrage (PA) method. It assumes that each role is involved in similar situations (a patient with a urinary tract infection, meeting SIRS criteria based on their vital signs) and therefore the same test and treatment should be followed to yield successful results. The variety of colored arrows show what particular Retrospective Case Path (RCP) is serving as foundation for a Prospective Case Path (PCP) DAP. For instance, in week 1 Dr. E's treatment path serves as the foundation for the DAPs of both Dr. H and Dr. Y.

EXAMPLE TABLE A1. Example's Initial Data Set.

Objective
   Better and Faster, in terms of Healthy or Not Healthy, and in what days Length Of Stay (LOS)

Data Inputs
   Case Type:
   UTI/SIRS
   Renal Failure (RF) requiring Dialysis
   Initial Case Attributes:
   Urination pain
   SIRS vitals signs
   Similar UTI cases:
   UTI/SIRS
   Urosepsis/Sepsis
   Noise in UTI cases ("bimodal", where 2 items most frequent):
      UTI/SIRS on young patient (2 cases, with LOS till Healthy=4)
      UTI/SIRS on elderly patient (2 cases, with LOS till Healthy=never)
   Practices (incl. "fragments") for the Test→Tx:
   CBC→Antibiotic
   EKG→Saline
   Metabol.Lab→Dialysis
   Physician Roles:
   Dr. Elder
   Dr. Young
   Dr. Hollywood
   Nurse Roles:
   Nurse Helpful
   Nurse Helpless
   Cycles (in this situation, phases of EMR Implementation):
   Pre-EMR
   EMR-Implementation
   EMR-Adoption
   (Critical) KNOWLEDGE INPUT for Domain
   Lab results come back in 2 days if EMR not used
   Lab results come back in 1 day if EMR used
   Antibiotic Tx not just the decision to use, but can be subdivided further as the specific course (i.e. which one to use, how much, etc.)
   Any test=Order (by Dr.), Obtaining Result (by Dr. or Nurse), and Evaluate Result (by Dr.)
   Basic rules examples where we can assume:
      Paths should follow "Test then treat", else assume path not reasonable.
      Paths should not repeat equivalent tests in a row, else path not reasonable.
      2 people can't do same action on same case at exactly same time (i.e. w/in same interval).
      1 person can't do actions on 2 cases at exactly same time.

Week 1 of the application of the methodology initially starts with a mining effort of all historical data, and also a mining effort for data generated during the first week of application, with different objectives prominent in each mining effort.

The historical data is mined to compile some statistically significant data to help formulate hypotheses of which "end state" (i.e. the final "snapshot" of the cases being mined) factors correlate most to success and then also separately to failure. To do so, cases (in this example, patient stays) are mined to first see which cases, when objectively measured, were best, and later those cases are mined to see who was involved in the case.

Mining of the first week of the application, however, is to establish case evolution timelines (CETs)—seeing what data elements change (a change we call a "delta") between data "samplings" at designated intervals. This higher granularity (i.e. looking at not only the end of the case, but also the beginning, and middle stages as it "evolves") is what allows us to determine: 1. sequence of the various steps performed, 2. potential causality amongst the correlations, and 3. the timing (and thus any delays) in the implementation of each step in the process (if the interval is short enough—that is, a higher sampling rate). Note that some implementations may provide even greater levels of data granularity, such as if they have Computerized Physician Order Entry (CPOE) with output available to the Process Arbitrage engine in the form of HL7 data having complete timestamps for many, if not all, the actions performed. However, here we assume that this level of sophistication is not present. If it were, then much less risk would be involved in the process mining, and more emphasis could be placed on the Process Arbitrage using TIMSA-DAP.

By cross-referencing to the Table of Deltas-to-Implied Actions (part of the a priori knowledgebase), these deltas are then used to infer what actions were performed, with some degree of probability, and the monitored data of these CETs is used to develop more statistically significant data in a more fine-tuning (i.e. higher sampling rate) phase.

Then we identify roles involved in a given process. This is done using a "fingerprint" scheme of looking at all data available for a case and seeing what data in the current or final "fully evolved" case points to (i.e. indicates) a specific role (e.g. Dr. John Doe) with some degree of probability. Then also look at the deltas to then cross-reference to see who is either ascribed to the change element (such as a doctor's electronic signature or dictation sign-off) implying some action set.

If there are no good records of data showing who did what, we cannot determine with a high degree of probability that a role was involved in an action unless and until much more data is mined and the statistical evidence mounts (e.g. a nurse's assignment to a patient for that day as noted in an electronic worksheet log on many cases that appear to have the same action being performed, while that action is not evident in those cases where she is not found in the log; Also, if 2 people are working on that case, and either could have performed the implied action, then we use expected values to ascribe a 50% chance of either having done the action). Worst case, all we can do is know that a role was involved in a case (e.g. nurse's assignment to a patient for an ENTIRE patient stay being noted in an electronic worksheet log).

We then look at the roles indicated by the fingerprint to see their personal characteristics, establish behavioral patterns, and other data that helps decide how best to "sell" this role on changes we will be suggesting to improve performance.

Given that the original historical data will lack Case Evolution Timelines, it is therefore necessary to evaluate the data from week one prior to generating any DAPs.

In this particular example, the methodology mines the historical data and determines that Doctor Elder ("E") is near retirement, has had admitting privileges at the hospital for over 20 years and scores highly with regard to evaluation criteria, which could range from: evaluations done by the hospital; to board certifications or board scores; to where he trained; to number of complaints on file. Doctor Young ("Y") is recently graduated from his residency, has had admitting privileges at the hospital for less than 3 years and scores above average with regard to evaluation criteria, and Doctor Hollywood ("H") is an experienced doctor, who has been at the hospital for 15 years, and scores average with regard to all the evaluation criteria.

The methodology further reviews the data from week one and identifies similar cases involving Doctors E, Y and H (once again, throughout this example, it is assumed that Doctors E, Y and H have similar and comparable cases). Initially, the end results are identified and examined. In our example, the end result objective is the Length Of Stay (LOS) UNTIL A HEALTHY DISCHARGE (since you can always discharge an "expired"/deceased patient sooner) for each patient under the care of Doctors E, Y and H.

Table 1 shows that the lengths of stay are as follows: (1) for Dr. E's patient, 3 days; (2) for Dr. Y's patient, 5 days; and (3) for Dr. H's patient, 5 days. Based on this, it appears that despite similar cases, Dr. E was able to discharge his patient 2 days before both Doctors Y and H. Then, in a similar fashion done earlier in the example, the methodology then further mines the data to examine the length of time for test results to be provided to the doctor and the length of time to treat the ailment, by looking to see if each of the 2 steps have deltas (and thus their implied actions), and at which sampling interval those results appear. Note that the "days" units could be average, median, etc.

TABLE 1

|  |  | Week 1 RCP1 | Week 2 | Week 3 | Week 4 |
|---|---|---|---|---|---|
| Dr. Elder (E) | Test | 2 days | | | |
|  | Tx | 1 day | | | |
|  | Total | 3 days | | | |
| Dr. Young (Y) | Test | 2 days | | | |
|  | Tx | 3 days | | | |
|  | Total | 5 days | | | |
| Dr. Hollywood (H) | Test | 2 days | | | |
|  | Tx | 3 days | | | |
|  | Total | 5 days | | | |
| Nurse Ann-Young (A) | Test | | | | |
|  | TX | | | | |
| Nurse Ben-Elder (B) | Test | | | | |
|  | Tx | | | | |

By using CETs concept in its process mining, the method identifies that with respect to Dr. E, as set forth in figure E-1, it took him 2 days to order, receive and review the test results and 1 day to treat the patient. Continuing, with respect to Dr. Y, it also took her 2 days to order, receive and review the test results and 3 days to treat the patient. Dr. H's results mirror Dr. Y's results described above. Consequently, Dr. E is identified as best for treatment in week one.

At the beginning of week 2 (Table 2), the first daily action plans (or "DAPs") are generated and disseminated to roles throughout the hospital. DAPs are generated and distributed on a daily basis. Since Dr. E is the best for treatment in week 1, a daily action plan ("DAP") is generated for both Dr. Y and Dr. H based on the best path taken by Dr. E.

TABLE 2

|  |  | Week 1 | Week 2 EMR starts | | Week 3 | Week 4 |
|---|---|---|---|---|---|---|
|  |  | RCP1 | PCP1 | RCP2 | | |
| Dr. Elder (E) | Test | 2 days | | 3 days | | |
|  | Tx | 1 day | | 1 day | | |
|  | Total | 3 days | | 4 days | | |
| Dr. Young (Y) | Test | 2 days | | 1 day | | |
|  | Tx | 1 day | DAP→ | 2 days | | |
|  | Total | 3 days | | 3 days | | |
| Dr. Hollywood (H) | Test | 2 days | | 2 days | | |
|  | Tx | 1 day | DAP→ | 3 days | | |
|  | Total | 3 days | | 5 days | | |
| Nurse Ann-Young (A) | Test | 2 days | | E & H | | |
|  | Tx | 1 day | | | | |
| Nurse Ben-Elder (B) | Test | 2 days | | Y & H | | |
|  | Tx | 1 day | | | | |

The methodology, through CETs, reviews the steps taken by Dr. E in his treatment of his patient. That is, by looking at the deltas in cases of E, we see "patterns" emerging in what concepts correlate to the successful outcomes for this type of case (i.e. the 2 day LOS for a UTI patient treated by Dr. E). This will then be used to help create DAPs for others. Once these steps are identified, a DAP is formulated using the Expert System technology we use and sent electronically to either directly (via electronic mail to Doctors Y and H) or indirectly (sent electronically to a central coordinator, who then disseminates a paper copy of the DAP) or some combination.

Content of the DAP is heavily dependent on the TIMSA angle, which is in turn determined by TIMSA factors. For example, details on the DAP to either Y or H may include the exact antibiotic used, and the regimen ordered for it—such as by taking key words and phrases directly from E's dictation and putting into the DAP as TIMSA "Skill" data (e.g. "Please consider Antibiotic X at dosage Y at Z times a day"). The improvement in outcome can be used as TIMSA "Motivation" data (e.g. "Please note that this treatment averages a healthier patient in 2 days less than your usual treatment"). The WBC value found in the Test of Dr. E. and also H's & Y's could be shown as comparable value ranges justifying the same antibiotic, addressing the TIMSA Information factor (e.g. "In successful cases, WBC is between 12 and 14. Your case's WBC is 12."). The Hospital's policies or the "Clinical Pathway" for UTI's could also be shown to address the TIMSA factor of Authority (e.g. "Our hospital recommends Antibiotic X rather than your usual Antibiotic Y"). And finally, if the TIMSA factor of time is assumed to be at work on this role, there could be links embedded for Video Training Clips or Pictures (VTC or VTP), showing, for instance, a walk-through of how to how to open the bottle, or what the urine color is for a patient that responds well to this treatment. Or, for Time, it simply may be the realization that some of the content needs to be dropped from the DAP to reduce reading time.

The key becomes determining which factors are at play for this role, and thus what content to show on the DAP to better "sell" that role on the process change (that offers potential improvement) that is being promoted. Deciding what TIMSA angle H has or Y has is where the heuristics and statistics of each role's attributes enter the equation.

During week 2, the invention continues to mine data. In our example, week 2 also represents (by coincidence, and purely as a hypothetical "creative disruption" process change) the first week that an Electronic Medical Record ("EMR") is being used throughout the hospital. As in week 1, the invention first identifies the end result, which is the length of stay of patients before a healthy discharge.

The total lengths of stay (LOSs) AFTER the first round of DAPs then are as follows: for Dr. E's patient, 4 days; for Dr. Y's patient, 3 days; and for Dr. H's patient, 5 days. Once again, the invention via case evolution timelines further breaks down the information by looking at two general categories suggested by its knowledgebase: tests and treatment. From data mined (in an interval sampling mode as before) and now placed onto this chart, we can tell that Y was able to improve his treatment performance by 33% (i.e. is now 2 days vs. original 3), noted by the arrow from the PCP column to the RCP column. However, the DAP did not appear to help H, since his time remained the same, so this is represented by the arrow with a "break" in its middle.

With respect to tests, the implementation of the EMR now requires the ordering, and the obtaining of results, of all labs to be done electronically. The advantage is that as a result of the EMR, lab results can be provided within 1 day of ordering. However, Dr. E, unable to figure out how to use the EMR, seeks out assistance from Nurse Ann-Young ("A").

Nurse A orders the test for Dr. E, and then Dr. E, who has little interest in the EMR, is not aware the lab results would be provided faster than before (within 1 day versus the previous time of 2 days). Further, Dr. E is also unaware that all lab results would be delivered electronically, instead of in paper form. As was customary before implementation of the EMR, Dr. E did not start looking for the lab results until the day after the test was ordered. Thereafter, when he does not receive the results, Dr. E asks Nurse A about the lab results; however, Nurse A is unable to access the results using the EMR (given her lack of experience and other TIMSA factors), prompting Dr. E to call the lab, which delivers a paper copy of the results to Dr. E (for making improvements, we do not need to know how he got the late results, just that he did eventually). Consequently, it takes Dr. E a total 3 days just to order, receive and review the lab results.

Unfortunately, Dr. H also has problems with the EMR. Like Dr. E, Dr. H seeks out Nurse A's assistance with completing the lab order. However, the following day Dr. H inquires about the status of the lab results. He first sought out Nurse A's assistance; however, she was unable to help. Then, he asked Nurse Ben-Elder ("B") for assistance. Nurse B is successful at accessing the lab results.

Dr. Y, however, has no real problem using the EMR. She is able to order, receive and review the lab results in the 1 day time-frame that we know (in the knowledgebase) that the labs can be delivered. Thus, Dr. Y is best with regard to tests.

During week 2, additional data was mined regarding Nurse B. It appears that on the same day during week 2 Dr. Y and H sought out B's assistance in using the EMR to order and access lab results. Unlike when B assisted H only, B was unable to complete the tasks for both Y and H. This indicates that B is being overused and has a time issue. Therefore, it will be noted in the attributes of B that more than one doctor to assist in completing the EMR should not consult B.

With respect to the treatment step, it took Dr. E 1 day to treat his patient, Y took 2 days to treat her patient and H took 3 days to treat his patient. This indicates that Dr. Y implemented the suggestions on her DAP, but still needs to improve her performance. The methodology verifies this by examining the steps taken by Dr. Y in her treatment of the patient. It shows that Dr. Y altered her path (based on mining of the actual words in the text of the dictations) from her pre-DAP treatment path in an attempt to execute the recommendations set forth in the DAP. Moreover, it appears that H disregarded the suggestions set forth on the DAP (once again, looking at dictation data being mined, for instance).

At the beginning of week 3 (Table 3), another group of DAPs are produced and delivered. In our current example, a DAP would now be delivered to Dr. E regarding the test step, Dr. Y on treatment, Dr. H on test, Nurse A on test and Nurse B on test. Each DAP would be specifically tailored toward each role to address his or her specific action set (to help themselves or others), as well as their TIMSA problems. With respect to Dr. E, there are two paths that may yield a more successful result (ideally, one requiring a total of only 1 day spent on ordering, accessing and reviewing lab results).

TABLE 3

|  |  | Week 1 | Week 2 EMR STARTED | Week 3 |  | Week 4 |
| --- | --- | --- | --- | --- | --- | --- |
|  |  | RCP1 | PCP1 | RCP2 | PCP2 | RCP3 |  |
| Dr. Elder (E) | Test | 2 days |  | 3 days | ↑DAP→ 1 day |  |  |
|  | Tx | 1 day |  | 1 day |  | 1 day |  |
|  | Total | 3 days |  | 4 days |  | 2 days |  |
| Dr. Young (Y) | Test | 2 days |  | 1 day |  | 1 day |  |
|  | Tx | 3 days |  | 2 days | DAP | 2 days |  |
|  | Total | 5 days |  | 3 days |  | 3 days |  |
| Dr. Hollywood (H) | Test | 2 days |  | 2 days | DAP→ | 1 day |  |
|  | Tx | 3 days |  | 3 days |  | 3 days |  |
|  | Total | 5 days |  | 5 days |  | 4 days |  |
| Nurse Ann-Young (A) | Test |  | helped | E & H | DAP→ |  |  |
|  | Tx |  |  |  |  |  |  |
| Nurse Ben-Elder (B) | Test |  | helped | Y & H | DAP→ | helpdE |  |
|  | Tx |  |  |  |  |  |  |

The first path would be to follow Y's path by directly and properly using the EMR. The second path would be to follow Dr. H's path to consult B to help him navigate the EMR. Before suggesting a path, the invention would review, using heuristics, the relevant attributes of Dr. E. By examining historical and current data, the methodology derives (e.g. through statistical analysis) that older doctors are less likely to understand and/or take an interest in new technology. The probability of this increases as the age of the doctor increases. In our example, "age" is a double age sword in that it implies both more useful experience in one's field, but also less ability to learn new technology and paradigms (in fact, studies have shown that 76% of seniors have not used the Internet; there was an Associated Press article on this finding in November '05 regarding just this on the Medicare Prescription drug plan and its intimidating array of choices).

Examining the current data, it is found that both Dr. E and Dr. H have similar characteristics, such as being closer in age and tenure at the hospital. This stands in stark contrast to the characteristics of Dr. E versus Dr. Y (Y being much younger and having less tenure). Additionally, the behavior of Dr. E demonstrates that he tried the same approach used by Dr. H before; however, by chance, selected a less helpful assistant and failed to follow up in a timely manner. Also, a review of Dr. E's behavior (e.g. through Information Systems, or IS, access logs) shows that he infrequently uses the hospital Information System.

The methodology would evaluate these criteria and determine that, for E, designing a DAP to follow H's path has a higher probability of being successfully followed and executed, as opposed to Y's path. Consequently, the DAP for Dr. E would propose using Nurse B to help with using the EMR. B would be recommended, as opposed to A, since he previously demonstrated that he could successfully assist with using the EMR—and the Expected Value of Return On Investment (i.e. the EVoROI) for helping Dr. E is considerably higher, especially since he is a leader in treatment.

Dr. Y would once again receive a DAP—essentially as a "reinforcement"—containing the treatment path used by Dr. E. Our studies have shown that when using DAPs, by the $3^{rd}$ or $4^{th}$ time of seeing an action that is agreeable for a case type, the role learns it and does not usually require more DAPs for that case thereafter.

Also, in terms of creating the DAP, for instance, the data may have indicated that, although Dr. Y attempted to follow the path suggested by the previous DAP, she still was unable to completely apply all the nuances of the treatment path suggested. In fact, by examining the case evolution timeline of the path used by Dr. Y and then directly comparing Dr. Y's timeline against the case evolution timeline of the path used by Dr. E, the methodology identifies those particular areas that are most problematic for Dr. Y. Consequently, the DAP generated for Dr. Y will again highlight the path taken by Dr. E; however, specific emphasis will be provided on those areas that appear to be causing her problems (added details of E's approach can be added, or a different TIMSA angle can be taken).

Dr. H also will receive a DAP. The DAP received by H in week 2 focused on trying to improve H's treatment. However, as indicated above, it appears that H disregarded the DAP. The data mined from week 2 shows that not only is Dr. H having problems with treatment; he is also having issues with testing. Therefore, there are several content items for likely inclusion the DAP: (1) to include Dr. E's treatment path; (2) to include Dr. Y's test path; (3) to highlight his successful test path with B in order to avoid potential use of path with A, which failed previously; (4) to have H try using A again, as she may be getting assistance on the test from a DAP so as to free up time for B to help E and others; or (5) to include both the treatment path and either of the two test path options or both.

The methodology examines each of these alternative in formulating a DAP for Dr. H. First, the methodology examines the probability that Dr. H would follow a DAP containing all the paths that should be followed. Given that Dr. H failed to follow the previous DAP on treatment, the probability that he would follow a longer DAP containing similar suggestions previously rejected would be low, and thus EVoROI would be too low. That is, implementing the treatment path of Dr. E to improve his performance is complicated and takes more time to comprehend and skill to perform compared to implementing the test path of Dr. Y. The DAP, in order to sell Dr. H on the need to follow the treatment path of Dr. E, may require more information to be provided, such as description of additional labs needed, and setting forth the authority, such as Interqual criteria or Hospital policies, as to way Dr. H should follow the DAP's treatment assistance. Therefore, option 1 and 5 above would be eliminated. A DAP attempting to address too many issues at once creates, at the very least, a TIMSA Time issue.

Continuing, the methodology examines the characteristics and behavior of Dr. H. It is determined that Dr. H falls within the top 45 percent of doctors at the hospital for use of the Information Systems. This may be derived by examining the frequency of access (via log file) by doctors of the hospital's Information Systems. Heuristically, it is shown that doctors within the top 45 percent of usage of the hospital's Information Systems are more inclined to take time to use and learn to use the EMR, or at least new systems in general. It is worth noting that in week 1, H may have avoided using the IS at all, but in week 2 he hit the 45% mark because he was sending emails relating to, let's say, complaints about the EMR.

Therefore, the methodology determines that option 2 is most likely the best test path for Dr. H and is the most appropriate to recommend. As such, a DAP would be generated suggesting that Dr. H follow the test path taken by Dr. Y (i.e. how to use the EMR himself), or to first try and consult Nurse A, who now will get a DAP on using the EMR molded from what B was doing, and, as a last resort, to consult B for assistance (since we want to keep B free to help E).

In regards to Dr. H's DAP, note that any given DAP may contain a link and/or a reference to an electronic mail containing a link to access a video training clip or pic (the VTC or VTP mentioned earlier). For example, let's say we are at the sampling interval where we know Y excels—the lab test step. If, while Dr. Y ordered the lab and accessed the results using the EMR, a common program we refer to as a Keystroke Recorder (KSR) program is activated, then a video training clip of B's or Y's activity could be produced. The link would direct Dr. H to the video training clip showing him what Dr. Y did to order the lab and access the results via the EMR. This would serve as a visual reinforcement of any textual instructions contained on the DAP. The Process Arbigtrage methodology identifies instances where a keystroke recorder or similar device should be activated, and when its results should be embedded in a DAP as a link to a VTP or VTC.

Nurse A will receive a DAP, as well. A's DAP would set forth the test path of Dr. Y, and show details that Y and Nurse B performed. It could also contain a link to the appropriate training clip. Finally, Nurse B will received a DAP. However, her DAP would simply indicate that she should be ready to assist Dr. E with the EMR, while also referring H to Nurse A.

During week 3, as before, the invention continues to mine data. As in prior weeks, the invention first identifies the end result, which is the LOS of a patient until a healthy discharge.

The lengths of stay are as follows: for Dr. E's patient, 2 days; for Dr. Y's patient, 3 days; and for Dr. H's patient, 4 days. Once again, the invention, via case evolution timelines, further breaks down the information by looking at two general categories: tests and treatment.

Looking at tests, it took Dr. E only 1 day to order, access and review his lab results. By following the test path set forth in the DAP (i.e. he bought into Dr. H's and Nurse B's path for the step), Dr. E eliminated the unnecessary delay from the prior week. By reviewing the case evolution timelines, one can establish that Dr. E consulted with B to assist him with completing the EMR step. Although not necessarily the ideal or critical path being followed by Dr. Y, this plan of action for Dr. E has successfully brought E in line with the expected performance, which is 1 day total to order, access and review lab results.

What happens if E falls ill—how is this handled? Presumably, another doctor would step in to complete. Then the DAP would need to know that E has not come in for the day in order to do a bypass DAP for the step to someone else, or we can tune it such that others are given DAPs to serve as backups to monitor and ensure execution of critical path steps. Given that this would show up initially as another failure, but actually a false positive on his failure, this is accounted for, theoretically, by examining a large number of cases. Those where E is starting but not finishing should be low, since he should not fall ill too often. Thus, this should not completely skew the statistics.

As before, Dr. Y has no problem using the EMR. She is again able to order, receive and review the lab results in 1 day. Dr. H also is able to order, receive and review the lab results in 1 day. As suggested by the DAP, Dr. H follows the test path of Dr. Y, instead of seeking help from one of the nurses to use the EMR. Not only does this result in improving Dr. H's performance, it also indicates that, perhaps, the more simplistic the DAP, the more likely it will be followed by Dr. H, indicating that TIMSA Time is perhaps an angle that must be considered. Additionally, by using the DAP, it decreases the potential over usage of Nurse B, thereby lessening the probability that B may be unable to properly assist others, like E, with the EMR.

With respect to treatment, during week 3, it took Dr. E still 1 day to treat his patient, Dr. Y still 2 days to treat her patient and Dr. H still 3 days to treat his patient. As before, this indicates that Dr. Y implemented most of the suggestions on her DAP, but still needs to improve her performance. Despite the fact that the previous DAP highlighted problem areas from the previous week, there are still issues with Dr. Y's execution. The methodology verifies that it appears that Dr. Y is still making progress and is attempting to execute the suggestions set forth on the DAP.

Dr. H did not improve his performance. But, the DAP circulated to him, did not contain any discussion regarding treatment path. H did indeed execute on the DAP's test path.

At the beginning of week 4 (Table 4), another group of DAPs are produced and delivered. In our example, a DAP will be delivered to Dr. E regarding tests, Dr. Y regarding treatment, Dr. H regarding treatment, Nurse A regarding tests, and Nurse B regarding treatment. Each DAP would be specifically tailored toward each role to address his or her specific problem. Now we will discuss why and how.

TABLE 4

|  |  | Week 1 |  | Week 2 |  | Week 3 |  | Week 4 |
| --- | --- | --- | --- | --- | --- | --- | --- | --- |
|  |  | RCP1 | PCP1 | RCP2 | PCP2 | RCP3 | PCP3 | RCP4 |
| Dr. Elder (E) | Test | 2 days |  | 3 days |  | 1 day | DAP | 1 day |
|  | Tx | 1 day |  | 1 day |  | 1 day |  | 1 day |
|  | Total | 3 days |  | 4 days |  | 2 days |  | 2 days |
| Dr. Young (Y) | Test | 2 days |  | 1 day |  | 1 day |  | 1 day |
|  | Tx | 3 days |  | 2 days |  | 2 days | DAP | 1 day |
|  | Total | 5 days |  | 3 days |  | 3 days |  | 2 days |
| Dr. Hollywood (H) | Test | 2 days |  | 2 days |  | 1 day |  | 1 day |
|  | Tx | 3 days |  | 3 days |  | 3 days | DAP | 2 days |
|  | Total | 5 days |  | 5 days |  | 4 days |  | 3 days |
| Nurse Ann-Young (A) | Test |  |  | E & H |  |  | DAP |  |
|  | Tx |  |  |  |  |  |  |  |
| Nurse Ben-Elder (B) | Test |  |  | Y & H |  |  | DAP |  |
|  | Tx |  |  |  |  |  |  |  |

Looking at Dr. E first, for him there are several likely DAP entry options: (1) send a DAP with only Dr. Y's test path, (2) send a DAP with Y's test path with either Nurse A or B as backup, or (3) sending a DAP to both E and B, wherein E continues to rely upon B. Option 1 (plunging E into Y's solo use of the EMR) is probably low EVoROI, given the past track record of Dr. E and his demonstrated disinterest for the EMR.

Additionally, option 3 may be viable if certain conditions exist. In the event that Dr. E has demonstrated an unwillingness to use the EMR, a DAP would probably not be provided. Or, the DAP would only recommend using A instead of B. If this is the case, then any suggestion to Dr. E to use the EMR would yield a low expected value of return on investment. By providing a DAP despite this, may lead to Dr. E concluding that the DAPs are not helpful, increasing the chance of his rejection of recommendations made in the future.

However, most attractive is option 2. Dr. E would receive a DAP setting forth the test path of Dr. Y and, as a last resort, seek the assistance of A. This would attempt to reduce the workload of Nurse B to free up his time for other tasks (such as helping other people learning the EMR). Given the fact that A has received the DAP instructing her on how to use the EMR per Dr. Y's path, she should now be able to successfully assist Dr. E if needed. Thus, if E's path for this case shows that B did not become involved, then this is an advantage to the entire process, even if A was used. And if A wasn't used, then the advantage is that the EMR process change for this step has been fully adopted.

The methodology is capable of reviewing the success rates of the DAP. This means that, in our example, every role receiving a DAP containing Dr. Y's test path and watching the video training clip that has successfully used the EMR to order, access and review test in a timely manner is evaluated for ability to add value to the process. In the example, for instance, perhaps it has been shown that A has in fact watched the video training tape and received the DAP. Thus, it appears she is a good back up source for Dr. E.

In the DAP to Dr. Y, we have found that given the TIMSA angle for an age factor, the Motivation, Skill, and Authority angles work best on the DAP, and we are finally able to see Y's treatment LOS improve to E's level.

For Dr. H, by freeing up time from Nurse B, we can help the key TIMSA angles discovered in H, such as his age and average evaluation scores implying a TIMSA angle set needed of Time, which can be helped by B, then Skill, and Information. So here we are finally able to see H's treatment LOS improve closer toward E's level.

Once again, on the DAPs they receive, A is serving as backup help to E, and B is being asked to offer assistance to H.

Figure 16:
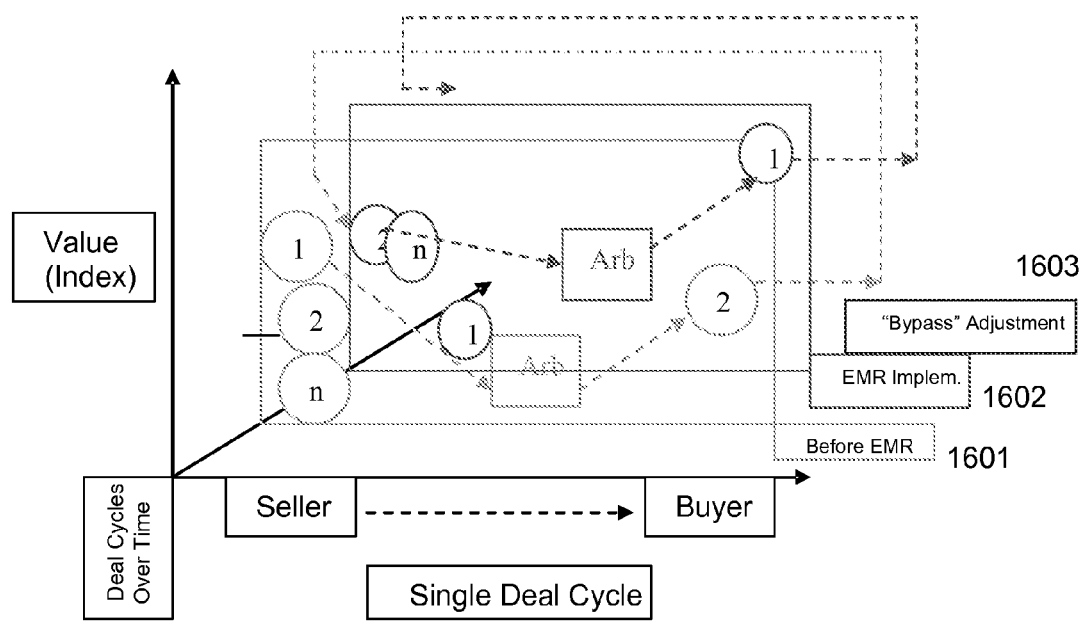
FIG. 16 illustrates an example discussed in Appendix A, in accordance with an embodiment of the disclosure.

FIG. 16. Seeing Progress Over Time: Process Arbitrage "Deal Flow" Diagram. Sample scenario shows 3 Planes (1601, 1602, 1603) with "bubbling up" of paths/fragments from bottom to top, not only from seller-to-buyer but also as buyer-becomes-seller.

Key:
- 1601 Circle 1=RCP for Dr. Elder's testing and treatment of UTI patient, d/c'd healthy in 2 days (best)
- 1601 Circle 2=RCP for Dr. Young's testing and treatment of UTI patient, d/c'd healthy 4.5 days (not best)
- 1601 Circle n=RCPs for other doctors, discharged (d/c) healthy or unhealthy, all greater than 4 days
- 1601 Arrow from Arb to Buyer=Arb finds buyer in the PCP that has Dr. Young as critical role
- 1601 Arrow to Arb from Seller=Arb matches Dr. Elder's RCP to Dr. Young's PCP, improving Test/Treatment (Tx) to new 2.5 days for healthy d/c, given no unnecessary Test/Tx (EKG and Saline), but still Dr. Young's Tx efficiency lags Dr. Elder's, hence the extra 0.5 days over Dr. Elder's
- 1602 Circle 1=with EMR introduction, Dr. Elder is unable to get labs properly—so his latest RCP drops
- 1601 Arrow from Green Circle 2 (Buyer) to Red Circle 2=Dr. Young's executed PCP becomes new "best" RCP to consider
- 1602 Arrow from Arb to Buyer=Dr. Elder can have significant value improvement if helped on EMR
- 1602 Arrow to Arb from Seller=Arb matches Dr. Young's RCP to Dr. Elder's PCP, improving his gettingTest to new 0.5 days from 1 day, so his former 2 days now becomes an even better 1.5 days for healthy d/c. It could be that Dr. Young's process helps Dr. Elder by showing how to get the data (some instructional skill headstart, or motivational by showing value, etc.) or else it could be that TIMSA-DAP does a bypass of the failing node by getting nurse that appears to have gotten data for doctors in past to support Dr. Elder (i.e. Nurse helps bypass, or physician using EMR helps physician having trouble learning it, such as older physician that may be more likely to struggle with new technology).
- 1602 Arrow from 1602 Circle 1 (Buyer) to 1603 Circle 1=Now Dr. Elder is not only at the performance level he was in the past, but with EMR assisting him, he is even higher than before, his RCP LOS score now 1.5.

Minimizing Staffing Costs While Not Sabotaging (i.e. Maintaining) Service

In this second example, "workshift" cases are what evolve in CETs. Let's say that these cases, in the planning stage on a certain day (e.g. today) for a certain day in the future (e.g next Monday), have the initial conditions of being both a non-overtime workshift currently, and also having available non-overtime staff if needed for the specified shift. The key issues are that it is hard to prevent bad (i.e. those that adversely affect the schedule cost-effectiveness) call-offs, and also easier to do bad fill-ins.

However, upon execution, these workshifts are NOT staying non-overtime (i.e. they keep getting overtime added to them somewhere between the schedule planning stage and the staffing execution stage). This is what PA will solve—consequently reducing overtime (OT) expense.

To elaborate, let's say there are 3 shifts with the same initial conditions, such as no overtime, there are PRN staff with no risk of overtime available to work that day, same census levels bracket, day of week (e.g. Wednesday), date time-frame (e.g. after Christmas), and it is a well-staffed shift (that is, the case already has overstaffing, which will increase costs without benefit if more staff are added). We can state that the type of the case includes all these preceding factors, and that the roles are what make or break the outcomes. Supervisors (2 of 3) that are consistently OT, while 1 Supervisor that doesn't do this.

The case path looks OK till day the day after execution when the results come in. To measure the results at the best level, the a priori knowledge knows to look for "Best cases" shifts—those with high PPD Hours and low PPD Dollars (2 metrics for staffing efficiency). To measure the results at the non-best levels, we look for the converse.

Then we move onto factor analysis based on a priori knowledge and "concepts" mining for correlations and potential causality. Here, the a priori knowledge knows to look for changes (deviations) between schedule data and timeclock data. If the timeclock has a shift that the schedule does not, we call that an "uplanned" shift. If vice versa, there was "unfilled" shift, implying with a high degree of certainty that someone "called off". It appears as if these two implied actions (both found in the a priori knowledge, but they could be labeled by the method arbitrarily, like action1, action2, etc.) are the culprits to the inefficiency.

The only noted difference are the supervisors making key decisions in the "evolution" of the case. Of these supervisors that are the factor for the "divergence" in the workshift case paths, 1 does it best (with personal and buying pattern attributes of a younger age, which may make it easier for them to access technology that they can harness to reduce OT), while 2 (or could be 20!) do not (with personal and buying pattern attributes of having a higher tenure, so they are less motivated to adopt new practices and content to stay with the status quo). More items that can gradually be correlated include how many of the staff are just back from vacations, or how far today is from the holidays, etc.

Another set of TIMSA heuristics could apply to staff rather than Supervisors. It may be that if the HR data shows the staff member to be an FTE, they will be motivated and thus prone to overstaffing and/or OT when not asked or needed around the holidays in an effort to make up for financial strains or vacations from the holidays. Others may relate to "flexibility". This can be determined by determining levels of cooperativeness (by seeing they are of college age, in school based on hiring instructions, and have moved between nursing units in the past) or replaceability (by seeing that their text evaluations on electronic file have poor reviews, and they also have poor performance based on past call-offs—since you don't mind if they leave). The actual staff who also "fingerprint" onto these OT (workshift) cases may have results (that will later imply actions) for working consistently when they will get overtime, but calling off when they won't (for the OT or well staffed shift), or for working unplanned shifts when a certain supervisor is working, especially when the shift is short-staffed (thus may be short on time), or especially if it's already well-staffed (indicating potential favoritism as a motivator).

The best has a trend line showing those staff with OT not getting more OT, and another trend line that shows those without OT, who also appear to have the attribute of being PRN, getting the OT.

The non-best supervisors, however, have the opposite trendlines on those to aspects. That is, the result was seeing OT staff getting more OT, and non-OT PRN staff not getting any OT. The implied actions were, in the form of choices, to select OT staff to ask to work more OT, and to not select PRN with no OT to work the OT shifts. In short, staff with OT get more when non-OT staff available (or if we are worried about overstaffing costs, shifts well-staffed get more).

Consequently, using PA, we find there are 2 problems, each needing their own countering tactic on the DAP, and angle to get buy-in from the supervisors. Based on process mining (and a priori knowledge's basic heuristics/fishbones) to get implied actions, it is determined that the worst workshift cases have staff with problems of either volunteering for, or instead an accepting of, poor assignments into the workshift. This is cross-checked with the other TIMSA profile items, such as HR data, RCPs, etc.

Now, armed with the best role's RCP, a factoring of the core problems of these non-best role's RCPs (and their current PCP as well) for a general Consolidated Countering Tactic (CCT), then each non-best role's TIMSA angles and corresponding CCT in a the angle's DAP entry template found in the KB, we have a set of DAP entries (answering 2 questions: 1. Who do you ask and how, and 2. Who do you not ask, and why) that facilitate role-actions that in turn improve performance. These DAP entries are then distributed by role (in sequence, if sequence is determined important by CET analysis) as DAPs (please see sample DAP in Appendix J Page 5, which combines both Combined both Role-Actions with their TIMSA angles onto 1 DAP, which can be given to both of the weaker supervisors, for simplicity's sake).

APPENDIX B

Maximizing Patient Care (Considerations for More Complex Example than Appendix A)

Here is a more complex UTI example, where cases once again show same initial conditions on vital signs and labs, but distinctly different outcomes. It is in the form of key considerations that must be made for an example with potentially more intricacies and pitfalls than the example found in Appendix A.

First of all, we need to explain the problem of "noise" when we are talking about the probabilitistic analysis. Noise is when the same case type and same steps yield different outcomes. This often means that we must further subdivide the case type (chest pain cases, for instance). If there is a bimodal curve (seen below), it means that we need further granularity in the type differentiation, and thus that the step is more risky, yielding wide variance (likely given some set of risk factors that have yet to be identified and incorporated). Reality in our example would be more along the lines of shared symptoms (like pain during urination), but that could equally lead to 2 very distinct paths of testing and treatment (e.g. uti and it's CBC and antibiotics; or renal failure and its metabolic labs and dialysis).

| Finding | Conclusion |
| --- | --- |
| E less steps to less days | improvement likely d/t E having found a critical path |
| E same steps to less days | improvement likely d/t timing and sequence of steps |
| E more steps to less days | improvement likely d/t quality better given extra steps |

If E Has Less Steps than the Others
That is:
All start with same case

| | | |
| --- | --- | --- |
| That is: | | |
| All start with same case | | |
| E LOS 2 | | |
| Y LOS 4 | | |
| H LOS 4 | | |
| E | | done in 3 steps |
| H & Y | | done in 4 steps |

Here, one of E's steps may have in fact included 2 tests together, or 2 treatments together, or E's RCP could be viewed as a "critical path". Here are some issues we would confront:

If Critical Path example: Difference would be the number of steps. Need to sell to others E's path first and then if necessary do what you did before. DAP is focused on the entire process segment, which is both the test and treatment combined. At the end, taking the best available path and disseminating it.

| E | 5 cases | EKG and CBC and Antibiotics |
| --- | --- | --- |
| E | 5 cases | Saline and CBC and Antibiotics |
| Y | 10 cases | EKG and Saline and CBC and Antibiotics |

Design DAP to sell H and Y on either of E's two paths or both.

Fine tuning. Although, our methodology would most likely be tuned to be more conservative from a liability standpoint, it is capable of aggressively modeling the above scenario and recommending to E to eliminate the use of the saline and EKG completely and instead just do CBC and Antibiotics. This aggressive fine tuning can also be tempered by referring it to an approval committee first, such as a Physician Advisory Board or Clinical Policy Board, etc.

Additionally, E may not be a good candidate to initially try recommendation. Maybe Y is best, as Y implements 90% of DAP recommendation as opposed to E, who only implements 30%.

Difference between critical path (CBC+Antibiotics) for all versus the critical path for H and Y (3 steps, 2 above plus 1).

If E and the Others Have Same Number of Steps

Are they the same steps?

Is the sequencing the same?

Use higher sampling rates (TMS mode)—are there delays in getting things done? Example:

Asking an RN to do something and it is taking her a long time to finish. Here we would look to see of the other were poorer executors of E's steps, or if they faced longer delays in administering E's solutions.

If E Has More Steps than the Others

In the end, the overriding concern is quality of care; health of patient.

Prioritization, via weighted statistical analysis. Weighted by people because health is biggest concern. Must look at quality first—is it acceptable to hospital and community? To be considered, it must meet baseline quality standards, which may encompass elapsed time between visits, health of patient, etc.

Here there may be extra "quality" steps that E does that ensures better outcomes for the patient. In this case, it is important to make sure the others see those actions and adopt.

Other Notable Changes from Appendix A for a Complex Example:

Dr. Y same DAP with emphasis on particular areas of weakness. Our method suggests to seek out Dr. E for advice as last resort.

Dr. H, DAP will be slightly different than first as it will recommend involving Historic data shows RN B is good at assisting docs in this area to improve treatment. Therefore DAP sent to involve RN B. RN B will also get this DAP.

RN A will receive DAP saying be on look out for Dr. E and a reinforcement of previous lesson.

Week 4 results in further improvement. Dr E at 2 days total, 1 each for treatment and test. Dr. Y is at 2 days total, 1 each as well. Dr. H is at 3 days total, 1 for test and 2 for treatment.

Additional Steps/Details Toward Solving a More Complex Example:

Initial mining on historical data can be viewed as "coarse tuning" since do not have the granularity of action results in a timed fashion from sampling intervals.

We can get initial actions for our knowledge base from Order Sheets used by the hospital, especially given the Pay-For-Performance (PFP) initiatives taking place. However, this is just the starting point, since not all cases covered by order sheets (so we need to develop our own for the facility based on mining). There is also latitude in adherence to Order Sheets, even in PFP, if the outcomes can shown to be better, AND there is proof to substantiate it.

Once methodology is put in place, it will capture the sampling data, and can then provide PCPs to become RCPs for "fine tuning".

We start with the whole process, then granularize, to then mix and match the components of the process.

Look at RCPs to see who's best and who's not best (in this case, we're focused on worst) in terms of success metrics What are each doing?

Look for the role's figurative "fingerprints" on various cases,

Then mine these cases for deltas (diffs in data states) that imply certain actions derived from knowledge base, to figure out the role-actions.

Why are the actions best or not (and subsequently why are the people)?

Best means:

Look at just actions, find the Critical Path, Fragments, and Actions from all the Best Paths Look at role profiles (for personal characteristic attributes) and role-action histories (behavioral pattern attribute), find the Critical Path, Fragments, and their Role-Actions from all the Best Paths. This allows us to develop TIMSA supply solutions (see NOTES below), hypotheses, etc., to statistically test Not best could be from a variety of reasons:

Need better analysis from Arb (is there incorrect combining or dividing of cases?) for further reverse engineering of process.

Wrong practice—is there a wrong action or path? (look at just actions)

Poor practicers—is there poor execution of action or path? (look at R-As)

(Remember: Roles need good actions, then good TIMSA).

How to get non-best to best?

Deal Valuation:

Look at PCPs to determine deal value by looking at each PCP to determine its expected path Look for worst expected paths and their opportunity costs Opportunity costs initiate when projection for current Best Path based on indicators or possible better actions deviate from the current projection of path based on current most likely actions (by seeing this, we can do "course corrections" and adjust to get back onto Best Path)

See if its expected path will map to a best practice RCP that has a significantly higher value The difference is the deal return value Now compute investment costs for the deal valuation. Look for or derive the similarities and differences on the case, actions, and the roles available or likely—that is, case type, practice, and practicers attributes (utilize MRP to get components, ontology to get comparable items into data set being examined)

Note on investment costs: Role overuse management. To avoid "overusing" roles that offer best paths, we look at case counts, in terms of the maximum this role has done in the past concurrently to assess capacity. Then if possible (depending on IS) to raise sampling rate (to every hour, for instance), we can see how long it takes results to appear, and thus how long certain actions likely take (this latter is the Time and Motion Study "Mode" of PA). This then allows us to assign a cost every time the role is used in a best path, with upper limit constraints that skyrocket the cost of using that role once exceeded.

Total value is the return on investment (return/investment)

Translate best fit for buyer of what suppliers have available in parts or whole

"Normalize" (using Process Mining with Ontology and "MRP" notion of actions) to greatest extent possible to reconcile differences and make the Seller's Best Path seem more equivalent to Buyer's perceived values in terms of actions.

"Normalize" (using Process Mining with TIMSA Analysis based on heuristics and statistics) to greatest extent possible to reconcile differences and make the Seller's Best Path seem more equivalent to Buyer's perceived values in terms of role-actions.

Estimate the "transaction costs" and risks of trying to sell path's role-action via TIMSA, by objective function that weights quantity, type, and degree of TIMSA demands vs. TIMSA supply of each role likely (vs. roles available) in expected path. With this expected investment and the expected returns, we can see if the potential deal still can be viewed as profitable.

Deriving TIMSA solutions from others: If TIMSA suggests that this role should have a Time problem, but we see them completing cases well, then mine to see what role-actions they are doing that could be applied to others with same TIMSA issues. We would look at histories of these Best roles to see what they accessed that's related (based on ontology, which could benefit from a GUI that approves or rejects solutions). For instance, file access logs may show they opened a Video Training Clip, or went to an obscure website, used a simpler search engine query, etc., making things easier in some way. The DAP could then contain this search quesry, web link, or media file for the training clip. And combining ontology with a decision tree, to harness all available data may get them through finding what they need faster, for example.

To discover/verify what was done, examine entry to an "action mechanism" (e.g. access to a system as noted by login log, or use of a feature as noted by a keystroke recorder), or the Exit to an action mechanism (e.g. result is proof of, or at least identifiable and associable to some degree of probability to a feature, such as WBC lab values being associable with a CBC blood test that was completed).

Key staff data we need for TIMSA: Human Resource (HR) data (e.g. birthdate, zip code, etc.), time-clock data to show transaction history for tenure and work habits, schedule data, and as many electronic logs as possible relating to file and system access.

Risks could be "hedged" by having back-up/fall-back role-actions that offer less return, but are available given some slack (roles' TIMSA) in path.

Speculation can also be done by selling not just tried and tested best paths, but rather derived critical paths from analyzing best paths.

Create "Proposal" for the Sale from Seller to Buyer—that is, put the role-actions into DAPs for each role involved. View the DAP as a shipment, wherein multiple items could be given in the same delivery (i.e. different role-actions for whatever process paths this role is involved in that time period, whether one-day or more frequent) to the same destination (i.e. that single role). Also, allow use of a "search engine". There are basically 4 questions that we would want this PA search engine to provide either histories (1 thru 3, retrospective), or instead proposed DAPs (4, prospective), for:

1. What all role actions (capabilities) were done? Who did what in what sequence?
2. Critical Path (What R-As were essential)?
3. Consequently, what was probability other R-As were wasteful?

Conclusion:
Essentially program trading of "facility paths"
End result to show: Chosen or suggested R-As, w/ DAPs for roles consolidated for all their R-As.
Bottom line: Provide the best service product (healthcare) when the "servicers" aren't commodities. There is in fact some resistance to evidence-based medicine, because it does not look at each of the roles involved in the hospital uniquely enough.

Further Considerations and Exception-Handling:
Although our past implementations have all been of daily intervals for both sampling and DAPs, we assume we are sampling TWICE a day, so we can see if LOS has been reduced by ½ day (if only daily sampling, then can only have granularity of one whole day).

Instead of repeating entire loop cycles of equivalent cases, we are presenting just frequency counts and %, with explanation of similarities (urosepsis/uti, SIRS/Sepsis; WBC is part of CBC, etc.), and differences (elderly patient vs. young patient).

Determining whether to fold or unfold actions that someone is doing is crucial mechanism. Example of folding/unfolding—All TESTs have 3 components:
Order Test
Get Results of Test
Evaluate Results Test Actions, TIMSA, etc. may need to be unfolded because of relevant distinctions or combined because of relevant comparabilities.

Key change management rule: Raise the heat, offer relief, then focus on offering short term wins. (We've seen real life example with billion dollar Long-Term Care chain: backlash after process improvement initiative in staffing without master schedules).

How do you avoid having DAPs "interfere" when this role may actually come up with a best path on their own that is different and better? Tell all roles if they want to try new approach, then just ignore DAP (and we'll know they didn't "buy" our proposal, and found what they thought was a better deal, or kept/fell into worse deal), then look to see if DAP's R-A matches, else it is a new test/treatment to add to the knowledge base. Since it won't, we know that it is not a recommended path, so see if outcome is better or worse.

If difficulty determining which RCP cases have whose fingerprints, and what the likelihood is this PCP might get these people? If necessary, can send all of them DAPs on the PCP. Role may be on case, but not as essential to know on PCP side, since could essentially blanket all roles with DAPs and tell them to ignore if they choose (i.e. if we have not "sold" them on its contents). However, this will likely not be needed, since for continuity of care reasons, nurses and Attendings are assigned very soon in the patient care process, so we can project with a high degree of probability, then adjust these paths by sending DAPs to frontline management. However, Residents and Physician Assistants paths are likely more fluid.

We will have competing arbs, and each can potentially go bankrupt, in a market of ideas and hunches.

Important to realize that features such as E&M are not different applications in the PA concept, but rather are a means to an end (i.e. not an end in itself), and is harnessed as a facilitator facet w/simply a trxn cost.

With Pareto's Rule squared, we don't need major changes to get major returns for processes (i.e. why change everybody when only a few failing nodes?).

Since less synthesis from scratch, less search space, which is how are we going to trim to reduce computational time and effort required to get good results.

Role type is as important as case type. Profile of that person (examples: please see book "Brian Tracey's Advance Selling Techniques")

Notes and Reasoning Relating to Example:
  Crucial comparison identified in example: Dr. Young uses EMR, Dr. Elder does not, but Elder avoids bad steps, while Young does not. If it takes 2 days to see lab results in dictations of Dr. Elder, while only 1 in Dr. Young, we know that 1 day turnaround likely possible, and we know Dr. Elder likely not using EMR (especially if cross-referenced with rules that say that labs turnaround in 1 day with EMR usage). Goal in this problem is to help Dr. Young avoid bad steps, and help Dr. Elder use the EMR. Capability-assisting DAPs help in both regards.

Example of Arb Manager (Software Agent) view:
    Ballons and air temperature: Analogy of hot air balloons, rising then cooling off, relative to atmosphere and the other balloons
    Introduction of EMR means all the balloons drop, given the initial disruptive nature, so in metaphor, the air temperature drops.
    Then Resident doctor is best path for a while
    But then bypass for failing R-A of Older-type doctor found with help from nurse to now become the new best.
    Or can picture it as moving one CasePath up is sort of "whack a mole", wherein if one drops, likely another one rises, and the ground level can shift as well.

Note that motivation (for clinical staff, management staff, etc.) can be achieved through not only financial incentives, but also through peer pressure, recognition, and people's own innate competitiveness.

PA helps show whether problem-solving tactics are $1^{st}$ order or $2^{nd}$ order, and whether they're truly valuable.

In example, nurse delays are considered big problem in LOS improvement, given poor execution/follow-through, and lack of accountability, and this has been uncovered in our research of clients.

We are in effect learning from others, or from less readily available data, and making the learning more active (info pushed to the role) rather than passive (role needs to look up the info).

DAP facilitates usage of a best practice item. EMR is example issue: Just because you have all your papers in your computer doesn't guarantee you'll be more efficient and effective. We can find out specifics about EMR usage by physician thru explicit usage logs, or implied by dictation mining for mention of key labs within a shorter interval.

Primer to build buzz and momentum and pull for key EMR features, and then implementation aids. What's good, and thus can be sold as a value proposition to more of the adoption curve doctors. What's bad, such as in the EMR, so can be improved by DAPs or something else (e.g. image resolution and detail issues). For example, by using our Meta-Level Manager (MLM, in TIMSA-DAP patent), we can address situations where we monitor the Best role by recording visual keystrokes, then apply that tactic by offering the Worst role a Video Training Clip (VTC) embedded within a DAP.

Disruptions can destroy change management process.
  We are making desired changes invisible by "selling" improvement to end users.

APPENDIX B CONCLUSION

The key questions users of this method will likely want to answer, if they are indeed interested in Process Improvement, are: How fast can we safely change? How hard it might be to get big changes (ROI)? How can we make it easier, safer, and faster by dividing and conquering?

The simplest analogies that we could use to sum up the approaches taken by our method are "boil the frog", but also "pick low-hanging fruit"—that is, the key is having people (roles) see the fruit, and then putting the ladder in right place to pick it (action), and finally putting the blinders on people to focus them on the target fruit (and how big it is) and away from (i.e. not looking down) their fear of heights (TIMSA).

As noted in this Appendix B, the method can be applied across multiple problems, (simple care, coding documentation, staffing, medical necessity evaluation, etc.), and even aid in synchronizing and ultimately synergizing them.

The method relies on fairly straightforward process mining concepts that use event logs (what we call CETs) and a priori knowledge and accrued findings based on data mining to understand actions being taken and by whom. For example, a doctor's discussion of the WBC, administering of Cipro, and disposition of the patient with normal vital signs and WBC on day 3 implies (given ontology and accrued knowledge) the actions of a CBC test, antibiotics treatment, and a healthy discharge with an LOS of 3 days, respectively. We then can infer with some degree of probability that this is the "process fragment", or technique (whether it be a whole or a partial—such as a critical path—view of a process) that returns this result for this type of patient (where type of the case is also determined by data mining for concepts).

Then the method uses the concept (introduced in a prior patent filing) of TIMSA, which states that to have people actually use the technique discovered, they must adopt it and not let the opportunity slip by (i.e. whereupon the improved process' opportunity "breaks down"). To do this, TIMSA must be evaluated for each role involved for the role-action we are trying to get them to do, whether it be based on their past performance, or data mining of people of similar "type" to them (once again, determined by data mining). For example, when trying to help people that may have a "Skill" deficit, and thus demand, for the role-actions that offer the best outcome, a DAP-entry template could be derived that says, "[Skill] Please note that the success rate of not doing <some test> is better . . . [Information] in this type of case <audit or checklist indicators> . . . [Authority] based on Interqual <show criteria or acceptable ranges> . . . [Motivation] in terms of outcome <% better results> with case mix <improvement difference> and LOS <days reduced> and PFP adherence <steps deviating from standard order sheet> and E&M<medical complexity difference> levels. Finally, the reduction of one or more of these TIMSA elements from the DAP could address the TIMSA demand for Time. Thus, knowing what NOT to say is just as important as knowing what to say, especially in a world of "Too Much Information" (which dilutes rather than focuses) and "Not Enough Time" (where inertia wins over progress).

Finally, the utilization of arbitrage is what allows us to harness Pareto's Rule of 80-20 (sometimes using it in repeated fashion), to pick the highest ROI items safely from an already existing set of techniques. The market-based approach is a way to get the information out faster, and from the bottom up. In this arbitrage approach, we don't "manufacture" as much as we "repackage product" and "match" the potential buyers and sellers for what's been proven valuable.

In terms of our form of data mining, one could view the overall analysis from its inception as analyzing for extracting concepts, then these concepts' correlations to outcomes, then the hypotheses for those correlations, and finally seeking to cross-check causality (i.e. "fishboned" decision tree factors, based on basic business rules in a priori knowledge) for those hypotheses. Then we can systematically derive solutions by countering each causative action or inaction problem factor, and also TIMSA problem factor (based on a priori and also accrued knowledge that uses some human intervention to reduce risk, such as Advisory Boards to allow new rules, such as on a "wiki" approach) to ultimately synthesize a customized solution (of Daily Action Plan entries with built in TIMSA angles that are overlayed onto TIMSA-DAP entry templates) via a Consolidated Countering Tactic (CCT).

of a UTI attempts to lead to a quick, healthy discharge for cases with similar characteristics. However, the roles available, what they "normally" do, and how to get them to improve is what the dynamic elements are.

We start w/ people because people do processes, not vice versa. Completed processes with good results are the goal, but people are the means to get there (what you have to work within the reality, not just some ideal. Processes are resource-constrained, thus resource-driven.

APPENDIX D

Mining "Market Monitoring" (Ongoing Knowledgebase Development)

MONITORING for ongoing opportunities and continuous improvement on kb

TABLE n

Concepts (Allegorical) within a General Framework for Process Improvement

| Concept | "Visualizing" Questions | PA Objective and Approach |
|---|---|---|
| Discovery | Where are the "diamonds in the rough" (performers/outcomes)? What is the diamond (process)? Do we understand the problem, which is in itself half the battle? | Uncover and estimate essence of current process, by data/process mining, & use Objective-to-Data systems integration, Case Evolution Timelines, and Ontology (to ensure comparable items are considered). Then classification of case types and expected paths is crucial. |
| Redesign | How do you "pick the low hanging fruit" changes (i.e. how to get maximum bang for buck)? How can you "boil the frog" (allegory: a frog thrown in boiling water jumps out, but if temperature raised slowly, it stays in until it becomes frog soup) when it comes to implementing process improvements? What are the "surgical strike" changes (i.e. minimize changes)? How do you "balance" the trade - offs? How do you avoid the law of unintended consequences - the proverbial "whack a mole"? | Create an improved/optimized process, using Process Optimization and Integration Network Topology. Create a fit to and a demand from each participant in the process helps create more "absorbable" changes. During the Process Change, harness the advantages of Reengineering (where generalist offers Conceptual Integrity), but also Specialization (specialists offer Comparative Advantage). Use Pareto's Rule (80-20), Squared (so 64%-from-4%). Use "spiral" life cycle for change. |
| Execution | How do you find the "path of least resistance"? How do you "grease the skids" for everyone involved? How do you make good strategy (i.e. one that doesn't rely on tactical brilliance)? | Ensure demand for improvement changes exist, using Process Arb. Make process executable, actionable, and ensure it gets done, using TIMSA. Reinforce or bypass failing nodes |

APPENDIX C

Figuring Out "Best" Patient Cases by Examining Various Facets

From the time of patient admission to discharge, several metrics can be used to evaluate performance improvement in the overall case path, e.g., length of stay and resource costs (a reflection of patient flow and disease management); case mix (a reflection of DRG accuracy); physician satisfaction (a reflection of E&M accuracy and PFP level subprocesses), and patient solvency (ability of patient to be discharged and still get medicine, such as from Medicaid, a reflection of Medicaid Approval subprocess).

The method is shown in the example set below, which starts with a Patient Flow example, wherein Disease Management STEP 2. What was their process (retrospective case paths, or RCPs)
Look at cases where they were involved
Patient case1 path by Dr. X, healthy in 2 days
Patient case2 path by Dr. Y, healthy in 4 days
Get all info from all sources possible for that case at as many sampling intervals as possible (so here, systems integration crucial)
What is the path/process/practice under what case situation & role situations
Who was involved, and what changed (for better or worse, or some downstream significance):
Use Case Evolution Timeline (CET) and the opp.cost indicators "Deltas" between each sampling, which are mapped to Probable (Role-)Actions, (role identification being possible d/t some "signature" by role on the case) and utilize ontology to properly group factors or actions). To add to kb by using backward order when mining. Note that additions to the CET from the samplings could be interval-based (i.e. every day items are added to the CET), or instead event-based (where only if something changes is the CET expanded). This latter approach of "triggering" is usually more complex, sometimes involving layers of if-then conditionals, so the former approach is usually easier to implement.

TABLE n

Example: Range of Case "Deltas" between Samplings that "Imply"Actions

| Actions | CBC Test | EKG Test | Antibiotics Treatment | Saline IV Treatment |
|---|---|---|---|---|
| Deltas (i.e. changes between samplings) | "WBC results" appears in dictation data; WBC <value> appears in labs | "EKG results" appears in dictation | "Administered antibiotics" appears in dictation | "Administered saline IV" appears in dictation |
| Comparability (determined via Ontology, to link meanings) | Subset: CBC is the lab test that provides WBC | Equal | Equal | Equal |

The Case Evolution Timeline has the least data upon patient admission, more with Day 1 CBC data, yet more with Day 2 Antibiotics data, and the most by the time of discharge.

Based on Table n above on Deltas, it is important to note a few essential corollaries:
  On action may have more than one delta (i.e. change) indicator, such as the CBC test above being indicated by a sudden appearance, let's say, of either WBC in lab values returned, or the mention of WBC values in the physician dictations.
  One change may also have more than 1 action, whether in terms of probability of one OR another, or probability of each of the others altogether. For instance, an increase in staffing cost may mean one or more of the following items: unnecessary people added, necessary people added, and/or higher rate added to existing people. Another example would be in an increase in case mix example: proper documentation added, and/or "fudged" documentation added.
  One role may do more than one action—this is fairly straightforward, and used in many of our examples (e.g. Dr. X doing testing and treatment).
  One action may have some probability that it was done by more than one role, in which case we ascribe probabilities (e.g. action done, but not claimed by either of 2 people on a shift, then you could give each a 50% probability of having done the action).

STEP 3. Why best or not—for both people and their processes
  What concepts, such as process role-actions, affect performance
  Take these role-actions and do correlation and pervasiveness views
  In this example above, one perspective would be to look at the 2 RCPs as concepts, and is RCP 1 is concept 1, it translates to a best path every time, while RCP translates into a non-best (so a best failure) every time. Clearly, it is important to have statistically significant data, but the point is, we can weight each path quantitatively. Moreover, the subpaths (more than 1 role-action), as well as the role-actions themselves, can be weighted in such a manner and viewed graphically as above, with the "extent" or pervasiveness of the finding a third dimension to the graph (in other words, a larger bubble).

Let's say Dr. Y is younger and more able to use an EMR to get his data, but is not as clinically experienced as Dr. X. There could be a scenario wherein Dr. X was originally a "best path" node, while Dr. Y was not. However, let's say an EMR was introduced, then suddenly Dr. X becomes a non-best, while Dr. Y becomes a best (but still not as good as Dr. X originally. In the above way, we get a role-action that may be in a best path, but use the Nurse (who has comparative advantage in terms of TIMSA demands of Time, Skill on the EMR, etc.). Subdividing the role-action to ensure better result, as Dr. X perhaps not only regains the best path title, but also perhaps at a better level than Dr. Y's best path result, and even Dr. X's original best path result.

Also for KB, determine heuristically, validating then statistically, TIMSA for both buyers and sellers, in order to: first cross-check to see if making sense/reconciling. Then, more importantly, see if TIMSA may match between them, or where seller may actually hold keys on how to address TIMSA. Growing the KB thus provides efficiencies that increase over time.

It is to be understood that the description, specific examples and data, while indicating exemplary embodiments, are given by way of illustration and are not intended to limit the various embodiments of the present disclosure. All references, information contained in a website, and the like, cited herein for any reason, are specifically and entirely incorporated by reference. Various changes and modifications within the present disclosure will become apparent to the skilled artisan from the description and data contained herein, and thus are considered part of the various embodiments of this disclosure.

What is claimed is:

1. A method for improving efficiency in an organization, the organization having a plurality of roles performing a plurality of actions, comprising:
  obtaining historical data related to an organization objective over a computer network;
  storing the historical data in a memory in a computer system;
  analyzing the historical data over a plurality of sampling intervals using the computer system to determine one or more factors that correlate with a successful outcome of the organization objective and one or more factors that correlate with an unsuccessful outcome of the organization objective;
  determining at least one data element change among the analyzed historical data during each of a plurality of sampling intervals;

determining a probability of performance of at least one action based on the determined data element changes using the computer system;
inferring the performance of at least one action based on the determined probability of performance;
determining a probability that one or more roles was involved in the performance of each inferred action;
identifying the at least one role involved in performance of each inferred action based on the determined probability that one or more roles was involved using the computer system;
evaluating performance of each identified role performing each identified action based on an outcome of performing the action, using the computer system;
determining a projected best action path based on evaluation of the determined factors correlating to successful and unsuccessful outcomes and evaluated performance of each identified role using the computer system;
determining for each of the plurality of the roles at least one of a time, motivation, information, skill, and authority change, if required, to improve the role's performance toward achieving the organization objective based on the determined projected best action path using the computer system;
generating a unique daily activity plan to provide to each of one or more of the plurality of roles, wherein the unique daily activity plan provides to the corresponding role for which it is generated the at least one of the time, motivation, information, skill, and authority change for the role to perform to move toward reaching the organization objective using the computer system; and
distributing the unique daily activity plan to the corresponding role for which the daily activity plan was generated.

2. The method of claim 1, further comprising:
performing at least one of:
providing additional time to one of the identified roles;
providing additional information to one of the identified roles;
increasing motivation of one of the identified roles;
assisting one of the identified roles in a particular skill; and
changing authority of one of the identified roles such that the identified role with the changed authority can assist another of the identified roles.

3. The method of claim 1, further comprising:
process mining the historical data; and
creating a case evolution timeline.

4. The method of claim 3, further comprising evaluating at least one identified action in view of the case evolution timeline for validation.

5. The method of claim 3, further comprising evaluating actions in view of the case evolution timeline to identify missing steps.

6. The method of claim 1, wherein generating the daily activity plan includes processing event logs, ontology and tagging to develop an item sequence.

7. The method of claim 1, further comprising:
profiling the identified roles; and
developing countering tactics under the daily action plan based on time, information, motivation, skill, and authority associated with the identified roles.

8. The method of claim 7, wherein profiling includes statistical analysis and heuristic analysis.

9. The method of claim 7, further comprising developing the countering tactics iteratively.

10. The method of claim 1, further comprising performing process mining of the historical data on a daily basis.

11. A system for improving efficiency in an organization, the organization having a plurality of roles performing a plurality of actions, comprising:
a computer system having a memory to store historical data related to an organization objective obtained over a computer network and a processor, where in the computer system is configured to:
analyze the historical data over a plurality of sampling intervals to determine one or more factors that correlate with a successful outcome of the organization objective and one or more factors that correlate with an unsuccessful outcome of the organization objective;
determine at least one data element change among the analyzed historical data during each of a plurality of sampling intervals;
determine a probability of performance of at least one action based on the determined data element changes using the computer system;
infer the performance of at least one action based on the determined probability of performance;
determine a probability that one or more roles was involved in the performance of each inferred action;
identify the at least one role involved in performance of each inferred action based on the determined probability that one or more roles was involved;
evaluate performance of each identified role performing each identified action based on an outcome of performing the action;
determine a projected best action path based on evaluation of the determined factors correlating to successful and unsuccessful outcomes and evaluated performance of each identified role;
determine for each of the plurality of the roles at least one of a time, motivation, information, skill, and authority change, if required, to improve the role's performance toward achieving the organization objective based on the determined projected best action path; and
generate a unique daily activity plan to provide to each of one or more of the plurality of roles, wherein the unique daily activity plan provides to the corresponding role for which it is generated the at least one of the time, motivation, information, skill, and authority change for the role to perform to move toward reaching the organization objective; and
distribute the unique daily activity plan to the corresponding role for which the daily activity plan was generated.

12. The system of claim 11, wherein the computer system is further configured to perform at least one of:
providing additional time to one of the identified roles;
providing additional information to one of the identified roles;
increasing motivation of one of the identified roles;
assisting one of the identified roles in a particular skill; and
changing authority of one of the identified roles such that the identified role with the changed authority can assist another of the identified roles.

13. The system of claim 11, wherein the computer system is further configured to:
process mine the historical data; and
create a case evolution timeline.

14. The system of claim 13, wherein the computer system is further configured to evaluate at least one identified action in view of the case evolution timeline for validation.

15. The system of claim 13, wherein the computer system is further configured to evaluate actions in view of the case evolution timeline to identify missing steps.

16. The system of claim 11, wherein the computer system is further configured to generate the daily activity plan includes processing event logs, ontology and tagging to develop an item sequence.

17. The system of claim 11, wherein the computer system is further configured to:

profile the identified roles; and develop countering tactics under the daily action plan based on time, information, motivation, skill, and authority associated with the identified roles.

18. The system of claim 17, wherein profiling includes statistical analysis and heuristic analysis.

19. The system of claim 17, wherein the computer system is further configured to develop the countering tactics iteratively.

20. The system of claim 11, wherein the computer system is further configured to perform process mining of the historical data on a daily basis.

* * * * *